United States Patent
Varsanyi et al.

(10) Patent No.: US 9,185,125 B2
(45) Date of Patent: Nov. 10, 2015

(54) SYSTEMS AND METHODS FOR DETECTING AND MITIGATING THREATS TO A STRUCTURED DATA STORAGE SYSTEM

(71) Applicant: DB Networks, Inc., Poway, CA (US)

(72) Inventors: Eric Varsanyi, Plymouth, MN (US);
David Rosenberg, Los Altos, CA (US);
Chuck Paterson, St. George, UT (US);
Steve Schnetzler, San Diego, CA (US);
Timothy Ruddick, Oceanside, CA (US)

(73) Assignee: DB NETWORKS, INC., Carlsbad, CA (US)

( * ) Notice: Subject to any disclaimer, the term of this patent is extended or adjusted under 35 U.S.C. 154(b) by 128 days.

(21) Appl. No.: 14/151,597

(22) Filed: Jan. 9, 2014

(65) Prior Publication Data
US 2014/0201838 A1 Jul. 17, 2014

Related U.S. Application Data

(60) Provisional application No. 61/751,745, filed on Jan. 11, 2013.

(51) Int. Cl.
*H04L 29/06* (2006.01)
(52) U.S. Cl.
CPC .................. *H04L 63/1425* (2013.01)
(58) Field of Classification Search
CPC .................................................. H04L 63/1425
USPC .......................................................... 726/23
See application file for complete search history.

(56) References Cited

U.S. PATENT DOCUMENTS

| | | | |
|---|---|---|---|
| 7,154,855 B2 | 12/2006 | Hardy | |
| 7,522,605 B2 | 4/2009 | Spencer et al. | |
| 7,782,790 B1 | 8/2010 | Nadeau et al. | |
| 2001/0001608 A1 | 5/2001 | Parruck et al. | |
| 2005/0097209 A1 | 5/2005 | McDonagh et al. | |
| 2006/0212942 A1* | 9/2006 | Barford et al. | 726/24 |
| 2007/0118665 A1 | 5/2007 | Philbrick et al. | |
| 2008/0091405 A1 | 4/2008 | Anisimovich et al. | |

(Continued)

FOREIGN PATENT DOCUMENTS

| | | |
|---|---|---|
| JP | 2007151013 A | 6/2007 |
| WO | 2005/109754 A1 | 11/2005 |

OTHER PUBLICATIONS

International Search Report and Written Opinion for PCT/US2013/023445, mailed on May 16, 2013, in 11 pages.
Myers. "An O(ND) Difference Algorithm and Its Variations," Algorithmica, Nov. 1986, in 15 pages.

(Continued)

*Primary Examiner* — Teshome Hailu
*Assistant Examiner* — Aubrey Wysznski
(74) *Attorney, Agent, or Firm* — Procopio, Cory, Hargreaves & Savitch LLP

(57) ABSTRACT

Systems, methods, and computer-readable media for detecting threats on a network. In an embodiment, target network traffic being transmitted between two or more hosts is captured. The target network traffic comprises a plurality of packets, which are assembled into one or more messages. The assembled message(s) may be parsed to generate a semantic model of the target network traffic. The semantic model may comprise representation(s) of operation(s) or event(s) represented by the message(s). Score(s) for the operation(s) or event(s) may be generated using a plurality of scoring algorithms, and potential threats among the operation(s) or event(s) may be identified using the score(s).

69 Claims, 27 Drawing Sheets

(56) References Cited

U.S. PATENT DOCUMENTS

| | | | |
|---|---|---|---|
| 2010/0020708 A1* | 1/2010 | Okada et al. | 370/252 |
| 2011/0082688 A1 | 4/2011 | Kim et al. | |
| 2011/0252152 A1 | 10/2011 | Sherry et al. | |
| 2011/0258610 A1* | 10/2011 | Aaraj et al. | 717/128 |
| 2012/0263182 A1 | 10/2012 | Enomoto et al. | |

OTHER PUBLICATIONS

International Search Report and Written Opinion for PCT/US2014/068616, mailed on Feb. 25, 2015, in 6 pages.

International Search Report and Written Opinion for related PCT Application No. PCT/US2014/010908, mailed on Jun. 13, 2014, in 12 pages.

* cited by examiner (A) SELECT 1 FROM USERS WHERE USERNAME = 'joe' AND PASSWORD = 'xyzzy'
     User enters: ' OR 1 = 1 --'
(B) SELECT 1 FROM USERS WHERE USERNAME = '' OR 1 = 1 --' AND PASSWORD = 'xyzzy'

SYSTEMS AND METHODS FOR DETECTING AND MITIGATING THREATS TO A STRUCTURED DATA STORAGE SYSTEM

CROSS REFERENCE TO RELATED APPLICATIONS

This application claims priority to U.S. Provisional Patent App. No. 61/751,745, filed on Jan. 11, 2013 and titled "System and Method for Detecting and Mitigating Threats to a Structured Data Storage System," the entirety of which is hereby incorporated herein by reference. This application is also related to U.S. patent application Ser. No. 13/750,579 ("the '579 application"), filed on Jan. 25, 2013 and titled "Systems and Methods for Extracting Structured Application Data from a Communications Link," which claims priority to U.S. Provisional Patent App. No. 61/593,075, filed on Jan. 31, 2012 and titled "System and Method for Extracting Structured Application Data from a Communication Link," the entireties of both which are hereby incorporated herein by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The embodiments described herein are generally directed to the field of information technology (e.g., with features of network switching, routing, proxying, and database technologies), and, more particularly, to the detection of security threats and breaches by analyzing traffic between database servers and their clients, web servers and their clients, and/or in technologies other than structured data storage systems, such as directory protocols, Hypertext Transfer Protocol (HTTP), email traffic, etc.

2. Description of the Related Art

Over the last few decades, structured—and, in particular, relational—database technology has become a critical component in many corporate technology initiatives. With the success of the Internet, the use of database technology has exploded in many consumer and business-to-business applications. However, with the popularity of database architectures, new risks and challenges have arisen, such as complex and difficult-to-identify performance issues and subtle gaps in security that can allow confidential data to be access by unauthorized users.

A very common practice is to use a three-tiered architecture to implement applications, as illustrated in FIG. 11. While FIG. 11 depicts only a single web server 1110, application server 1112, database server 1114, and client 1130, it should be understood that it is common to have multiple servers 1110, 1112, and 1114, directly or indirectly, connected to multiple clients 1130. A client browser on a client 1130 provides an end user an access point to the application via one or more networks 1120 and web server 1110. Common applications include online storefronts, banking access, medical records, and the like. In many cases, an application, such as a mobile application, replaces the web browser, but the protocols and operations of the application are very similar. Web server 1110 parses and processes requests received from client 1130 and returns results to client 1130 over network(s) 1120, which may include the Internet. Application server 1112, communicatively connected to web server 1110, contains the core (e.g., business) logic of the application. Application server 1112 uses the resources of one or more database servers 1114 to store and query persistent state needed by the application, such as account information, including, for example, account balances, purchasing information, payment information, shipping information, and/or the like. Web server 1110, application server 1112, and database server 1114 are often communicatively connected via one or more internal networks, but it should be understood that they could be connected in other manners (e.g., via external network(s), direct connection, etc.).

Application server 1112 may make requests to retrieve, summarize, or change data stored by database server 1114 using Structured Query Language (SQL). SQL is a special-purpose language designed for managing sets of data stored in tables that may be related to one another using relational algebra and tuple relational calculus. It is primarily a declarative language, but current commercial implementations extend it with procedural scripting elements. Application server 1112 converts HTTP requests into SQL requests that retrieve or query data.

Practical applications limit the types of operations an external user may request, but ultimately the applications must generate SQL that expresses some aspect of one or more application operations to database server 1114. Applications may generate SQL using a variety of techniques. Typically, there are a set of SQL templates that are specialized with the user request data and then submitted to the database server.

A very common security flaw is for application server 1112 to allow some unanticipated portion of the external HTTP request to be aggregated with the generated SQL, causing the semantics of the SQL statement to no longer match the application's intent. This may allow unauthorized extraction or modification of data on database server 1114. This is referred to as SQL injection and can be responsible for significant data loss. An unauthorized modification to the database server state is also possible, allowing an attacker to not only change the data in the database but to cause execution of arbitrary program code on database server 1114. This code may, in turn, open additional security vulnerabilities in the application by providing a tunnel through security screens for the attacker to gain further unauthorized access.

FIG. 12 illustrates an example of SQL injection. Statement A represents an example SQL query that the application designer expected to be run. Specifically, a username "joe" and password "xyzzy" are checked against a database table "USERS" to determine if the user should be granted access to the application. However, an attacker may enter the string "OR 1=1—" as the username, instead of "joe" or some other valid username, which results in the application generating the SQL query in Statement B. This effectively changes the semantic meaning of the statement. Specifically, the query will always return a "1" regardless of the password entered, since "1" will always "=1" and the portion of the query that performs the password check (i.e., "AND PASSWORD='xyzzy'") is commented out with the "—" token. Thus, the injected SQL allows the attacker access to the application even without knowledge of a valid username or password. There are many methods to trick application server 1112 into passing this manner of attack through to database server 1114. So many, in fact, that it is very difficult for an application designer to implement an application that prevents all such attacks.

Denial-of-service attacks may also be perpetrated on the database via direct SQL injection techniques or via more subtle parametric changes. In either case, such techniques or changes can be used to cause database server 1114 to use an unusually large amount of its limited resources in too short of a timespan. Furthermore, database denial-of-service attacks can render database server 1114 useless with only a handful of packets spread out over a long period of time. Thus, since this type of attack does not require a large amount of network traffic to mount, it is difficult to detect using traditional methods.

Many simple toolkits that probe for SQL injection vulnerabilities are available for free or at a cost. However, available toolkits do not provide the application or its operators any direct way to detect when they are being victimized by an SQL injection attack. Thus, the application will not realize it has issued hostile commands to database server 1114, and database server 1114 has no way to know when the commands that it is receiving are unauthorized.

Unauthorized access may be detected based on an access not matching the usual source (e.g., location, Internet Protocol (IP) address, etc.), user credentials, time or date of the access, and the like. Specific tables or columns in the database being accessed from an unusual source or user, at an unusual time or date, and/or in an unusual way (e.g., changing an object which is normally only read) constitute another form of security threat. The response database server 1114 provides to a given request varies, but aspects of the response—such as the number of rows returned or an error being returned—may also indicate unauthorized activity.

Existing systems that attempt to perform these functions are plagued with a very high number of false-positive threat indications. This makes them unusable in practice.

SUMMARY

Accordingly, systems and methods are disclosed for detecting and mitigating unauthorized access to structured data storage and processing systems (e.g., which utilize SQL for operations). In an embodiment, an active or passive or inline feed of network traffic may be received. For example, such an embodiment may utilize the traffic feed disclosed in the '579 Application, and discussed below. The systems and methods may discover one or more database servers on one or more networks based on the received network traffic, learn behaviors of application(s) based on the discovered database server(s), and evaluate ongoing usage of the application(s) to discover breaches or attempted breaches of server security. Any detected breaches can be reported to an operator with detailed forensic data. Alternatively or additionally, the threatening activities can be blocked.

In an embodiment, a method for detecting threats on a network is disclosed. The method comprises: capturing target network traffic being transmitted between two or more hosts, wherein the target network traffic comprises a plurality of packets; and using at least one hardware processor to assemble the plurality of packets into one or more messages, parse the assembled one or more messages to generate a semantic model of the target network traffic, wherein the semantic model comprises one or more representations of one or more operations or events represented by the one or more messages, generate one or more scores for the one or more operations or events using a plurality of scoring algorithms, and identify one or more potentially threatening ones of the one or more operations or events based on the one or more scores.

In another embodiment, a system for detecting threats on a network is disclosed. The system comprises: at least one hardware processor; and one or more executable modules that, when executed by the at least one hardware processor, capture target network traffic being transmitted between two or more hosts, wherein the target network traffic comprises a plurality of packets, assemble the plurality of packets into one or more messages, parse the assembled one or more messages to generate a semantic model of the target network traffic, wherein the semantic model comprises one or more representations of one or more operations or events represented by the one or more messages, generate one or more scores for the one or more operations or events using a plurality of scoring algorithms, and identify one or more potentially threatening ones of the one or more operations or events based on the one or more scores.

In another embodiment, a non-transitory computer-readable medium having one or more instructions stored thereon for detecting threats on a network is disclosed. The one or more instructions, when executed by a processor, cause the processor to: capture target network traffic being transmitted between two or more hosts, wherein the target network traffic comprises a plurality of packets; assemble the plurality of packets into one or more messages; parse the assembled one or more messages to generate a semantic model of the target network traffic, wherein the semantic model comprises one or more representations of one or more operations or events represented by the one or more messages; generate one or more scores for the one or more operations or events using a plurality of scoring algorithms; and identify one or more potentially threatening ones of the one or more operations or events based on the one or more scores.

In a further embodiment, generating the semantic model of the target network traffic comprises generating one or more language-independent representations of one or more operations or events represented by the one or more messages. Additionally, each of the one or more language-independent representations of one or more operations or events may identify one or more of a session, a user, a database server, a type of operation or event, a lexical structure of one or more messages associated with the operation or event, a parse structure of the one or more messages associated with the operation or event, a semantic structure of the one or more messages associated with the operation or event, and timing data related to the operation or event.

In a further embodiment, parsing the one or more messages to generate a semantic model of the target network traffic comprises: lexically analyzing the assembled one or more messages into a plurality of dialect-independent tokens; parsing one or more sequences of the plurality of tokens into one or more parse trees comprising a plurality of parse nodes; and semantically analyzing the one or more parse trees to generate one or more dialect-independent semantic representations of the one or more operations or events.

In a further embodiment, generating one or more scores for the one or more operations or events using a plurality of scoring algorithms comprises: traversing the one or more parse trees to identify one or more operations or events; generating a first score for at least one of the one or more operations or events using a first one of the plurality of scoring algorithms; generating a second score for the at least one operation or event using a second one of the plurality of scoring algorithms, wherein the second algorithm is different than the first algorithm; and computing a total score for the at least one operation or event based, at least in part, on the first score and the second score.

In a further embodiment, one or more representations of acceptable network traffic are received; and each of one or more of the plurality of scoring algorithms are trained to score target operations or events using the one or more representations of acceptable network traffic.

In a further embodiment, the one or more representations of acceptable network traffic comprise a plurality of representations of acceptable operations or events, and training at least one of the one or more scoring algorithms to score target operations or events using the one or more representations of acceptable network traffic comprises: parsing the plurality of representations of acceptable operations or events into a plurality of parse trees; and generating a pattern-matching tree that is an isomorphism between two or more of the plurality of parse trees and represents a unification of the two or more parse trees.

In a further embodiment, generating one or more scores for the one or more operations or events using a plurality of scoring algorithms comprises generating a score for a target operation or event using the at least one scoring algorithm by: parsing a representation of the target operation or event into a target parse tree; computing a tree-edit distance comprising a minimum number of edits necessary to unify the target parse tree with the pattern-matching tree; and, based on the tree-edit distance, generating a scalar value indicating a probability that the target operation or event represents a malicious attack or nominal application variability.

In a further embodiment, training at least one of the one or more scoring algorithms to score target operations or events using the one or more representations of acceptable network traffic comprises generating one or more profiles of normal network traffic, wherein the one or more profiles of normal network traffic comprise one or more of a normal number of rows returned by an operation, a normal execution time of an operation, one or more normal parameter values for an operation, one or more normal types of content returned by an operation (e.g., to identify a return content comprising Social Security numbers and/or credit card numbers as a potentially threatening operation or event), a normal execution time of an operation for a certain time period (e.g., certain hour(s) of a day, certain day(s) of a week, etc.), a normal frequency of an operation for a certain time period (e.g., certain hour(s) of a day, certain day(s) of a week, etc.), an identifier of an application, and a model of normal execution semantics for an operation. For example, a model of normal execution semantics for an operation may be built on the specific detailed execution semantics for a database server, so that access to specific objects within the database in ways, at times, and/or with frequencies that are outside the learned behavioral norm represented by the model may be scored and/or identified.

In a further embodiment, training the one or more scoring algorithms comprises, for each of the one or more scoring algorithms, generating a model, for scoring operations or events, using the one or more representations of acceptable network traffic.

In a further embodiment, at least one of the trained one or more scoring algorithms determines whether a structural signature of a target operation within the target network traffic matches the structural signature of an acceptable operation, learned during training of the at least one scoring algorithm, to generate a score for the target operation. In addition, the at least one trained scoring algorithm determines a minimum edit distance between a structure of the target operation and a structure of the acceptable operation, and wherein the minimum edit distance represents a minimum number of insertions required to create the structure of the target operation from the structure of the acceptable operation. The target operation may comprise a structured query language (SQL) statement. Furthermore, the at least one trained scoring algorithm may maintain a set of one or more templates of acceptable SQL statements.

In a further embodiment, at least one scoring algorithm comprises a first scoring algorithm, and a second one of the plurality of scoring algorithms: determines a background frequency of lexical errors within one or more acceptable operations learned during training of the first scoring algorithm; identifies one or more lexical errors within a target operation within the target network traffic; and computes a probability that the one or more lexical errors within the target operation are in accordance with the background frequency of lexical errors within the one or more acceptable operations learned during the training of the first scoring algorithm.

In a further embodiment, at least one of the plurality of scoring algorithms searches a target operation within the target network traffic for one or more segments of structured query language (SQL) that potentially indicate an attack. The one or more segments of SQL may represent potentially one or more SQL injections. Alternatively or additionally, the one or more segments of SQL may represent potentially one or more time-consuming SQL clauses. Furthermore, each of the one or more segments of SQL may be associated with one or more performance parameters, and the at least one scoring algorithm may calculate an estimated performance metric for the target operation based on the one or more performance parameters associated with any of the one or more segments of SQL identified within the target operation.

In a further embodiment, at least one of the plurality of scoring algorithms parses a structured query language (SQL) statement into a plurality of segments, and determines whether the plurality of segments satisfy one or more criteria.

In a further embodiment, assembling the plurality of packets into one or more messages comprises: synchronizing the plurality of packets; sorting each of the plurality of packets into one of two host queues according to the transmission direction of the packet; processing the two host queues into a single push queue by alternately processing the packets in one of the two host queues until a packet is encountered which cannot be disposed of or the host queue is empty and then processing the packets in the other one of the two host queues until a packet is encountered that cannot be disposed of or the host queue is empty; if loss of a packet is detected, generating a synthetic gap packet to stand in for the lost packet; and bundling packets in the single push queue into the one or more messages, wherein each of the one or more messages is a request message or a response message. The synthetic gap packet may comprise an indication that it is a stand-in for a lost packet.

In a further embodiment, one or more identified potentially threatening operations are prevented from being performed on a database that is accessible to one of the two or more hosts.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
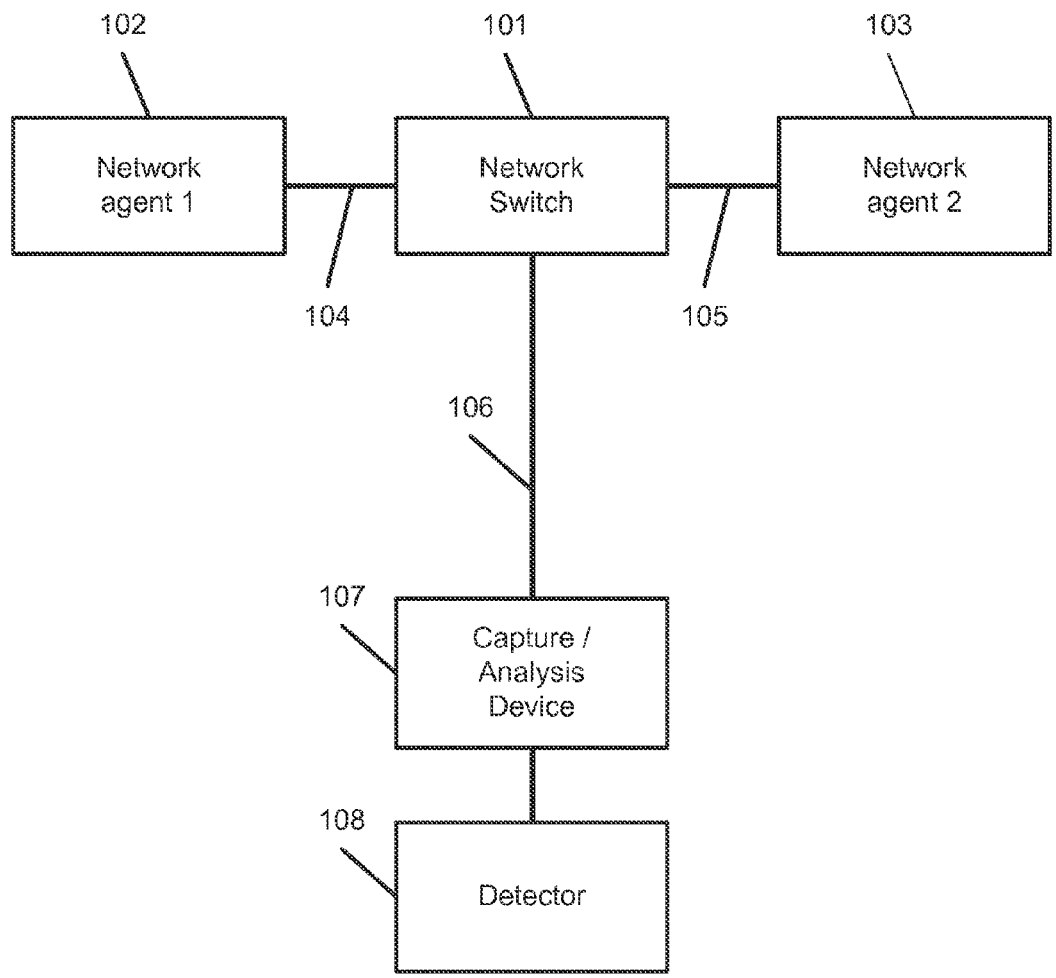
FIG. 1 illustrates an example architectural environment in which traffic between network agents may be captured for analysis, according to an embodiment.

Systems and methods are disclosed for generating a detailed semantic model or description of operations between two or more network agents. In an embodiment, the disclosed systems and methods are applied to network sessions comprising device interactions that are synchronous at the application layer. This includes, without limitation, remote procedure calls (RPCs) or similar request-and-response interactions, such as those utilizing Hypertext Transfer Protocol (HTTP). In these interactions, a first device transmits a request to a second device through one or more networks, and the second device returns a response to the first device via the one or more networks. Both the request and the response may comprise one or more packets transmitted between the devices. The packet-level flow between the request and response may overlap temporally (from the perspective of either device or a network-mirroring device) and/or may be collected from multiple points within the network architecture. In an embodiment, multiple network sessions between communicating network agents may generate packets that interleave arbitrarily without affecting operation of the disclosed systems and methods.

According to an embodiment, the systems and methods extract a model or description of semantic operations performed between two network agents from an imperfect copy of the network packet traffic exchanges between the network agents. This model may include, without limitation, raw performance data on each operation, descriptive metadata (e.g., query string, data types, data sizes, etc.), and/or actual data. When traffic is missing, out of order, or the exact specification of the traffic is unknown, a partial model of operations may still be generated and used at an application-layer level, and the framework of a session may be resynchronized based on a change in direction of data flow (e.g., between request and response messages).

Database queries or operations that update the data in a database may be serviced quickly or slowly by a database server, depending on the complexity of the data query or update operation, the instantaneous load being experienced by the database server, or by other factors which may be beyond the database server itself (e.g., the storage system, a varying virtual central processing unit (CPU) allotment, etc.). In an embodiment, by observing the time lag between a specific request and response, using the descriptive metadata (e.g., Structured Query Language (SQL) query string), and by observing the content and format of the data itself, the performance of many operational aspects of the database server can be determined in real time. In addition, the nature of data and actual data being updated or retrieved is latent in the network data packets flowing bi-directionally between a client system and server. By observing this traffic, inappropriate attempts to extract or change parts of the database may be detected. In an embodiment, semantics of the operations between a client system and server are extracted and analyzed using a copy of the existing traffic. Based on this analysis, traffic may be modified to accelerate or otherwise improve performance and/or mitigate against various forms of attacks.

In an embodiment, a capture component is placed within a network topology, such that it is exposed to traffic transmitted between the plurality of network agents to be analyzed. Observed packets may be copied and transmitted to a filter component via a series of network links and/or buffer stages. The filter component may then discard packets that are not related to the network agents and/or applications being analyzed. The remaining packets may be passed to a reassembly component, which builds a representation of the byte stream for each network session using sequence data and other descriptive data in the packets and/or the time of receipt of the packets.

Once the representation of the byte stream for a session is built by the reassembly component, it may be passed to an application-layer analysis component. The analysis component may unpack the contents of the byte stream into the request and response data and descriptions to generate a semantic operation model of the traffic. This semantic model may be used by an application-specific component, which uses the semantic model to detect security and performance issues and/or mitigate detected breaches of a security policy.

It should be understood that the capture component, filter component, reassembly component, application-layer analysis component, application-specific component and any other components or modules discussed herein may be implemented in hardware, software, or both hardware and software, and may be separate or integrated components. For instance, the filter component, reassembly component, application-layer analysis component, and application-specific components may be software modules executing on hardware of a capture device or on a separate device that is communicatively coupled to the capture device.

I. Reassembly

1. Layers Overview

At the outset, the layers of the Open System Interconnection (OSI) model will be described. The OSI model defines a networking framework to implement protocols in seven layers. A layer serves the layer above it and is served by the layer below it.

Layer 7: Application Layer. This layer supports applications and end-user processes. The application layer interacts with software applications that implement a communication component. Functions of the application layer include identifying communication partners, determining resource availability, and synchronizing communications.

Layer 6: Presentation Layer (or Syntax Layer). This layer translates between application formats and network formats in order to provide independence from differences in data representations (e.g., encryption). The presentation layer transforms data from the network into a form that the application layer can understand, and formats and encrypts data from an application to be sent across a network.

Layer 5: Session Layer. This layer controls the connections between computers. It establishes, manages, and terminates connections between applications. The session layer is commonly implemented explicitly in application environments that use RPCs.

Layer 4: Transport Layer. This layer provides transparent transfer of data between network agents, and is responsible for end-to-end error recovery, segmentation and de-segmentation, and flow control. Flow control involves determining whether data is coming from more than one application, and integrating each application's data into a single stream for the physical network. The transport layer ensures complete data transfer.

Layer 3: Network Layer. This layer provides the functional and procedural means of transferring variable length data sequences from a source host on one network to a destination host on a different network, while maintaining the quality of service requested by the transport layer. It creates logical paths for transmitting data from node to node. It provides switching, routing, forwarding, addressing, internetworking, error-handling, congestion-control, and packet-sequencing functions. The network layer determines the way that data will be sent to a recipient agent.

Layer 2: Data Link Layer. This layer provides the functional and procedural means to transfer data between network agents and to detect and possibly correct errors that may occur in the physical layer. The data link layer encodes and decodes data packets, provides transmission protocol knowledge and management, and handles errors in the physical later, as well as flow control and frame synchronization. It assigns the appropriate physical protocol to data and defines the type of network and packet-sequencing. The data link layer is subdivided into a Media Access Control (MAC) layer and a Logical Link Control (LLC) layer. The MAC layer controls how a network agent gains access to data and the permission to transmit data. The LLC layer controls frame synchronization, flow control, and error-checking.

Layer 1: Physical Layer. This layer defines the electrical and physical specifications for devices. It conveys the bit stream (e.g., via electrical, light, or radio signal) through the network at the electrical and/or mechanical level. The physical layer provides the hardware means of sending and receiving data on a carrier, including defining cables, cards, voltage levels, timing, and other physical aspects.

2. System Overview

FIG. 1 illustrates an example system for capturing and analyzing interactions between two or more network agents, according to an embodiment. The system may comprise a set of one or more capture-and-analysis devices (e.g., servers) 107 which host and/or execute one or more of the various functions, processes, and/or software modules described herein. In addition, device(s) 107 are communicatively connected to a device, such as network switch 101, via a communicative path 106. Network switch 101 is positioned on a network path 104/105 between a first network agent 102 and a second network agent 103. The network comprising network path 104/105 may comprise any type of network, including an intranet and/or the Internet, and network agents 102 and 103 may communicate using any standard and/or proprietary protocols. For instance, network agents 102 and 103 may communicate with each other through the Internet using standard transmission protocols, such as HTTP, Secure HTTP (HTTPS), File Transfer Protocol (FTP), and the like.

In an embodiment, capture-and-analysis device(s) 107 may not be dedicated device(s), and may instead be cloud instances, which utilize shared resources of one or more servers. It should be understood that network agents 102 and 103 and capture-and-analysis device(s) 107 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, Automated Teller Machines, and the like. Network agent 102, network agent 103, and/or device(s) 107 may also comprise or be communicatively coupled with one or more databases, such as a MySQL, Oracle™, IBMT™, Microsoft™ SQL, Sybase™, Access™, or other types of databases, including cloud-based database instances. In addition, while only two agents 102 and 103, one switch 101, and one set of capture-and-analysis device(s) 107 are illustrated, it should be understood that the network may comprise any number of agents, switches, and capture-and-analysis devices.

Figure 2:
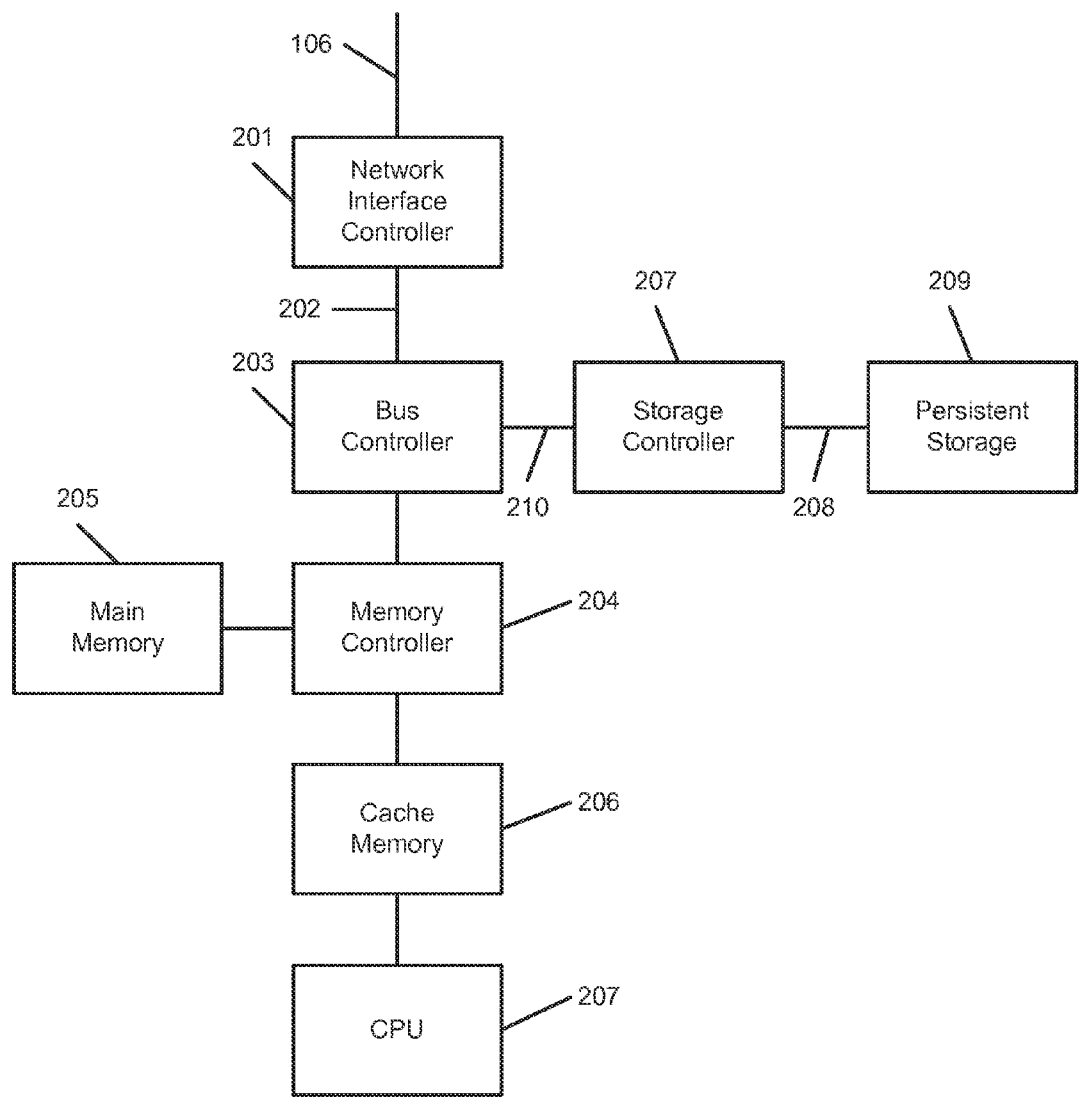
FIG. 2 illustrates an example hardware architecture for a capture-and-analysis device, according to an embodiment.

FIG. 2 illustrates an example hardware architecture for capture-and-analysis device(s) 107, according to an embodiment. The internal hardware architecture may comprise standard, commercially-available components. A copy or mirror of the traffic sent between network agents 102 and 103, which comprises network packets, may be received from network switch 101 via interface 106 (e.g., 1000BASE-T link) by a network interface controller (NIC) 201. A bus controller 203 may transfer packet data from NIC 201 via bus 202 (e.g., a Peripheral Controller Interface (PCI) bus) through memory controller 204 into main memory 205.

Memory controller 204 provides a path for CPU 207 to read data from and write data to main memory 205 via cache memory 206. CPU 207 may execute a program comprising software instructions stored in main memory 205 which implement the processes described herein.

Storage controller 207 may be connected via bus 210 to bus controller 203. Storage controller 207 may read and write data (e.g., a semantic model) and program instructions to a persistent storage device 209 via link 208. For example, storage device 209 may comprise a commercial one-terabyte Serial Advanced Technology Attachment (SATA) hard drive, and link 208 may comprise a SATA-II link. However, it should be understood that any storage device and associated interface may be used.

Figure 3:
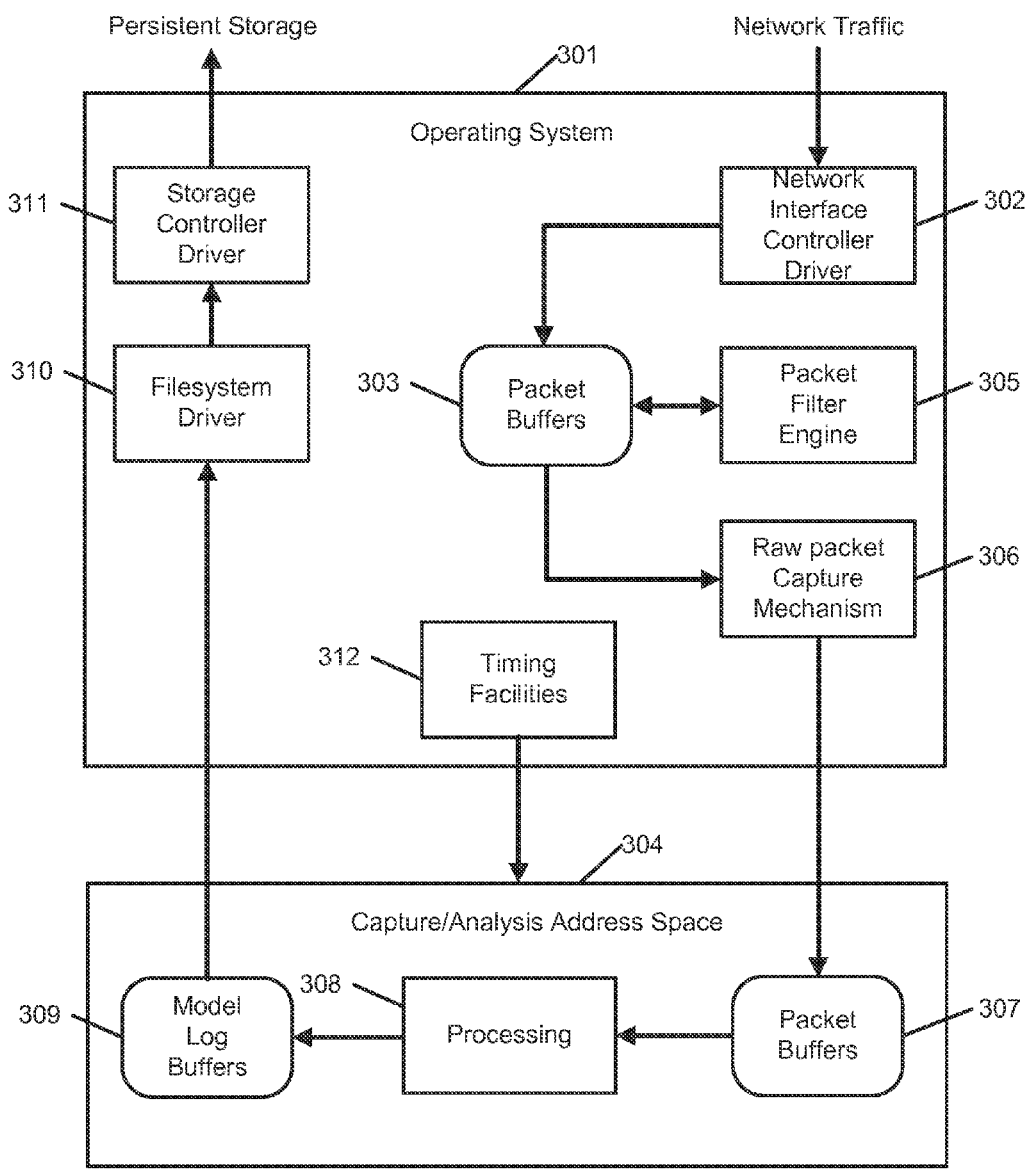
FIG. 3 illustrates an example software architecture for a capture-and-analysis device, according to an embodiment.

FIG. 3 illustrates an example high-level software architecture for capture-and-analysis device(s) 107, according to an embodiment. In this example, the architecture comprises an operating system kernel 301 (e.g., Linux 3.1) and related utilities which manage the physical hardware architecture described above. Software program or modules 304, which comprise the capture-and-analysis processes described herein, are copied into memory by operating system kernel 301. These modules 304 may then be executed by CPU 207 to analyze and process received packets, and generate a semantic model of the operations taking place between network agents 102 and 103.

Network interface controller driver 302 controls NIC 201 and marshals packets received on network link 106 into packet buffers 303 in main memory 205. Some packets may be discarded by a packet filter engine 305 under the direction of capture-and-analysis modules 304. For example, packet filter engine 305 may discard packets that are not related to specific protocols of interest to the model-building mechanism of modules 304, such as administrative traffic (e.g., Address Resolution Protocol (ARP)) or other broadcasts or traffic between network agents other than those of interest. Raw packet capture module 306 may then copy the retained packets into ingress packet buffer(s) 307 used by capture-and-analysis modules 304.

Capture-and-analysis modules 304 perform processing 308 (as described elsewhere herein) on the ingress packet traffic placed in packet buffers 307 to generate a semantic model of the operations taking place between network agents 102 and 103. This model may be incrementally placed into model log buffers 309, and then written by file system driver 310 (e.g., in the context of a Linux operation system, an Ext4 file system driver) and storage controller driver 311 to persistent storage device 209.

Kernel 301 may provide timing facilities 312 to the capture-and-analysis modules 304, so that they may interpret the packet traffic in buffers 307 during processing 308. Timing facilities 312 may include a mechanism to retrieve the current time of day at high resolution (e.g., microseconds or greater). Modules 304 may compare the time, retrieved from timing facilities 312, to timestamps written by network interface controller driver 302 into the packets as they are received. These timestamps may be used, for example, to determine when expected packets are to be considered lost by the reassembly and protocol-analysis code.

3. Packet Capture Mechanism

In an embodiment, packet traffic between network agents 102 and 103 is copied by a network mirror or Switched Port Analyzer (SPAN) tap mechanism. For example, a network switch 101 may be placed in the path 104/105 between network agents 102 and 103, such that all packets transmitted by network agent 102 to network agent 103, and vice versa, are transmitted through switch 101 via communication links 104 and 105. In an embodiment, network switch 101 may be a Layer 2 (i.e., the data link layer) network switch. Switch 101 may be configured to transmit a copy of all packets, received from both network agents 102 and 103 via network links 104 and 105, respectively, to capture-and-analysis device(s) 107 via communication link 106. Each of the network links 104, 105, and/or 106 may conform to the Institute of Electrical and Electronics Engineers (IEEE) 802.3ab (1000BASE-T) Ethernet standards.

In addition, one or more detectors 108, which may be local (e.g., executed on the same machine) or remote to capture-and-analysis device 107 (e.g., executed on separate machine(s) communicatively connected to capture-and-analysis device 107 via one or more networks), may be provided. Detector(s) 108 may process the output of capture-and-analysis device 107. For example, detector(s) 108 may utilize semantic descriptions of operations between network agents 102 and 103, generated by capture-and-analysis device 107, to create one or more higher-level models, including multiple layers of higher-level models and different types of higher-level models (e.g., models specific to a security application, a performance application, and/or for other types of applications). Modules of capture-and-analysis device 107 may interface with detector(s) 108 via one or more application programming interfaces (APIs).

Figure 7:
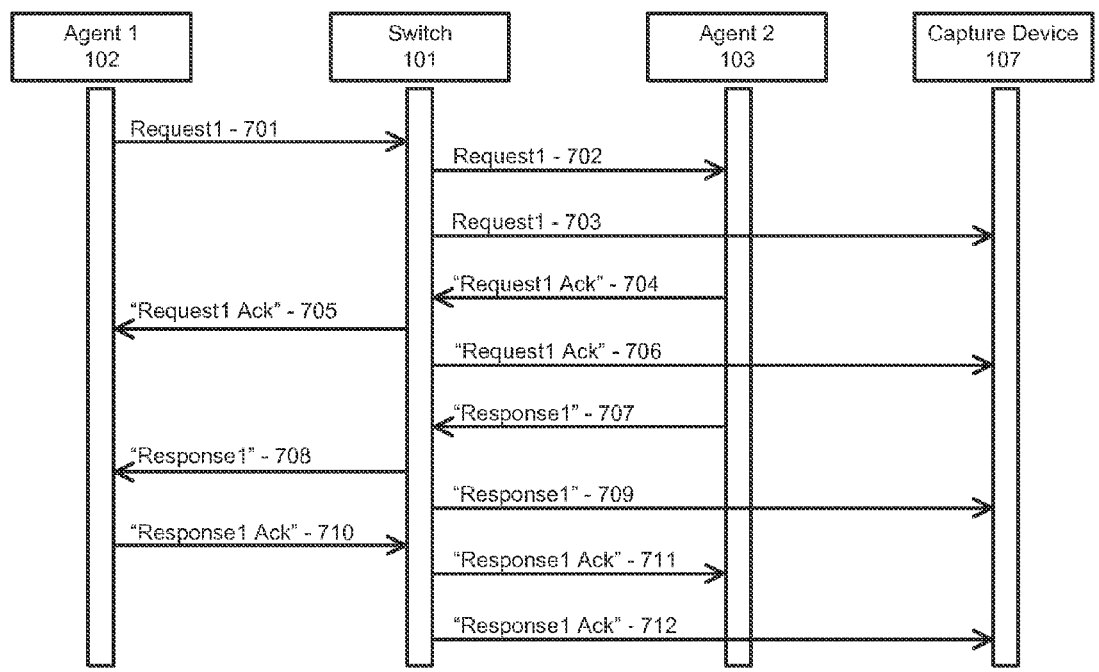
FIG. 7 is a ladder diagram illustrating packet interactions in a transaction from a perspective that is external to a capture-and-analysis device or module, according to an embodiment.

FIG. 7 illustrates an example request and response interaction between two network agents 102 and 103, according to an embodiment. The packets exchanged in the interaction may comprise an Ethernet header, Internet Protocol (IP) header, and TCP header. A request 701, which may comprise a complete Layer 7 request payload in one or more packets, can be transmitted from network agent 102 via link 104 to switch 101. Request 701 may be addressed to network agent 103. Accordingly, switch 101 transmits a copy 702 of request 701 on link 105 to network agent 103. However, switch 101 also transmits a copy 703 of request 701 on link 106 to capture-and-analysis device(s) 107.

Network agent 103 may send an acknowledgement 704 to network agent 102 via link 105. Acknowledgement 704 is received at switch 101, which is on the communication path 105/104 between network agents 103 and 102. Switch 101 sends a copy 705 of acknowledgement 704 on link 104 to network agent 102, and also transmits a copy 706 of acknowledgement 704 on link 106 to capture-and-analysis device(s) 107. Acknowledgement 704 may comprise one or more packets that indicate to network agent 102 that request 701 was received.

Network agent 103 may send a response 707 to network agent 102 via link 105. Response 707 is received at switch 101, which sends a copy 708 of response 707 on link 104 to network agent 102. Switch 101 also transmits a copy 709 of response 707 on link 106 to capture-and-analysis device(s) 107. Response 707 comprises one or more packets that form a response to request 701.

Network agent 102 may send an acknowledgement 710 to network agent 103 via link 104. Acknowledgement 710 is received at switch 101, which is on the communication path 104/105 between network agents 102 and 103. Switch 101 sends a copy 711 of acknowledgement 710 on link 105 to network agent 103. Switch 101 also transmits a copy 712 of acknowledgement 710 on link 106 to capture-and-analysis device(s) 107. Reception of acknowledgement copy 711 by network agent 103 completes a single application-level request-and-response cycle that began with the transmission of request 701 by network agent 102.

Figure 4:
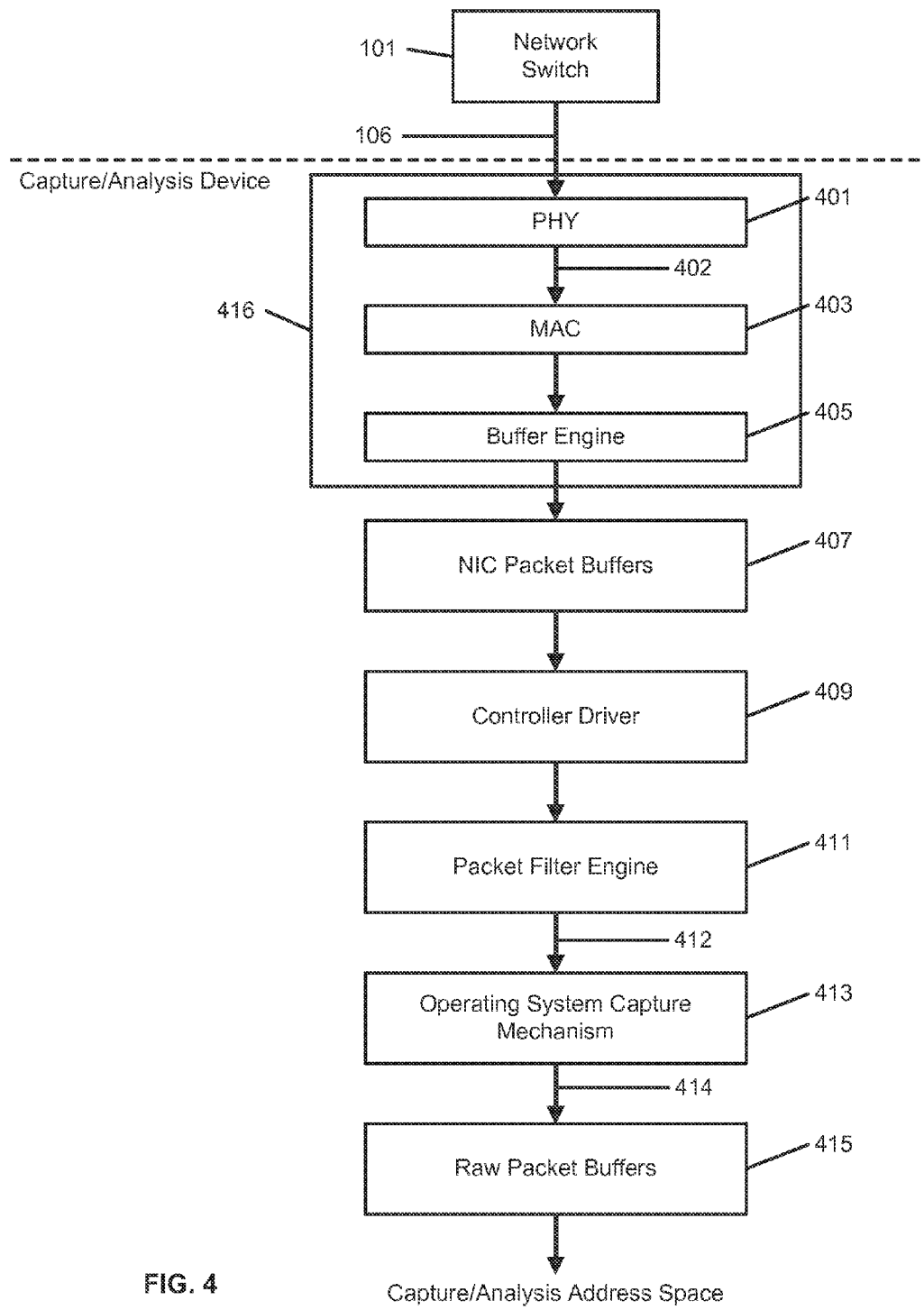
FIG. 4 illustrates example components and data flows related to capturing packet-level traffic and preparing the captured traffic for analysis, according to an embodiment.

FIG. 4 illustrates an example process for capturing a packet, according to an embodiment. In an embodiment, the processing of packets in capture-and-analysis device(s) 107 begins with a packet being received at NIC 416 or 302 from network switch 101 via link 106, which may be an Ethernet link. Electrical signals used on network link 106 may be demodulated, for example, by a Media Independent Interface (MII) for an Ethernet physical transceiver (PHY) 401. MII/PHY 401 may also recover data and clock information. The demodulated data and clock information may be passed as a digital bit stream 402 to a network MAC 403, which separates the stream into discrete packets and applies an error-correction code to verify that the packets have not been corrupted during transmission. Corrupted packets may be discarded during this phase. In an embodiment, network PHY 401 and MAC 403, along with their attendant interfaces, may be defined by IEEE 803.3ab (1000BASE-T) and/or related Ethernet standards, and may be implemented as part of a commercially available NIC.

In an embodiment, buffer engine 405 in NIC 416 assembles the data from MAC 403 into representations of the packets, and stores the representations in packet buffer(s) 407. Controller driver 409 (which may correspond to driver 302 in FIG. 3) passes the received packets stored in packet buffer 407 through a packet filter engine 411. Packet filter engine 411 may comprise or utilize instructions generated by a program which compiles an optimized packet filter from a high-level network description. The resulting packet filter discards packets that are not of interest to model-building process 308. What remains are TCP/IP packets that are intended for reception by the network agents of interest (e.g., network agents 102 and 103) and/or for specific TCP ports. The filter (e.g., the specific agents and/or TCP ports of interest) may be configured by a user of the system.

In an embodiment, the filter may comprise a set of one or more specifications or criteria, which may be specified via a user interface and/or as text lines in a configuration file. For example, a specification may include, without limitation, one or more IP addresses (e.g., defined as singletons or ranges), one or more TCP port numbers (e.g., defined as singletons or ranges), and/or one or more Virtual Local Area Network (VLAN) tags. In addition, each of the specifications may be positive or negative. A positive specification will keep or allow packets meeting the specification, whereas a negative specification will discard or deny packets meeting the specification. Implicit specifications may also exist. For instance, completely empty or non-TCP packets may be discarded without an explicit specification being established. For each packet, the set of specifications are processed in order until one of them matches the packet in question. Once a packet is matched to one of the specifications, the action specified (e.g., allow or deny) is enacted. Denied packets are discarded, while allowed packets are passed on to the next module in the analysis chain.

An operating system capture mechanism or facility 413 (e.g., in the case of a Linux operating system, AF_PACKET, version 2) may copy the packets remaining after the first-stage filter 411 into raw packet buffers 415. Raw packet buffers 415 may be shared with, or accessible by, the capture-and-analysis address space 304.

4. Packet Analysis

Packets placed in raw buffer 415 by operating system capture mechanism 413 are processed or analyzed by the programs or modules residing in the capture-and-analysis address space 304. In an embodiment, the result of this analysis is a semantic model of the operations between two network agents at Layer 7 (i.e., the application layer). For instance, this model may describe the database operations between a database client and a database server in terms of events and their surrounding contexts.

Figure 5:
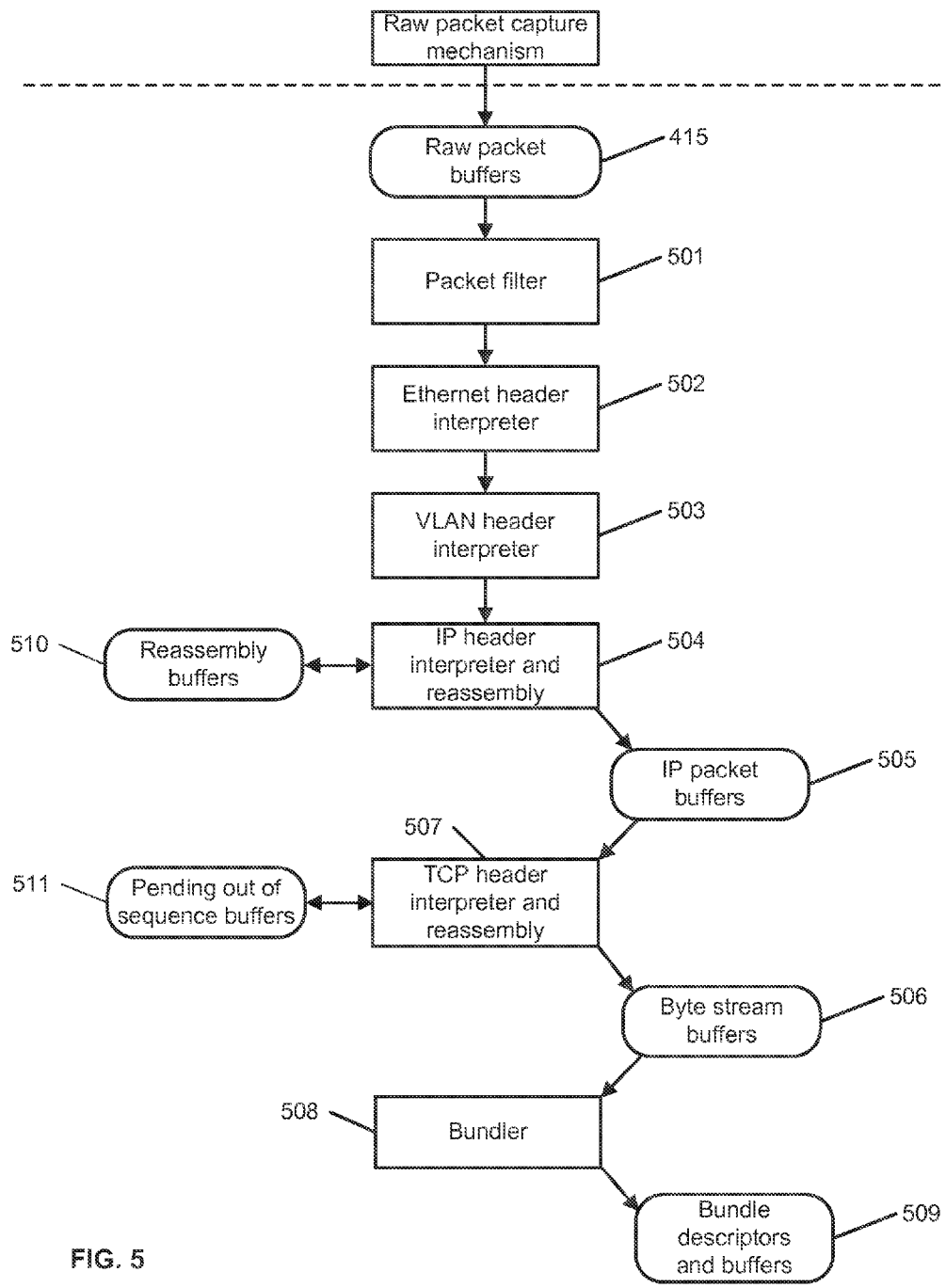
FIG. 5 illustrates example components and data flows related to reassembly of packet-level traffic into byte streams, request and response bundles, and ultimately a structured model of operations taking place between network agents, according to an embodiment.

In an embodiment, illustrated in FIG. 5, packets are processed by capture-and-analysis modules 304 after they are placed in raw packet buffers 415 by operating system capture mechanism 413. A second-stage packet filter 501 may be applied to discard non-TCP packets that were not previously discarded by in-kernel first-stage filter 411. Filter 501 may also discard TCP control packets (e.g., packets with all flags set) that are not used or are harmful to the reassembly process, but can not be easily removed by first-stage filter 411. Notably, in an embodiment, first-stage filter 411 is intended to run with very little state or configuration information, whereas second-stage filter 501 has access to broad real-time state provided by higher layers.

Examples of packets that may be harmful include those that indicate unusual or unexpected conditions in TCP state. For instance, a "Christmas tree" packet with all control bits set may cause the internal state machine of the TCP stack to misinterpret the packet and use the data in it. This data may potentially hide an attack in a properly formatted packet received around the same time. As another example, harmful packets may include a packet that duplicates the TCP sequence space of a previous packet. Sending both sets of data for processing by a higher layer would cause the higher layer to see the invalid data. Other examples of harmful packets are packets with invalid checksums or length fields. These may be misinterpreted by higher layers, causing them to read un-initialized storage space (e.g., a buffer-overrun type of attack). As yet another example, packets deemed by a higher layer to not be of interest may be harmful. Such packets are identified by their source/destination IP/port and VLAN tuple, and this identification changes dynamically. It is not practical to recompile a specific filter every time a higher layer identifies a TCP connection as "uninteresting," so the filtering is done in a place where dynamic state is available.

In an embodiment, an Ethernet header interpreter 502 determines the end of the Ethernet header. Ethernet header interpreter 502 may then discard packets that are not tagged as IP unicast or VLAN (e.g., according to IEEE 802.1Q). For instance, multicast packets may not be of interest and can drain resources needed to handle a high-load situation, whereas VLAN-tagged packets may need to be kept so that the underlying "unicast" header and other headers can be extracted from them in order to decide whether or not they should be kept. A VLAN header interpreter 503 may extract the VLAN identifier as an identifier attribute on the final model for packets with a VLAN header. The extracted VLAN header may be used to associate a packet with a TCP connection. A TCP connection, in this context, may be identified by a tuple of source IP, destination IP, source TCP port, destination TCP port, VLAN identifier, and/or physical receive port. The use of the VLAN identifier and receive port allows the system to differentiate traffic seen on different virtual or real networks that may be using cloned, identical IP configurations. VLAN header interpreter 503 may also discard any VLAN-tagged packets that are not IP.

In an embodiment, an IP interpreter and reassembler 504 (which may be compliant with Request for Comments (RFC) 791) extracts the source address and destination address from packets, and reassembles sequences of fragmented IP packets into single IP packets in IP packet buffers 505. Fragments of IP packets may be held in reassembly buffers 510 until either all other fragments for the IP packet are received or a timeout occurs. If a timeout occurs, all fragments for the IP packet may be discarded, or, alternatively, assembled as incomplete and optionally marked as incomplete. A short timeout on packets held for reassembly can ensure that memory usage is kept in check in a fragmented environment with high packet loss.

Completed IP packets in IP packet buffers 505 may be processed by a TCP header interpreter and stream reassembler 507 (which may be compliant with RFC 793). TCP header interpreter and stream reassembler 507 may sort IP packets into streams of data per TCP connection and data direction (e.g., from agent 102 to agent 103, or from agent 103 to agent 102), and store the sorted IP packets in byte stream buffers 506. In other words, TCP header interpreter and stream reassembler 507 may maintain a byte stream buffer 506 for each TCP stream direction. Out-of-sequence data may be held in pending data buffers 511. As in-sequence data for a given TCP stream direction is identified, it may be appended to the corresponding byte stream buffer 506. The data in byte steam buffers 506 hold ordered, contiguous, and non-duplicated payload data for each specific TCP session in each specific direction. As in-order TCP data is added to a connection-specific byte stream buffer 506, a bundler 508 may be notified. Bundler 508 is also notified if a message boundary is detected (e.g., from a control packet, from a change in direction of traffic, or from a timeout that indicates that no additional data has been received on a stream for a predetermined period of time).

Thus, pre-Layer 7 processing starts with raw Ethernet packets, and ends with byte stream buffers and an event stream which describes notable events in a session. For example, the notable events in a TCP session may comprise an indication that in-order TCP data has been added to the byte stream buffer corresponding to the TCP session, an indication that no additional data has been added after a timeout period, or an indication that a TCP control message has been received which closes the session. The byte and event streams may be passed to bundler 508, which commences the Layer 7 portion of the analysis process.

5. Application Layer Processing 5.1. Bundling

A "bundle" is a complete request message or a complete response message at the application layer. Bundler 508 may use several strategies to determine the boundaries of a bundle (e.g., using control packets, data direction, or timeouts) and send a bundle of data on to the protocol analysis modules. For instance, boundary determination methods may comprise one or more of the following:

(1) Data Direction: in-sequence data received from the reassembler for a single session will change directions, for example, at the boundary between the request message and the response message. This change of direction may be used to indicate an end-of-message boundary. For example, a change of direction may be used to indicate an end to request message 701 and/or the beginning of an acknowledgement message 704 or response message 707. Thus, the very nature of request-and-response interactions may be used to place markers in a data stream to indicate message boundaries (or otherwise indicate message boundaries) that could not have otherwise been deduced without perfect knowledge and capturing.

(2) Reassembler Activity Timeout: at the end of a message, where no additional traffic is immediately forthcoming (e.g., typically a response), a time tick from the reassembler or an expiration of a timer may be used to indicate an end-of-message boundary. For example, the occurrence of a timeout, following receipt of a packet of response message 707, may be used to indicate and end to response message 707.

(3) Reassembler Missing Segment: if a segment of a message is missing, a timeout may be used to indicate a message boundary. A missing message segment may represent a TCP packet which should have been received with payload from the middle of a request or response stream. An incomplete message may be marked as incomplete. In many cases, protocol handlers can still extract sufficient data from the incomplete message to build a model. For example, an expiration of a timer or an occurrence of a timeout, following receipt of a prior segment or other event which results in an expectation of the missing segment, may be used to indicate an end to a request or response message. The incomplete request or response message may be marked as incomplete. An interpreter (e.g., TNS protocol interpreter 601 and/or TTC protocol interpreter 602) may use a detected gap, resulting from packet loss, to determine if it can extract data, and how much data it can extract from the data that it has, without having to receive all of the data.

In an embodiment, bundler 508 provides bundles of in-sequence unidirectional application traffic and associated descriptive data to an application protocol interpreter (e.g., interpreter 601). Bundler 508 needs no knowledge of the application protocol specification, and may pass incomplete traffic (i.e., bundles with one or more regions of missing in-sequence data) to the application protocol interpreter if segments or packets were lost.

Figure 8:
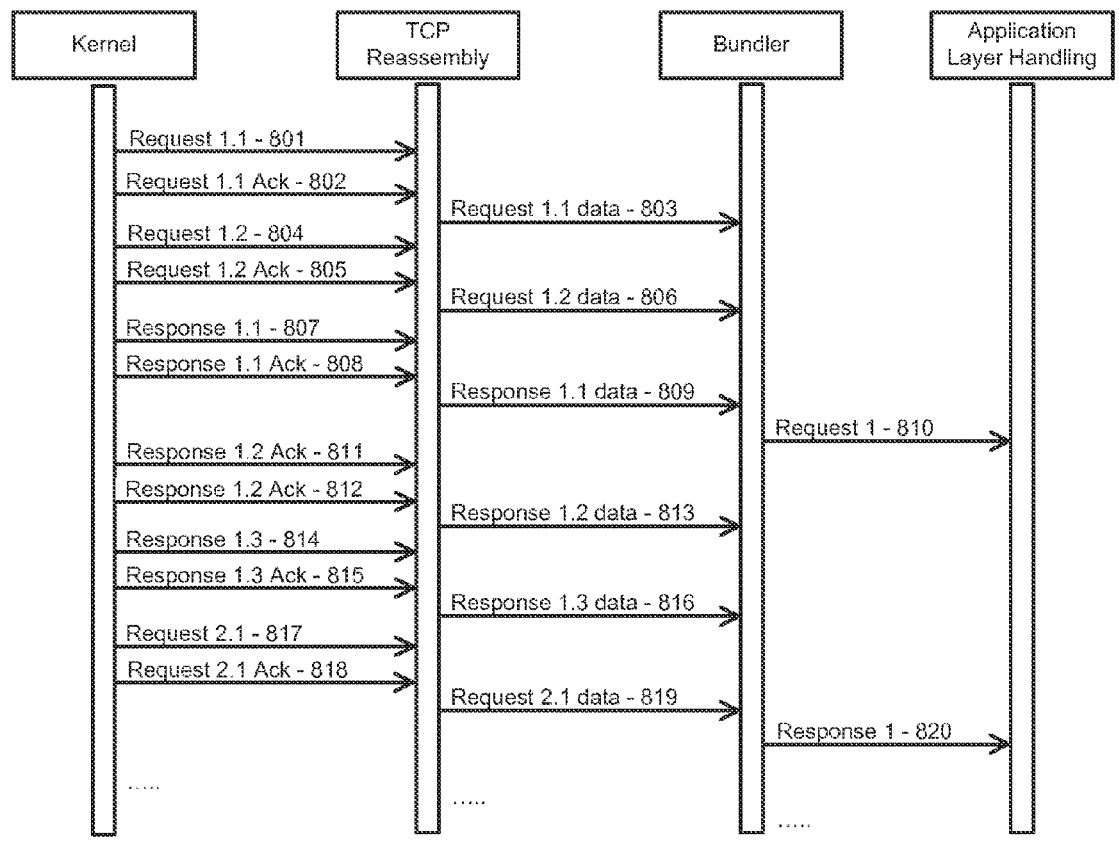
FIG. 8 is a ladder diagram illustrating packet processing for a transaction from a perspective that is internal to a capture-and-analysis device or module, according to an embodiment, wherein the elements of the first request (e.g., elements 801 and 803) represent packets, the elements of the first request data (e.g., elements 803 and 806) represent contiguous streams of byte data, and the first request 810 represents a bundle of stream data that corresponds to message boundaries.

FIG. 8 illustrates an example of a process for bundling a request message and response message from raw packets placed into raw packet buffers 415 by kernel 301. The packets presented to the analysis modules are those sent by switch 101. (Refer back to the description of FIG. 7 for an example of external packet handling.) In the example illustrated in FIG. 8, the first request requires two payload packets (numbered 1.1 and 1.2) and three response packets (numbered 1.1, 1.2, and 1.3).

In an embodiment, the TCP reassembly phase illustrated in FIG. 8 comprises processing by second-stage packet filter 501, Ethernet header interpreter 502, VLAN header interpreter 503, IP header interpreter and reassembler 504, and TCP header interpreter and reassembler 507. The arrows showing request and response data, provided by the TCP reassembler 507 to bundler 508, represent the byte stream buffers 506. The full request and response data, resulting from bundler 508, comprise bundle descriptors and buffers 509. Bundle descriptors and buffers 509 provide the output of bundler 508 to the first stage of Layer 7 protocol interpretation (e.g., TNS protocol interpreter 601 in an Oracle™-specific context).

In the message flow illustrated in FIG. 8, the first request segment 801 of the request transmitted from network agent 102 and the first segment 802 of the acknowledgement (ACK) transmitted from network agent 103 are received. Reassembly renders the payload of first segment 801 as a stream of request data 803 to bundler 508. This provision of the payload of first segment 801 may be provided before reception of ACK 802, or may be provided after reception of ACK 802 which indicates that first request segment 801 was successfully received by network agent 103. In addition, the ACK messages may be used by the reassembler to shortcut the timeout process. For instance, if an ACK message is seen for a payload packet that was not witnessed, it is likely that the missing packet was lost in the capture path. In either case, when bundler 508 receives first request data 803, there is no indication yet that the message is complete. Thus, bundler 508 queues first request data 803.

The second and final request segment 804 of the request from network agent 102 and the corresponding ACK 805 from network agent 103 are then received by the reassembler. The reassembler appends this second request segment 804 in sequence to the current stream of request data to bundler 508, and provides the payload data 806 of second request segment 804 to bundler 508. Since bundler 508 still has no indication that the message is complete, bundler 508 queues second request data 806. In other words, bundler 508 appends second request data 806 to first request data 803.

In the illustrated example, network agent 103 formulates a three-segment response to the request from network agent 102. The first segment 807 of the response from network agent 103 and the corresponding ACK 808 from network agent 102 are received. The reassembler provides the payload data 809 for first response segment 807 to bundler 508. Bundler 508 detects that the direction of traffic has changed, and determines that the previous message bundle it was collating is now complete. Thus, bundler 508 sends this message bundle 810 (i.e., the full request from network agent 102 to network agent 103 comprising request data 803 and 806) to a Layer 7 protocol interpreter for further analysis.

The additional two segments 811 and 814 of the response from network agent 103 to network agent 102, and the corresponding ACK messages 812 and 815, are received. Second response segment 811 and third response segment 814 are processed into data streams 813 and 816, respectively, and provided to bundler 508. Bundler 508 collates first response data 813 and second response data 816 (i.e., appends data 813 and 816 to data 809), but does not yet pass them on to the Layer 7 protocol interpreter.

Next, a first segment 817 of a second, new request from network agent 102 to network agent 103 and the corresponding ACK 818 are received. The reassembler sends the request data 819 from request segment 817 to bundler 508. Bundler 508 detects that the direction of data transmission has changed, and issues the complete response 820 (i.e., comprising response data 809, 813, and 816), corresponding to the first request, to the Layer 7 protocol interpreter.

5.2. Application Protocol Decoding

Bundles 509, representing requests and responses, are processed by higher-level protocol processing to build a semantic model of the operations taking place between the two network agents 102 and 103. While this higher-level protocol processing may sometimes be described herein in the context of an Oracle™ client-server connection, it should be understood that this description is merely illustrative. The systems and methods disclosed herein may be applied to or generalized for other applications and contexts as well.

In an example embodiment specific to an Oracle™ client-server connection, a Transparent Network Substrate (TNS) protocol interpreter 601 may be provided which unpacks the procedure call and response payloads and asynchronous messages from TNS wrapper structures found in bundles 509. TNS is a multiplexing and asynchronous message wrapper protocol used by the Oracle™ client-server protocol. It should be understood that alternative or additional interpreters may be used for other protocols. For instance, Microsoft™ SQL Server uses Tabular Data Stream (TDS) and Symmetric Multiprocessing (SMP) wrapper protocols, which may be abstracted similarly to TNS. LDAP, MySQL, and Postgresql each use header wrapper protocols. In addition, HTTP is a header/wrapper protocol for eXtensible Markup Language (XML) traffic or HyperText Markup Language (HTML) traffic. An interpreter can be constructed for any one or more of these protocols and used as an alternative or in addition to interpreter 601.

In addition, in an embodiment, a Two Task Common (TTC) protocol decoder or interpreter 602 may extract remote procedure verbs, parameters, and result payloads from each request bundle and response bundle. The TTC protocol provides character set and data type conversion between different characters sets or formats on a client and server.

Figure 9:
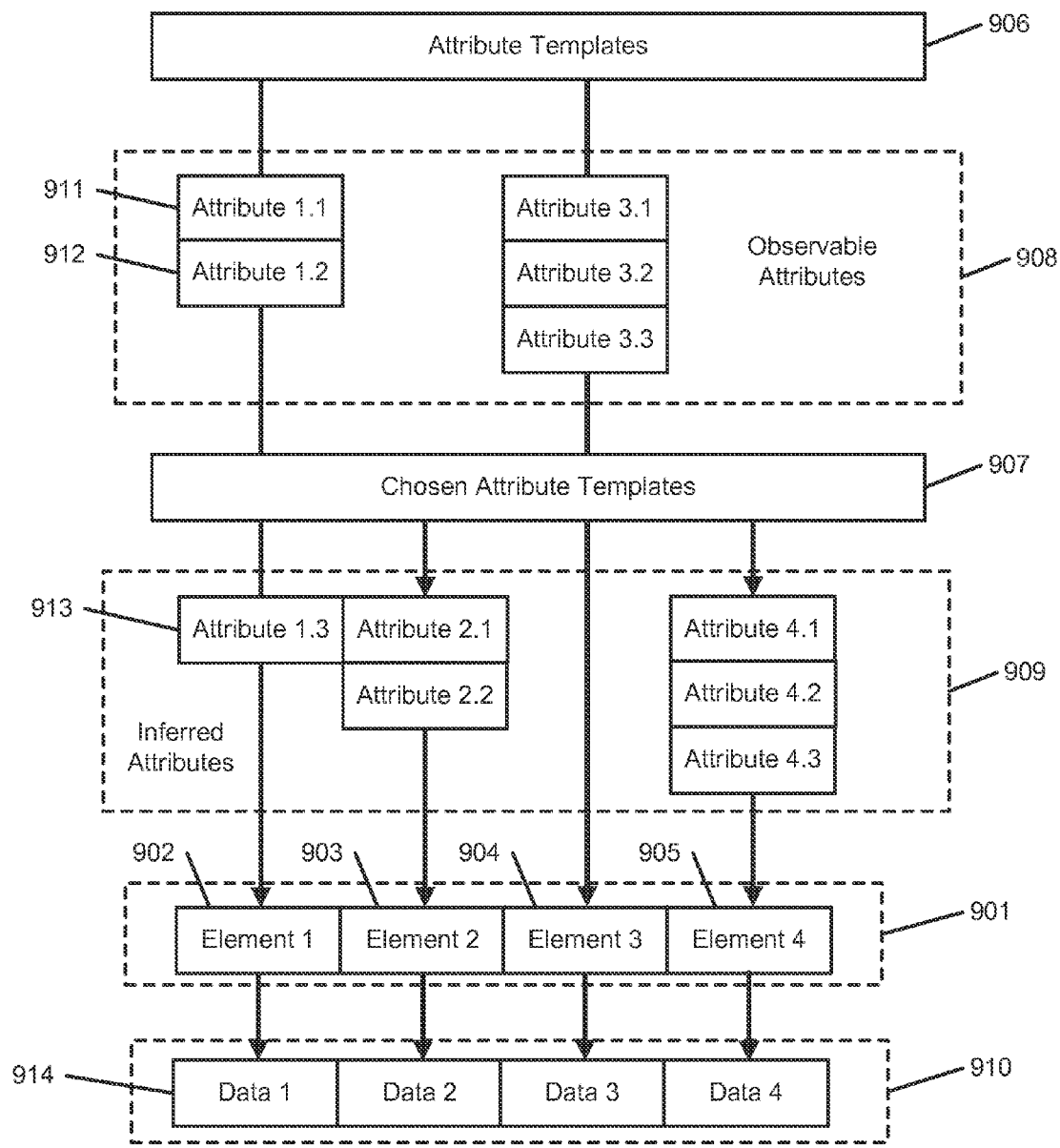
FIG. 9 illustrates an example data flow for application protocol matching, according to an embodiment.

Protocol template matching by a protocol interpreter (e.g., TTC protocol template matching by TTC protocol interpreter 602) will now be described with reference to FIG. 9. Messages processed by the protocol interpreter are made up of a sequence of elements 901 (e.g., RPC verbs, RPC parameters, RPC results, etc.), which are decoded by the interpreter into a data form 910 that is useful for building a model. The transformation from elements 901 to data 910 is controlled by a set of attributes 908 and/or 909, which may be specific to each element. Each message may contain a variable number of elements. For example, FIG. 9 illustrates four elements 902, 903, 904, and 905.

A library 906 of attribute templates may be created for each new protocol session by the protocol interpreter (e.g., TNS protocol interpreter 601 and/or TTC protocol interpreter 602). Library 906 may be created using pre-coded knowledge of the protocol in question, and may be selected as a subset of a larger library of attribute templates, for example, for one or more protocols available for all sessions. For a newly discovered or identified session, the template library 906 may be initially filled with a relatively small set of templates that match broad groups of protocol messages and refer to groups of more specific templates. Multiple templates in the library of attribute templates may match any given message. Thus, in an embodiment, templates may be ordered in the library such that more exact matches are checked by the protocol interpreter before less exact ones. A more exact match will more fully describe a message than a less exact match.

In an embodiment, templates provide characterizations of negotiated data types, RPC options, and client-server architectures. These characterizations may all be used to decode the individual fields of specific RPCs. This can be especially useful when the protocol is not fully specified or secret, or when the initial negotiation for a session cannot be observed. Among other things, template matching can be used to determine which side of a connection (e.g., TCP connection) is the client and which side of the connection is the server, when the start of a communication cannot be observed.

Each template in library 906 contains a list of one or more attributes that may be applied to elements of a message (e.g., an RPC request or response message). For example, a template that matches example message 901 would apply to the elements 902, 903, 904, and 905 of message 901. The matching template can be used to decode message 901 into data 910, which is usable by model generator 604. Each template in library 906 may also contain one or more references to additional templates or a reference to a list of additional templates.

In an embodiment, a template may comprise a set of dynamic runtime classes (e.g., written in C++ code). The templates or "marshallers" are configured to pull specific patterns of data out of the stream and compose valid data. One example is a string template, which is configured to recognize a string represented by a one-byte length field followed by one or more data blocks in which the last data block has a zero-byte length field. Such a template can be tested by attempting to de-marshal a string using the template. For example, if, while a reading a string, the interpreter ends up attempting to read past the end of the available data in the bundle, the template has failed to match. However, it should be understood that this is simply one illustrative example. Other templates may fail to match for simpler reasons. For example, if a high bit is never expected to be set in a specific byte location in a numeric format, it may be determined that a template configured to detect a number in the numeric format has failed to match if a high bit is detected in the specific byte location.

One or more observable attributes 908 (e.g., RPC field types and common markers) may be determined by direct examination of the elements. Template(s) 907 may be chosen by matching one or more of their attributes to observable attributes 908. In other words, observable attributes 908 may be compared to the attributes of one or more templates in library 906 to identify the best matching template(s) 907 from library 906. Once matching template(s) 907 have been identified based on attributes observed from elements 902, other attributes 909 may be inferred using template(s) 907.

Figure 10:
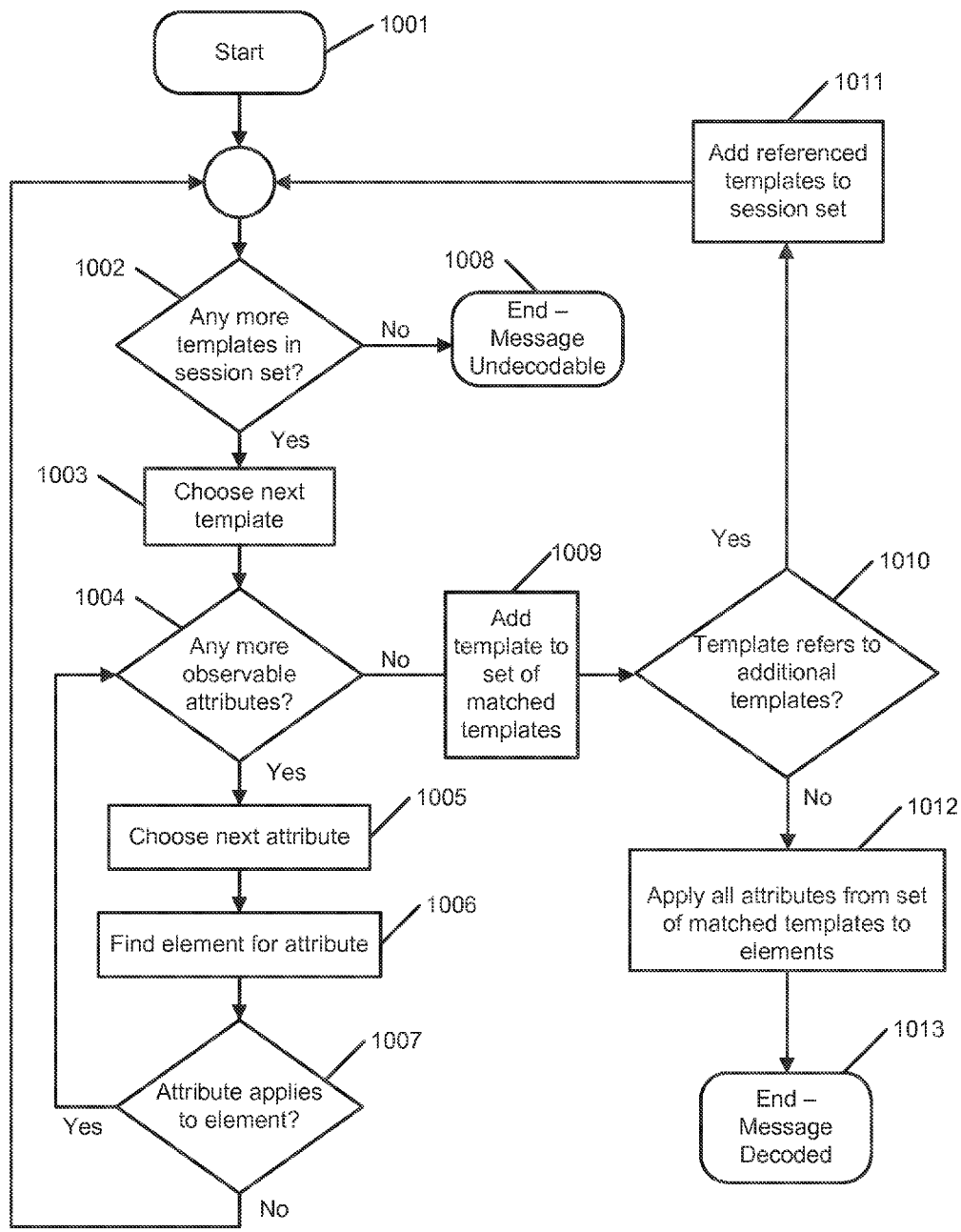
FIG. 10 illustrates a process which may be used by an application protocol interpreter to select attribute templates for decoding an application protocol message, according to an embodiment.

FIG. 10 illustrates an embodiment of a process that may be used by a protocol interpreter (e.g., TNS protocol interpreter 601 and/or TTC protocol interpreter 602) to find matching template(s) 907 from template library 906, and decode a message 901 into a set of useful data 910. At the start 1001 of processing message 901, all templates in library 906 are in the set of templates to be considered. The protocol interpreter iterates through the templates in library 906 and removes non-matching templates from further consideration. Accordingly, in step 1002, it is determined whether any templates remain for consideration. If so, a previously unconsidered template is selected in step 1003.

Each template comprises a set of observable attributes. Observable attributes may be those attributes which are apparent or determinable from message 901 (e.g., from elements 902) or already known about message 901. As each new template is selected for consideration in step 1003, each attribute of that template may be placed in the set of attributes to be checked or observed against message 901. These attributes may comprise inferred attributes, i.e., attributes which may not have been determinable from message 901 or what was previously known about message 901 without having first identified the template comprising the inferred attributes. In step 1004, it is determined whether any attributes remain to be checked. If so, an unchecked attribute is selected in step 1005.

The template indicates to which element of the message each attribute within the template applies. In step 1006, the start of the element, to which the attribute selected in step 1005 applies, is located in message 901. The start of the element may be located by using previously validated observable or inferred attributes from the chosen template. For example, the size of a previous element may be an inferred or observed attribute, and this size may be used to locate the next element in the message.

In step 1007, the selected attribute (e.g., attribute 911) is checked against the located element (e.g., element 902). If this check is successful (e.g., the located element satisfies or corresponds to the selected attribute), the next observable attribute in the selected template is selected and checked. The process of steps 1004, 1005, 1006, and 1007 may repeat until all observable attributes have been checked.

If, in step 1007, an attribute fails to check against an element of message 901, the process may return to step 1002. This process may repeat until all templates in the session's library 906 have been checked, and/or until it is otherwise determined that no more templates must be checked. A check may be unsuccessful, for instance, if the element is not present (e.g., due to packet loss, or due to the template not being an appropriate match for message 901) or if the element does not fit the form of the attribute (e.g., a data type or value range). Furthermore, if no library template is found that successfully checks against message 901, message 901 may be marked as completely undecodable in step 1008. On the other hand, if all observable and/or inferred attributes in a template successfully check against message 901, the template is added to a set of matched templates, or the attributes of the template are added to a set of attributes, in step 1009.

If a template is chosen for the set of matched templates in step 1009 based on matched attributes, it is determined in step 1010 whether the chosen template contains an inferred attribute that references an additional set of one or more templates. For example, this additional set of one or more templates may comprise more specific templates. The additional set of one or more templates is added to the template library 906 for the session in step 1011, and the processing of message 901 is continued in step 1002, based on the supplemented template library 906.

Once all templates in template library 906, including any referenced templates added in step 1011, have been considered with respect to the elements of message 901, message 901 is decoded in step 1012 using one or more matched templates. Message 901 may be decoded in step 1012 into data 910 by applying all of the attributes (e.g., observable attributes 908 and inferred attributes 909) from the chosen template(s) 907 to the elements of message 901 (e.g., elements 902, 903, 904, and 905). In this manner, the pattern of observable attributes 908 found in message 901 results in the identification of a set of inferred attributes 909 by matching the observable attributes 908 to templates in template library 906 that comprise both observable and inferred attributes.

All of these attributes, i.e., both observable attributes 908 and inferred attributes 909, are applied together to message 901 in step 1012 to generate a decoded message in step 1013. For instance, the process in step 1012 for decoding element 902 of message 901 comprises applying the combined observable attributes (e.g., attributes 911 and 912) and inferred attributes (e.g., attributes 913) to element 902 to produce data 914. The other elements of message 901 (i.e., elements 903, 904, and 905) may be decoded in a similar manner.

Each type of attribute may imply or indicate its own form of transformation. As an illustrative, non-limiting example, in the context of Oracle™ TTC protocol interpretation, some examples of applicable attributes include the basic type of data (e.g., string, numeric, date, interval, etc.), the acceptable range of values, a specific value or bit pattern (e.g., an operation code), the dynamic range of a value (e.g., how many bits are required to represent the full range of the value), how many padding bits may be included in a message and their possible values and locations, the encoding of a value (e.g., endianness, character set, bit width, etc.), and/or the internal structure of a value (e.g., simple array of characters with a single length, groups of characters with a length field between each one, etc.).

Some elements of a message may contain bulk data that is not of interest. Thus, in an embodiment, the transformation from element to data (e.g., from element 902 to data 914) in step 1012 may involve eliding or omitting some or all of the actual data, leaving only a description of the data (e.g., the chosen attributes) for use in building a model. The bundling mechanism (described in more detail elsewhere herein) ensures that the high-level message boundaries are discernable, even if part of a message is skipped or omitted in this fashion.

In an embodiment, template library 906, which is used to decode a message, persists on a per-session basis. This allows earlier messages in the session to inform the decoding of later messages in a session. This feature may be particularly critical, for instance, in decoding messages in a session in which the initial connection setup messages are missing.

Figure 6:
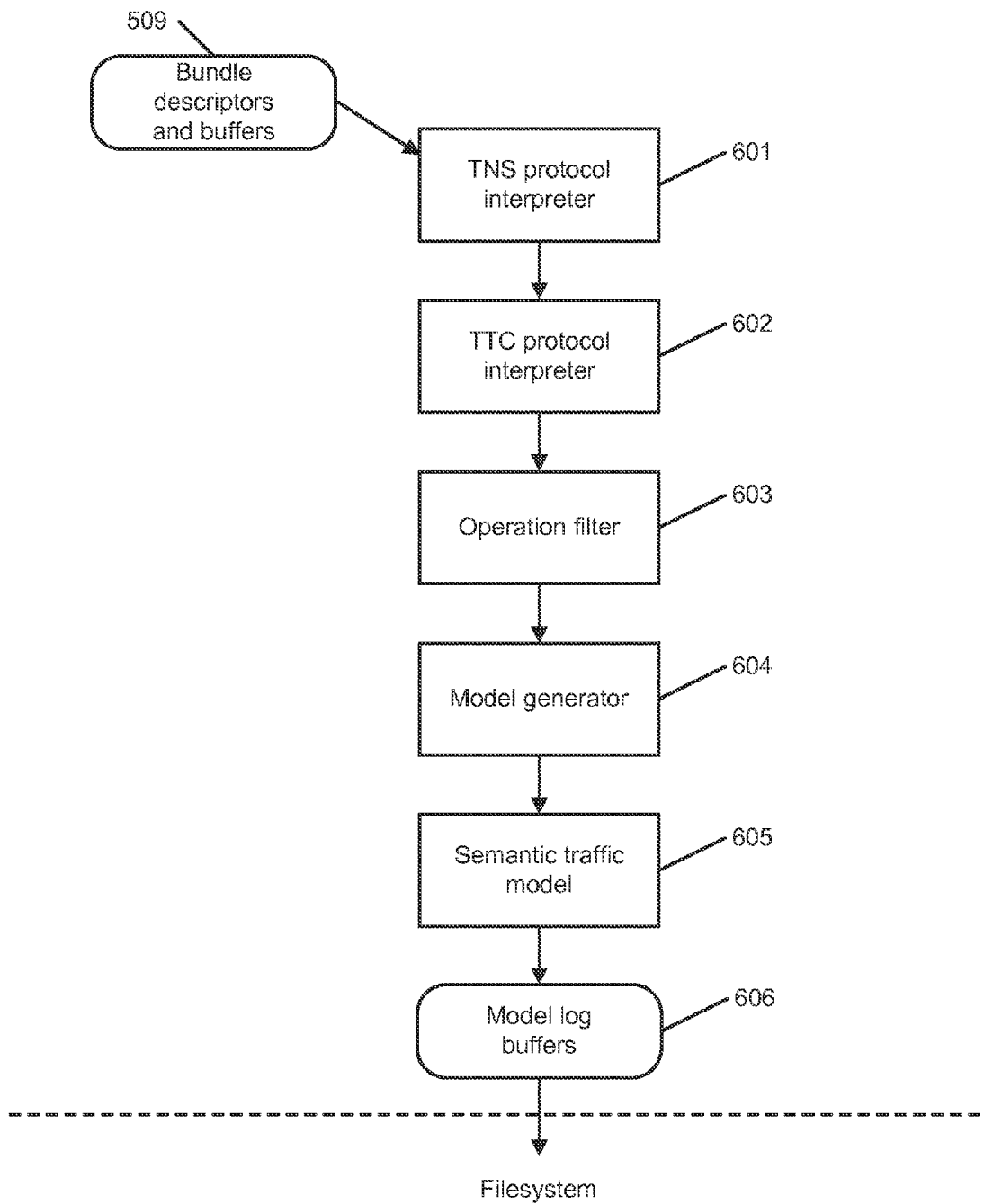
FIG. 6 illustrates example application-level analysis of captured traffic resulting in the generation of a semantic operation model, according to an embodiment.

While the embodiment illustrated in FIG. 6 uses a TNS protocol interpreter 601 and TTC protocol interpreter 602, it should be understood that different interpreters (e.g., for protocols other than TNS and/or TTC) may be used in addition to or instead of the illustrated interpreters and/or a different number of interpreters may be used (e.g., one, two, three, four, etc.), depending on the particular protocol(s) being interpreted.

In an embodiment, the data extracted from TNS protocol interpreter 601 and/or TTC protocol interpreter 602 or, in other contexts, from one or more other interpreters may be passed to an operation filter 603. Operation filter 603 may use application-level semantic data to filter operations that are not of interest. Operations of interest or operations not of interest may be defined or configured by a user. As an illustrative example, the application-level semantic data may include a service name for a database. For instance, two database instances named CRMPROD and CRMDEV may be present on or otherwise available from the same server and use the same TCP port (e.g., port 1521) for RPC traffic. A user may specify that only operations involving CRMPROD are of interest or that the operations involving CRMDEV are not of interest. In either case, operation filter 603 may filter out operations involving CRMDEV from consideration prior to analysis by model generator 604.

At any of the interpreter or filter stages leading up to model generator 604 (e.g., stages 601, 602, and/or 603), processing of a bundle or group(s) of bundles in a session may be deferred, leaving the bundle(s) queued until a new bundle or event is received for the session. This mechanism may be used when information from subsequent bundles may be needed by any of the stages or modules to interpret earlier bundles. For instance, TTC protocol interpreter 602 may use this queuing mechanism to defer processing of undecodable messages in a session until its template library is more refined or developed. In addition, model generator 604 may use this queuing mechanism to retain bundles while attempting to determine which side of a connection is the server and which side of the connection is the client.

6. Semantic Traffic Model

Referring again to FIG. 6, model generator 604 uses the stream of data and events generated by one or more protocol interpreters (e.g., TNS protocol interpreter 601 and TTC protocol interpreter 602)—and, in an embodiment, filtered by operation filter 603—to build an abstracted semantic traffic model 605 of the operations taking place between network agent 102 and network agent 103. Model 605 may comprise a sequence of verbs and backing data that pertains to a single session (e.g., database session). Model 605 maintains a collection of states for each session and transaction, and describes the sequence of operations applied to that state.

Additional models, including multiple layers of models, may be built from semantic traffic model 605, for example, by detector 108. The details of these higher-level models may be specific to the analysis engine built to use the data of model 605, and may vary based on the goals of the application which will utilize model 605. In other words, different users may build different higher-level models depending on the task at hand. For example, for a security application, a higher-level model may comprise structural and parametric data that describe the normal behavior of an application and expose outlying operations that may represent attacks. As another example, for a performance application, the higher-level model may comprise data describing the timing and size of verbs and their parameters. As a further example, a database firewall may build a higher-level model describing SQL statements and execution semantics surrounding them. A web application firewall (WAF) or WAF-like system may build a higher-level model from model 605 that shows Uniform Resource Identifiers (URIs) and POST parameters.

Model 605 may be built in main memory 205 and/or cache memory 206, and written by file system driver 310 and storage controller driver 311 (e.g., via memory controller 210, bus controller 203, and storage controller 207) to persistent storage device 209. Specifically, in an embodiment, the data of model 605 (e.g., events and metadata) may be queued to model log buffers 606, which may be written to persistent storage device 209.

The data of model 605, queued in model log buffers 606, may comprise a feed that is inputted into one side of an API to be used by the specific higher-level application (e.g., detector 108) providing the API to, for example, construct higher-level models. For instance, for a security application, RPCs being used in monitored sessions and the parameters used in the RPCs, and/or SQL operations being used and the rows and columns being modified by the SQL operations, may be provided from model 605 via model log buffers 606 to the security application via an API defined by the security application. For a performance application, the types of operations being used in monitored sessions may be provided from model 605 via model log buffers 606 to the performance application via an API defined by the performance application. Alternatively, it should be understood that the capture-and-analysis modules 304 may define the API, and one or more applications (e.g., detector 108 which may comprise security application(s), performance application(s), and/or other types of applications) may access the data of model 605 (e.g., stored in model log buffers 606) via the API defined by capture-and-analysis modules 304.

7. Variations

The disclosed systems and methods may be applied to any application-level protocol that is session synchronous. Such protocols include, without limitation, database client-server protocols used by Oracle™, Microsoft™ SQL, Sybase™, IBM™ DB2, PostgreSQL, MySQL, MongoDB, and other databases. Such protocols also include non-database server protocols, such as HTTP, HTTPS, Network File System (NFS), Apple Filing Protocol (AFP), Server Message Block (SMB), Domain Name System (DNS), Simple Mail Transfer Protocol (SMTP), Internet Message Access Protocol (IMAP), Post Office Protocol (POP), and custom or proprietary application protocols. In addition, the application protocols may be carried over transport mechanisms other than TCP over IP version 4 (IPv4), including, without limitation, User Datagram Protocol (UDP) over IPv4, UDP over IP version 6 (IPv6), TCP over IPv6, Remote Desktop Protocol (RDP) over IPv4, Internetwork Packet Exchange/Sequenced Packet Exchange (IPX/SPX), Internet Control Message Protocol (ICMP) over IPv4, and ICMP over IPv6. The protocols may be carried in any combination over Layer 2 bridges, Network Address Translation (NAT) devices, Virtual Private Network (VPN) tunnels, VLAN technologies, and in-memory interprocess communication (IPC) arrangements on Non-Uniform Memory Access (NUMA) and Uniform Memory Access (UMA) architectures.

The disclosed systems and methods may also be applied to any packet-based or stream-based physical layers, including arbitrary combinations of such layers within the same system. These include physical transports over any supported media, including, without limitation, Fiber Distributed Data Interface (FDDI), Token Ring, 100-megabit Ethernet, 10-megabit Ethernet over coaxial cables, 10-gigabit Ethernet, and Digital Signal 1 (DS1)/Digital Signal 3 (DS3) signaling.

The disclosed systems and methods may utilize any capture mechanism that can make copies of the traffic between network agents, and provide these copies to the disclosed capture-and-analysis device 107 or modules 304. Such capture mechanisms include, without limitation, electrical-level taps, MII proxy taps, a NAT device which routes traffic between network agents and transparently captures the routed traffic, a virtual SPAN or mirror facility that may be part of a Virtual Machine (VM) manager or hypervisor, a TCP or IPC proxy running on any of the involved network agents, and playback of previously captured traffic (e.g., log) from a storage device.

The disclosed systems and methods are not limited to analyzing traffic and building models for a single pair of network agents. Rather, the systems and methods are able to simultaneously monitor many sessions between many pairs of network agents. Furthermore, traffic may be captured simultaneously from a plurality of capture mechanisms in real time or from a play-back. The systems and methods may differentiate between network agents based on transport addresses, as well as other attributes, such as MAC addresses, IP addresses, TCP port numbers, VLAN tags, application-layer-specific identifiers (e.g., service name, SID for Oracle™ protocols, etc.), and/or physical ingress port tags.

It should be understood that the capture-and-analysis device 107 and/or mirror tap may be implemented entirely in software executing in a VM environment. The components of the system—including, without limitation, the capture devices or mechanisms—may run in a distributed fashion on a plurality of virtual or physical appliances and/or operating system processes or drivers. Furthermore, the systems and methods may be implemented on any operating system that supports basic networking and file system capabilities. Alternatively, the systems and methods may be implemented on a physical or virtual device without an operating system (e.g., incorporating required hardware drivers into an application, which embodies the systems and methods, itself).

Different hardware architectures may act as the base for the mirror tap or the capture-and-analysis device 107. These architectures include, without limitation, multiple-CPU-core systems and any supported network or storage peripherals and controllers which support the performance requirements of the system. Any stored program or CPU architecture (e.g., Harvard CPU architecture) may support the disclosed systems and methods.

The reassembly and protocol decoding or interpretation systems and methods described herein may be implemented with different layering than described. For example, the Ethernet, VLAN, IP, and/or TCP reassembly modules may be a single module or entity, and may not support items such as IP fragmentation or VLAN header parsing. The reassembler may use control flags (e.g., ACK, "finish" (FIN), "reset" (RST), etc.) to help determine message boundaries and other exceptional conditions.

Semantic model 605 may be stored on persistent storage on differing storage architectures. Such storage architectures include, without limitation, network file systems, Storage Area Network (SAN) storage, Redundant Array of Independent Disks (RAID) storage, and/or flash memory. Alternatively, model 605 may not be stored in persistent storage at all. Rather, model 605 may be consumed by the ultimate, destination application (e.g., via an API) and discarded.

It should be understood that the destination application of semantic model 605 may use model 605 of traffic to perform other tasks than just those tasks discussed elsewhere herein. Such tasks may include, without limitation, informing a block proxy when to hold and when to release traffic flowing through the capture-and-analysis device 107 so that it may act similarly to an Intrusion Prevention System (IPS), and acting as an application-level proxy and modifying or locally satisfying operations for performance or security purposes (e.g., to implement a database accelerator).

The disclosed systems and methods may handle extreme conditions. Such conditions may include, without limitation, a perfect plurality of traffic copies received due to the utilized capture architecture, a perfect loss of traffic in one direction between a pair of network agents, and new versions of application protocols that are completely unspecified.

In an embodiment, there may be channels of communication which push data, notifications, indications, or other information "backwards" down the analysis chain. Such channels may include, without limitation, notification from the TTC layer to the TNS layer regarding message boundaries or asynchronous signal notifications, and/or messages from TNS protocol interpreter 601 to bundler 508 and/or reassemblers 507 and/or 506 to eliminate the need for a timeout to determine the end of a message (e.g., a message to bundler 508 or reassemblers 507 or 506 comprising an indication that the end of the message has been determined). Such channels may be implemented to allow modules (e.g., interpreters, filters, etc.), further along the analysis chain, to "peek" at the data and assist modules, earlier in the analysis chain. For example, this assistance, provided by later modules to earlier modules in the analysis chain, may comprise the determination of message boundaries.

In an embodiment, during analysis, bundler 508 and/or one or both of reassemblers 506 and 507 may elide blocks of data that are of no use to the application layers. The elided data may be significant in some instances, and may include, without limitation, bulk row data and bind parameters. For example, all data not required for an application at hand may be elided or redacted. The data to be elided may be predetermined (e.g., by user-defined parameters stored in a configuration file). For instance, for a database firewall that is not processing the contents of return row data, the application may elide result row payloads and/or all parameter data.

In an embodiment, bundler 508 and/or one or both of reassemblers 506 and 507 may implement a streaming protocol such that data is delivered to the protocol interpreters without the need to buffer the data or completely buffer the data.

Attributes for protocol message elements, such as TTC protocol message elements, may be inferred directly from clues which are intrinsic to the message or from other clues. These other clues may include, without limitation, known architectures and/or version numbers of the network agents involved in the interaction. For example, these architectures and/or version numbers may be known via configuration or caching of data from a previous message or session.

In embodiments, the search of attribute elements, such as TTC attribute elements, may be elided for a subset of one or more elements. For instance, in an embodiment, if clues provided from an earlier part of the connection establishment protocol indicate that certain templates are not needed, they may be excluded from consideration for performance reasons. As an illustrative example, certain RPC structures may never be used after a given version of an Oracle™ client library. Thus, if the connection setup determines that a newer library version is in use, the interpreters can refrain from attempting to match any templates that solely support older library versions. Additionally, the results of a search for attribute elements may be cached to improve performance.

Generation of the per-session template library 906 may be informed by the results of related sessions. For example, if a template library is selected for a first connection from client A to server B, this previously selected library may be reused as a starting point for a second and subsequent connection from client A to server B, since there may be a good chance that the second connection is from the same application as the first connection. Furthermore, protocol attribute templates may be excluded or included in library 906 based on attributes outside of the immediate protocol messages, such as TNS protocol headers, configuration inputs (e.g., manually defined by a user), IP header fields, rows or bind payload data, TCP header fields, transport layer header fields, etc.

In an embodiment, additional or alternative heuristic methods, than those described elsewhere herein, may be used to determine at least some of the attributes of the data elements for a given message and/or a set of templates that are in the scope of a particular session. For example, information acquired from a session setup negotiation may be used to directly determine one or more attributes. For instance, a "book" of templates for given server version numbers or client library versions and server types may be used to provide a starting point for the template library search. The time to search all possible combinations of templates can be significant. Thus, reducing the search space can be valuable, for example, in terms of improving performance. In addition, the disclosed bundling mechanism may be generalized and used for other purposes than those described elsewhere herein. For example, the bundling mechanism may be used to determine semantics of TNS marker messages, determine performance-related statistics in the model builder, decode row data, characterize row data, etc.

II. Modeling

In an embodiment, systems and methods are disclosed for detecting and mitigating unauthorized access to structured data storage or processing systems using network traffic. In an embodiment, the network traffic is received from or using the systems and methods disclosed in the '579 Application and discussed above.

The disclosed systems and methods are applicable to at least systems in which some form of generated language is combined with data passed in from potentially unauthorized or compromised sources. This includes, without limitation, SQL database servers using any dialect of SQL with or without proprietary extensions (including, for example, embedded relational databases), other database servers with a query language component, and other services containing a control language component mixed with user data, such as Lightweight Directory Access Protocol (LDAP), HTTP, Hypertext Markup Language (HTML), Simple Mail Transfer Protocol (SMTP), Internet Message Access Protocol (IMAP), and Post Office Protocol (POP).

1. System Overview

Figures 12, 13:
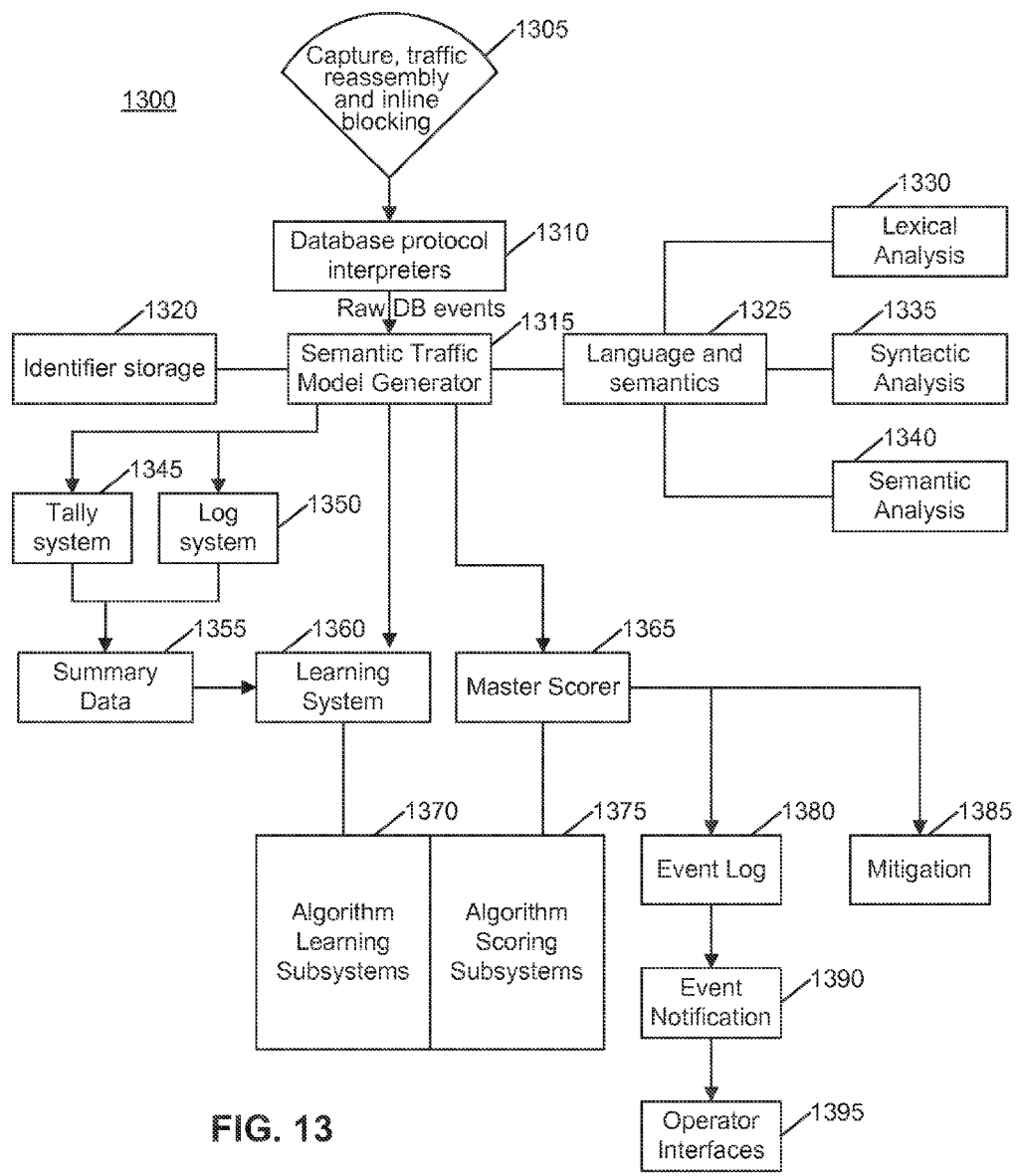
FIG. 12 illustrates an example of an SQL injection.
FIG. 13 is a functional block diagram of a system for monitoring network traffic for potential attacks, according to an embodiment.

FIG. 13 is a functional block diagram which illustrates a high-level overview of a system 1300 for detecting and mitigating threats to structured data storage and processing systems, according to an embodiment. The term "database firewall," as used herein, may refer to the entire system 1300 or subsets of the components of system 1300. System 1300 may comprise one or more servers or one or more processors that execute the described modules and functions.

Initially, network traffic is captured and/or reassembled with inline blocking by reassembly module 1305. As mentioned above, reassembly module 305 may be implemented using the systems and methods disclosed in the '579 Application and/or described herein. For example, reassembly module 1305 may comprise the bundler(s) and/or interpreter(s) discussed above with respect to FIGS. 5 and/or 6. It should be understood that reassembly module 1305 may itself capture network traffic or may receive captured traffic network from an external device or agent (e.g., the capture/analysis device described above with respect to FIG. 4) for reassembly.

The reassembled network traffic is received by one or more database protocol interpreters 1310 (e.g., TNS protocol interpreter 601, TTC protocol interpreter 602, etc.). Database protocol interpreter(s) 1310 parse the reassembled network traffic, based on one or more database protocols, to identify one or more raw database events. The one or more raw database events are then provided by protocol interpreter(s) 1310 to semantic traffic model generator 1315.

Semantic traffic model generator 1315 uses the raw database events produced by database protocol interpreter(s) 1310 to generate a semantic traffic model, which represents a model of the network traffic captured by module 1305. In an embodiment, the semantic traffic model comprises a series of abstract representations of database server operations that have been applied to the database. Each representation of an operation in the semantic traffic model may identify a session, user, database server, type of operation, and/or timing data related to the operation. Semantic traffic model generator 1315 can provide inputs to a tally system 1345, log system 1350, learning system 1360, and/or master scorer system 1365, each of which is described in greater detail elsewhere herein.

Events represented in the semantic traffic model are passed by semantic traffic model generator 1315 through a language processing module 1325 (also referred to herein as a "language system") that extracts lexical, syntactic, and semantic data from the provided database operations (e.g., SQL statements) using lexical analysis module 1330, syntactic analysis module 1335, and semantic analysis module 1340, respectively, each of which may be integral or external to language system 1325. The marked-up traffic may then be written to a wraparound log buffer and a summary system that keeps statistics on similar events (e.g., tally system 1345 and/or log system 1350).

In an embodiment, a plurality of scoring algorithms or modules are used that each look at the semantic traffic from a different perspective. Once sufficient traffic has been observed and logged, learning module 1360 is able to present a subset of the traffic to each of these scoring algorithms as authorized traffic. In turn, each of these scoring algorithms can build a model of the traffic (in a learning phase of the algorithm), according to its own perspective, for the subsequent grading or scoring of the traffic (in a scoring phase of the algorithm), for example, by master scoring module 1365. However, there may also be scoring algorithms that do not require a learning phase (i.e., only comprising a scoring phase), and can help detect unauthorized access even during the learning period.

After the application traffic from a database has been learned (e.g., during the learning phases of the scoring algorithms discussed above), master scoring module 1365 (also referred to herein as the "master scorer") can use the scoring algorithms to evaluate all or a portion of ongoing traffic. In an embodiment, each of the scoring algorithms is utilized by master scoring module 1365 to generate a set of facts that it can discern about the traffic from its unique perspective and the learned application behavior. Master scoring module 1365 can judge all of these facts, received from the various analytical algorithms, to make a single threat determination about each operation.

In an embodiment, if the threat determination for an event (e.g., score calculated by the master scoring module 1365) exceeds a threshold, the event is flagged. Each event may contain forensic information supplied by all or a portion of the analytical algorithms, details from the language system, and/or the details of the semantic traffic model itself. Each event may be logged into an internal database (e.g., by master scorer 1365), such as event log 1380, for later examination and/or signaled to an operator by an event notification module 1390 via a visual user interface 1395. Alternatively or additionally, each event can be sent (e.g., by event notification module 1390) as one or more Syslog-compliant messages to an operator-specified destination. Syslog is a standard for computer message logging that permits separation of the software that generates messages from the system(s) that store, report, and/or analyze them.

In an embodiment, visual operator interface 1395 allows an operator to examine detailed forensics for all events, as well as summaries and subsets of existing events and details of the various analytical algorithms' internal models. Operator interface 1395 also provides for initiating learning and scoring phases, as well as the ability to direct the analytical algorithms to learn specific instances of operations (e.g., SQL statements) that are authorized and/or unauthorized.

2. Transmission Control Protocol (TCP) Reassembly

Embodiments of TCP reassembly, which may be performed, for example, by reassembly module 1305 in FIG. 13, will now be described in detail. In an embodiment, the TCP reassembly mechanism of reassembly module 1305 converts collections of passively captured IP packets from a group of capture sources into pairs of ordered and synchronized byte streams. Each byte stream represents a unidirectional TCP payload from one endpoint of a connection to the other endpoint of the connection.

Figure 11:
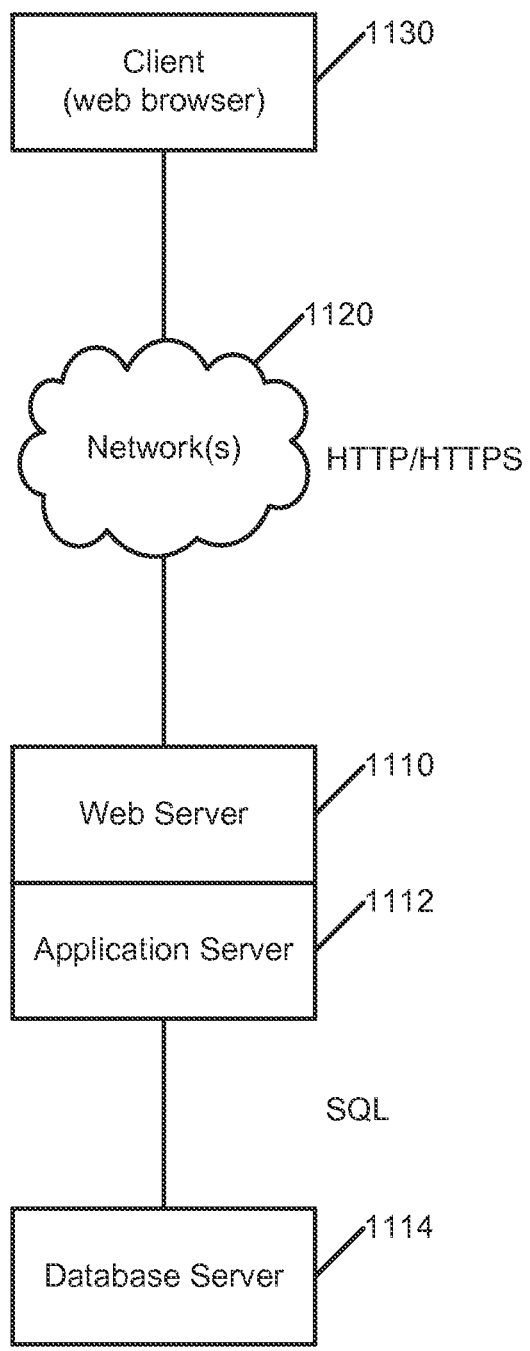
FIG. 11 illustrates typical components involved in the operation of a network-based application.
Figure 14:
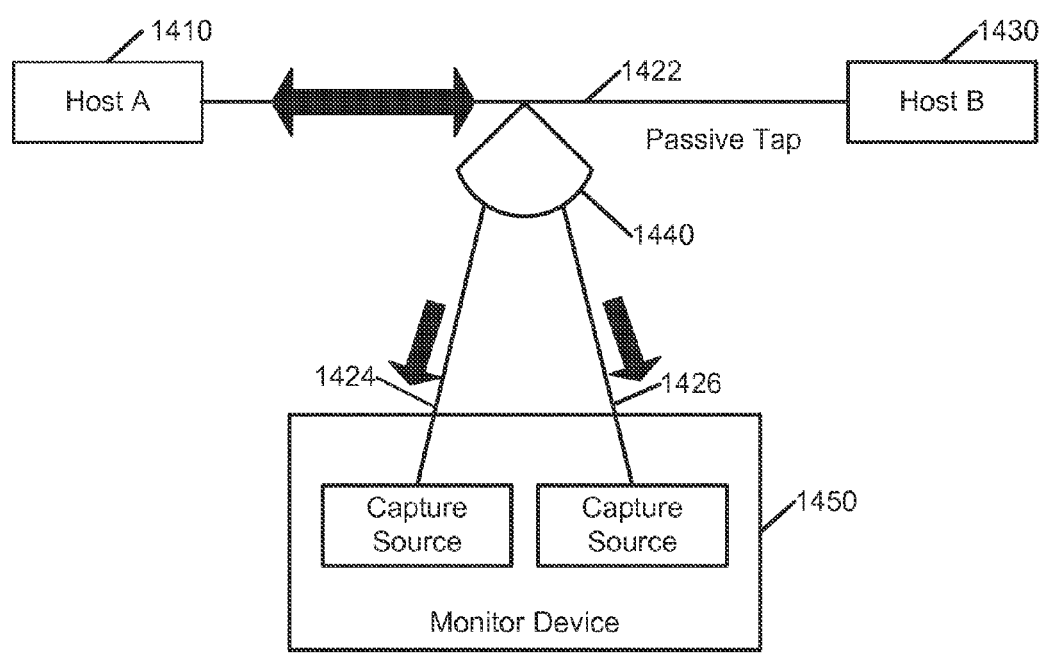
FIG. 14 illustrates a network tap between two hosts, according to an embodiment.

The capture environment, described in the '579 Application and above, may comprise one or more external agents that passively "sniff" traffic between clients and servers (e.g., client 1130 and server 1110 of FIG. 11) on one or more external networks and send a packet-by-packet copy of this traffic to a monitoring device, such as system 1300. A common case, illustrated in FIG. 14, according to an embodiment, is a passive network tap 1440 inserted between two hosts 1410 and 1430 with a high traffic load. Each direction of traffic flow may be at the full capacity of link 1422 between them. Thus, two links 1424 and 1426 may be required to send the sniffed traffic to monitoring device 1450, which may be the same as, part of, or provide input to system 1300.

In an embodiment, each collection of packets (a TCP stream) within the sniffed traffic is identified in system 1300 by a tuple, such as (Realm, SourceIP, DestinationIP, SourcePort, DestinationPort) or (Realm, DestinationIp, SourceIP, DestinationPort, SourcePort). The SourceIP and DestinationIP are the Ipv4 or IPv6 network node addresses for the source host (e.g., Host A 1410) and destination host (e.g., Host B 1430), respectively. The SourcePort and DestinationPort are the TCP port numbers for the source host and destination host, respectively, and the Realm is an identifier that is mapped to from the tuple, such as (receive port identifier, Virtual Local Area Network (VLAN) tag). Reassembly module 1305 can simultaneously process as many TCP streams as are present in the capture sources.

The application layer (or "monitoring application") in monitoring device 1450 receives the stream data for each direction of the connection alternately with the direction changeovers synchronized to match the behavior experienced by the monitored hosts. For example, if Host A sent a message AAA to Host B, and Host B, upon receipt of the message, responded with message BBB, the application layer in monitoring device 1450 would see (Destination=B, Message=AAA) followed by (Destination=A, Message=BBB). These synchronization semantics at the application layer will hold, regardless of the order of receipt of packets at the capture layer.

Reassembly module 1305 can receive an arbitrarily ordered collection of packets from a capture device (e.g., passive tap 1440, in an embodiment, via monitoring device 1450) and convert it into a group of synchronized streams. The only exception is TCP "keepalive" packets, which duplicate data in sequence space with a valid looking payload, e.g., a single byte that is not the last byte transmitted. If a keepalive packet is seen before the last payload on its connection, the stream data could appear corrupted. This situation does not happen in a practical capture system, and may be further mitigated with a heuristic check for this specific condition.

Reassembly module 1305 is able to perform reassembly, even under the following conditions that are typically visible to the monitored systems themselves: packets lost in either direction, duplicated or partially duplicated packets, packets received out of order, packets with no payload, packets with a dummy payload (e.g., keepalive packets), and TCP attacks in which invalid data are included in packet headers (e.g., per RFC793 or any of the underlying protocol layers). (It should be understood that references herein to "RFC" refers to the Request for Comments published by the Internet Engineering Task Force (IETF) and the Internet Society, which are the principal technical development and standards-setting bodies for the Internet.)

There are certain conditions that are unique to passive capture:

(1) Batched traffic across two capture ports. The traffic for a single TCP stream may be split between two capture ports and batched so that a significant number of packets are seen for one direction (i.e., on one capture source) first, followed (i.e., on the other capture source) by the responses to that traffic in a large group. Effectively, this appears like out-of-order traffic on a grand scale, and happens in the normal network-tap configuration due to buffering and thread-scheduling latencies.

(2) Inaccurate capture timestamps. The timestamps on the packets may not be useful for ordering packets received on two interfaces, since buffering in the capture infrastructure may occur before the timestamps are applied.

(3) Unidirectional traffic. A physical or virtual tap may be set up so that only traffic going from one host to another is visible. The application layer of monitoring device 1450 can still do its job with only one side of the traffic by filling in the missing pieces with blank traffic to indicate protocol turnaround boundaries.

(4) Long periods of loss. A tap may be disconnected either unidirectionally or bidirectionally for a long enough time period that the TCP sequence numbers wrap. This can be detected by monitoring device 1450. When detected, monitoring device 1450 can resynchronize and provide a regular feed to the application layer that indicates the loss and resumption of data.

(5) Packets lost in capture. Isolated packets or groups of packets may be lost in the capture chain in such a manner that the loss is not visible to the monitored hosts. In this case, the hosts will not retransmit their data. Monitoring device 1450 can detect the loss and provide placeholder data to the application layer.

(6) Missing start of connection or end of connection indications. The capture may be started after a new TCP connection has been set up, or the tap may be disabled before a TCP connection ends. Monitoring device 1450 can deliver data to the application layer as soon as it can determine synchronization, even without seeing the normal startup handshake. Furthermore, the payload of all traffic received before a capture tap is disabled can be delivered to the application layer after a timeout, even though no close-connection indication has been identified.

(7) Synchronization timing. In some instances, the application layer of monitoring device 1450 may require knowledge that, at some point in time, a host has acknowledged receipt of data (e.g., with respect to other connections). Thus, monitoring device 1450 may deliver payload data to the application layer after the host acknowledgement is known to have occurred.

In an embodiment, TCP reassembly may operate by sorting a collection of received packets with payload for a single TCP session into two host queues, according to their starting sequence number and order of reception. For example, there may be one host queue for each of hosts 1410 and 1430 depicted in FIG. 14, wherein each queue represents one direction in a TCP session. Each queue can be associated with a "push" sequence number and an "ACK" sequence number. The push sequence number determines the highest sequence number that has been delivered to the application layer in a given direction, e.g., using IEN-74 sequence space math. (It should be understood that references herein to "IEN" refer to the Internet Experiment Notes from the series of technical publications issued by the participants of the early development work groups that created the precursors of the modern Internet.) The ACK sequence number is the highest sequence number that has been acknowledged by the host receiving the data.

After adding packets to the appropriate host queue, an attempt can be made to make forward progress on the connection by pushing packets off of one of the queues to the monitoring application. Packets that contain sequence space between push sequence number and the ACK sequence number are candidates for such a push. However, packets may be prevented from being pushed from a queue if one or more of the following conditions are met: a sequence number gap (i.e., missing the next in-sequence data for the direction represented by the queue), no receiver acknowledgement (i.e., the intended receiver of data has not yet acknowledged the data), or no stream synchronization (the other side must receive data before the side represented by the queue). In an embodiment, mechanisms are provided that can force progress, even without some conditions being met, in order to handle packet-loss scenarios. In these embodiments, synthetic "gap" packets can be generated to stand-in for the real data and delivered to the application layer. Such mechanisms are discussed in more detail elsewhere herein.

2.1. Intake Processing

Figure 15:
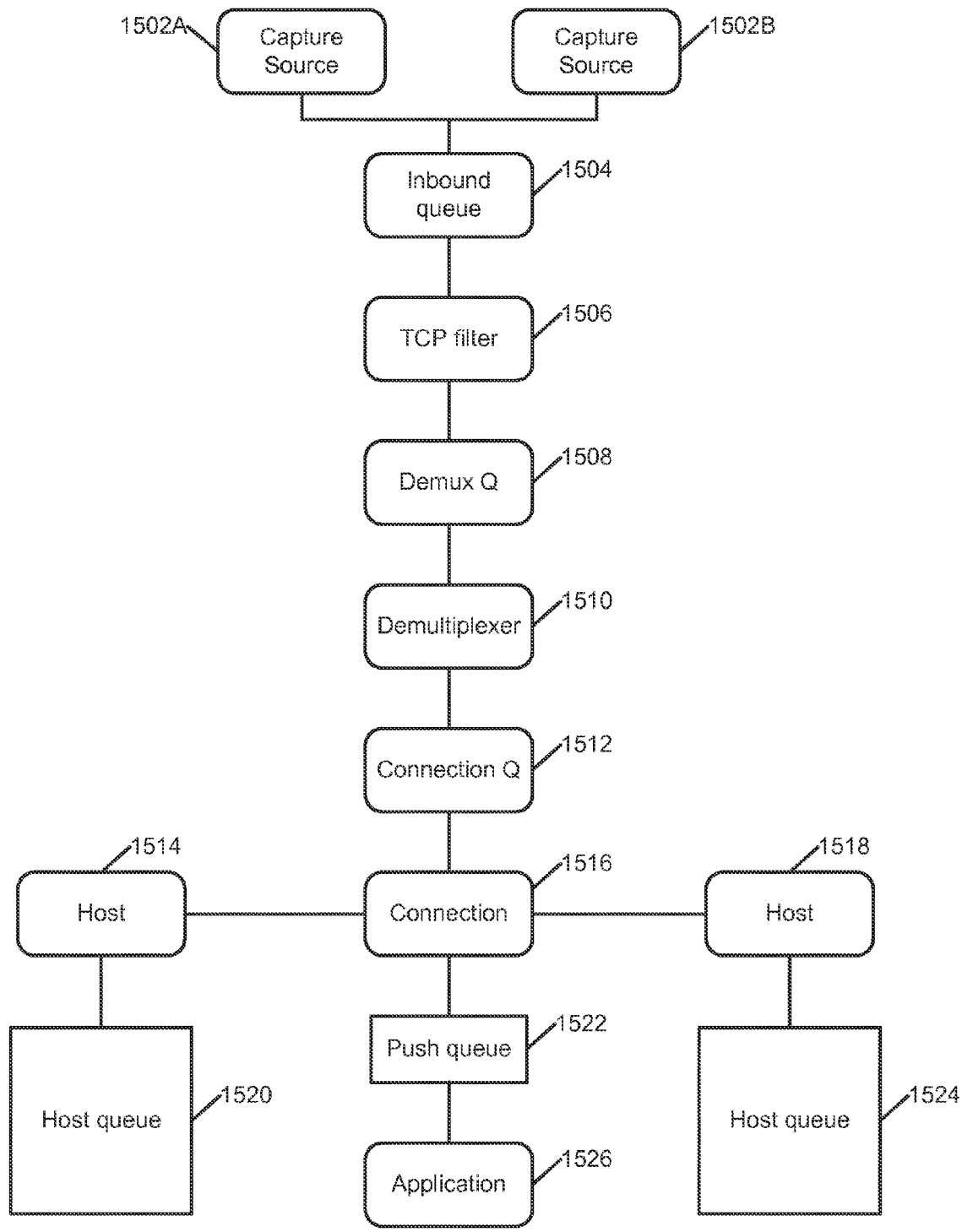
FIG. 15 illustrates an example flow diagram for a TCP reassembly process, according to an embodiment.

FIG. 15 illustrates an example flow diagram for a TCP reassembly process, according to an embodiment. This process may be implemented by reassembly module 1305, illustrated in FIG. 13. In one embodiment, each of the actions described in connection with the flow diagram of FIG. 15 is carried out by reassembly module 1305. As discussed in the '579 Application and above, packets may be received at capture sources 1502A and 1502B, and merged into a single flow of packets on an inbound queue 1504. It should be understood that capture sources 1502A and 1502B in FIG. 15 may correspond to the capture sources in monitoring device 1450 in FIG. 14, and that system 1300, which comprises reassembly module 1305, may correspond to monitoring device 1450.

If there is no packet traffic pending in capture sources 1502A and 1502B, inbound queue 1504 may be processed. On the other hand, if packet traffic is present in capture sources 1502A and 1502B, it may be merged by reassembly module 1305 onto the inbound queue until a predetermined queue-size threshold (e.g., of 10,000 packets) is reached. Once the queue-size threshold is reached, processing may be forced. Such queue discipline can provide low latency when traffic is light and low overhead when traffic is heavy.

In an embodiment, when inbound queue 1504 is processed, all packets are removed from inbound queue 1504 and can be placed in a temporary queue for filtering. Then, a TCP filter 1506 can be applied to all packets in the inbound queue to identify only those packets which contain TCP payload or control data. At this phase, all non-TCP packets can be discarded or sent to other protocol processing or reassembly systems or modules. In addition, relevant header information can be parsed out of the Media Access Control (MAC), IP, and TCP header fields of the identified TCP packets, leaving only abstract control data and payload data in a skeletal packet structure. These packets can then be placed in demultiplexing queue 1508.

Demultiplexer module 1510 may process the packets in demultiplexing queue 1508 each time the temporary queue of TCP filter 1506 has been fully processed. Demultiplexer module 1510 maintains a mapping between connection identifier tuples, discussed above, and state information. In an embodiment, the state information comprises a connection state structure or queue and two host state structures or queues. The connection state structure comprises one or more states related to the overall connection, and each of the two host state structures comprises one or more states related to traffic received by the associated one of the host endpoints of the connection (e.g., host 1410 and 1430, respectively).

In an embodiment, packets are queued to a connection state structure based on the mapping determined by demultiplexer module 1510. Demultiplexer module 1510 also arranges for regular timing packets to be queued to each state structure, as well as control packets indicating a system shutdown or flush of queues, if required. After all packets from demultiplexing queue 1508 have been demultiplexed into connection queues 1512 by demultiplexer module 1510, demultiplexer module 1510 can initiate processing of all connection queues 1512 with packets in them. It should be understood that there may be a plurality of connection queues 1512, each associated with different connections between the same (e.g., Host A 1410 and Host B 1430) or different host endpoints (e.g., Host A 1410 and Host C (not shown), Host D (not shown) and Host E (not shown), etc.).

2.2. Connection Intake Processing

Each time connection module 1516 is activated, it processes all pending packets on inbound connection queue(s) 1512. Tick and control packets are handled as described below. Captured packets can be provided to both host modules 1514 and 1518 associated with the connection as either a "received" or a "sent" packet, depending on the side of the connection that the particular host module is tracking. For example, if a packet is sent from host 1410 to host 1430, that packet can be provided to host module 1514 as a "sent" packet and provided to host module 1518 as a "received" packet.

2.3. Host Intake Processing

In an embodiment, each connection module 1516 has two host modules 1514 and 1518, one to track the state of each side (i.e., direction) of the TCP connection. A host module (e.g., either host module 1514 or 1518), provided with a "sent" packet, can use the ACK in a packet to inform the host state of the most recent (in time) received data. This can be used to delay delivery until the receiver acknowledges the data. It can be considered a "best effort" affair. When packet data is not sorted well, this aspect of the algorithm may do no good, but also does not harm. A host module provided with a "received" packet that represents any sequence space (payload, SYN, or FIN) sorts the packets onto the host module's queue by its starting sequence number and reception order. For example, host module 1514 will sort packets into host queue 1520, and host module 1518 will sort packets into host queue 1524. Keepalives will appear as duplicate data to be discarded.

2.4. Connection Push

In an embodiment, after each packet is presented to host modules 1514 and 1518, each host module 1514 and 1518 is then requested or otherwise caused to "push" its queue 1520 and 1524, respectively, to push queue 1522. For each side of the connection, the host queue is processed (i.e., packets are either discarded or delivered to application 1526) until a packet is encountered which cannot be disposed of. Then the other host queue is processed in a similar manner until a packet is encountered which cannot be disposed of, at which point the previous host queue is processed again, and so forth. For example, host queue 1520 is processed until a packet is encountered which cannot be disposed of, at which point host queue 1524 is processed until a packet is encountered which cannot be disposed of, at which point host queue 1520 is processed again, and so forth. The host queues 1520 and 1524 are processed in this manner until neither queue has made forward progress by discarding packets or delivering packets to application 1526 or until both queues are empty.

In an embodiment, as the packets in host queues 1520 and 1524 are processed, a series of one or more tests are applied to each packet. The test(s) determine whether the data should be pushed to application 1526 (i.e., to the application layer), discarded, and/or deferred. An example series of tests or rules may comprise one or more of the following:

(1) Sequence space (data and control) that is before the push sequence is discarded as duplicative.
(2) Sequence space in the queue in advance of the push sequence is ignored but not discarded. This represents a missing data situation.
(3) Sequence space in the queue that has not yet been acknowledged by the host (i.e., is in advance of the ACK sequence state) is ignored but not discarded.
(4) Sequence space that is in advance of an ACK sent by the host on the other side (i.e., determined by examining the other host queue of the other direction) is ignored but not discarded. This represents a situation in which data in the other host queue must be pushed before this data can be pushed, and is important to keeping the connection synchronized.

Packets representing sequence space that passes the above tests can be removed from the host queue and put in push queue 1522. Once all push attempts have been completed and no further progress has been made, application module 1526 is allowed to process the data in push queue 1522.

2.5. Forced Progress

During each attempt to push packets, a check can be performed to determine if conditions exist to indicate that a connection is stuck and will not make further progress by deferring action. In an embodiment, such conditions may comprise one or more of the following:

(1) Combined queue lengths exceed a reordering threshold.
(2) No packets have been received for the connection for a threshold amount of time.
(3) The connection is being flushed.
(4) Traffic exists on both host queues that requires opposing traffic to be delivered first. For instance, this can happen when there is a large packet loss or when corrupted traffic (e.g., not meeting RFC793 specifications) is received, e.g., due to hostile actions or other reasons.

In an embodiment, when any one or more of these conditions are detected, each host queue 1514 and 1518 is processed, and, if blocking conditions are met (e.g., missing packet, no ACK), a synthetic gap packet is injected. The injected gap packet simulates the missing traffic and allows forward progress via the normal push mechanism. The gap packet can be marked so that monitoring application 1526 knows that the packet contains no valid data and represents missing sequence space.

If the sequence space on the host queues 1514 and 1518 is significantly different than the current push sequence numbers, the connection has experienced a large packet loss, perhaps wrapping the sequence space, and the push sequence numbers on both side of the connection are jumped to just before the valid traffic. Thus, application 1526 may see a gap indicating missing data. In this case the size of that gap is a small arbitrary number, since the actual gap size is unknown. In an embodiment, packet arrival timestamps can be used to estimate the size of the gap.

2.6. Ticks

In an embodiment, a count of packets received for a connection is maintained. A tick packet is received approximately once per packet capture minute, which may be much faster in real time if the capture source is a stored file of packets. As each tick packet is received, the packet count at the last tick is compared with the current packet count.

If there is no traffic, the time span represented by a tick is considered idle. In an embodiment, if five capture time minutes (or other predetermined time) worth of idle ticks occur, the connection may be flushed via the forced progress mechanism. This acts as a failsafe for packet loss near the end of a burst of activity on the connection.

In an additional embodiment, if thirty-six hours (or other predetermined time) worth of idle ticks occur, the connection is assumed to be abandoned and is flushed. Then application 1526 is notified that the connection is closed. This acts as a resource preservation mechanism to prevent memory from filling with connection state after large packet loss scenarios.

2.7. Flushing

In an embodiment, if a flush control packet is received by a connection, a forced progress procedure is executed. This causes any pending data in host queues 1514 and 1518 to be flushed immediately into push queue 1522 with appropriate gaps as needed, since it is known a priori that no more traffic will be coming down the pipeline to fill in any missing packets for which host queues 1514 or 1518 may be waiting.

2.8. Monitoring Application

Monitoring application 1526—which may comprise, for example, the Bundler in the '579 Application and described above—may receive several notifications during the lifetime of a connection. These notifications may include, for example, that a new TCP connection has been identified, that in-sequence payload or gap traffic has been added to push queue 1522, and/or, that, when a TCP connection will no longer receive traffic notifications, a TCP connection has been closed (e.g., due to control packet activity or being idle).

2.9. Multiprocessing and Pipelining

In an embodiment, the mechanisms described above utilize a series of queues between modules that allow multiple processor cores to simultaneously handle the chain of captured traffic.

3. Semantic Traffic Model

Embodiments of a semantic traffic model, which may be generated, for example, by semantic traffic model generation module 1315 in FIG. 13 and/or model generator 604 in FIG. 6, will now be described in detail. It should be understood that each of the actions described in this section may be performed by semantic traffic model generation module 1315 (or model generator 604, which may be one in the same). Semantic traffic model generation module 1315 may also be referred to herein as the feed system or simply the "feed." This feed system 1315 receives, as input, raw data and events from capture and reassembly system 1305, described above. In an embodiment, feed system 1315 receives these events from the underlying capture protocol systems (e.g., as described in the '579 Application and above, and represented by reassembly module 1305) as direct calls with parameter data. Examples of received events may include, without limitation:

CONN_OPEN: indicates that a new client-to-server connection has been detected and includes, as parameter data, a client/server connection identifier tuple, an identifier of the original endpoint client that was connected to (e.g., used in load-balanced database scenarios), and/or an identifier of the service that was connected to (e.g., this maps to a specific instance of a monitored database, and is possibly many-to-one).

CONN_CLOSE: indicates that a connection relationship between client and server has been closed or otherwise ended, and includes, as parameter data, a reference to the connection.

SESS_OPEN: notification of a new session or login on an existing connection, and includes, as parameter data, a username and/or a reference to the connection.

SESS_CLOSE: notification that a session has been logged out on an existing connection, and includes, as parameter data, a reference to the open session.

TASK_EXEC_DISPATCH: signals the start of a new operation requested by the client to the server (requests may be chained together so that this may be a repeat of an earlier request), and includes, as parameter data, a reference session on which the request takes place, a reference to the first time that this request was issued, a timestamp when the request was first detected, statistics regarding rows, bytes, and transfers for this request chain, SQL text of the operation, and/or parameters from the client that modify the SQL operation.

TASK_EXEC_COMPLETE: signals the first response from the database server back to the client for a request, and includes, as parameter data, a reference to the open session, a reference to the first request in the chain, a reference to the current request being responded to, a time (e.g., in milliseconds, nanoseconds, etc.) between dispatch and response, and/or transfer statistics (e.g., row, bytes, and/or transfers).

TASK_ROWS: signals that an increment of data has been transferred from the server to the client on behalf of a request (e.g., used to provide rate information on long-running requests that retrieve large amounts of data), and includes, as parameter data, a reference to an open session, a reference to the current request, a timestamp, and/or transfer statistics (e.g., rows, bytes, and/or transfers);

TASK_COMPLETE: signals the completion of a request, and includes, as parameter data, a reference to an open session, a reference to the first and current request in the chain, total time spent servicing the request and responses, and/or transfer statistics (e.g., rows, bytes, and/or transfers).

In an embodiment, semantic traffic model generation module 1315 uses a language system 1325, an internal database, and several levels of caching to scan the input events and convert them into an abstract model of the traffic and its parameters. The output products may be cached at two major levels:

(1) A checksum of the entirety of the SQL that was passed in may be used as a cut-through cache that holds the detailed results of lexical analysis and a reference to the SQL template which contains the syntactic and semantic analysis products. This cache can completely bypass processing by language system 1325.

(2) A cache, indexed by SQL template identifier, which caches the syntactic and semantic analysis. Hits in this cache bypass the parsing and semantic analysis portions of language system 1325. However, lexical analysis is still performed. Specifically, the lexical analysis may be performed to compute a structural signature which uniquely and compactly identifies the structural aspects of any SQL statement, ignoring non-structural differences including literal and bind value. This structural signature may be used to generate a unique, persistent SQL statement representation, which is referred to in FIG. 16 as the "id_" field of the "SqlStatement" entity.

In an embodiment, semantic traffic model generation module 1315 collapses redundant data into identifiers in an internal database and shared objects in runtime memory. The output of semantic traffic model generation module 1315 may be a set of in-core state structures that represent the environment of the request and a set of event notifications to the modules being fed (e.g., statistics or tally module 1345, logging module 1350, learning module 1360, and/or scoring module 1365).

Figure 16:
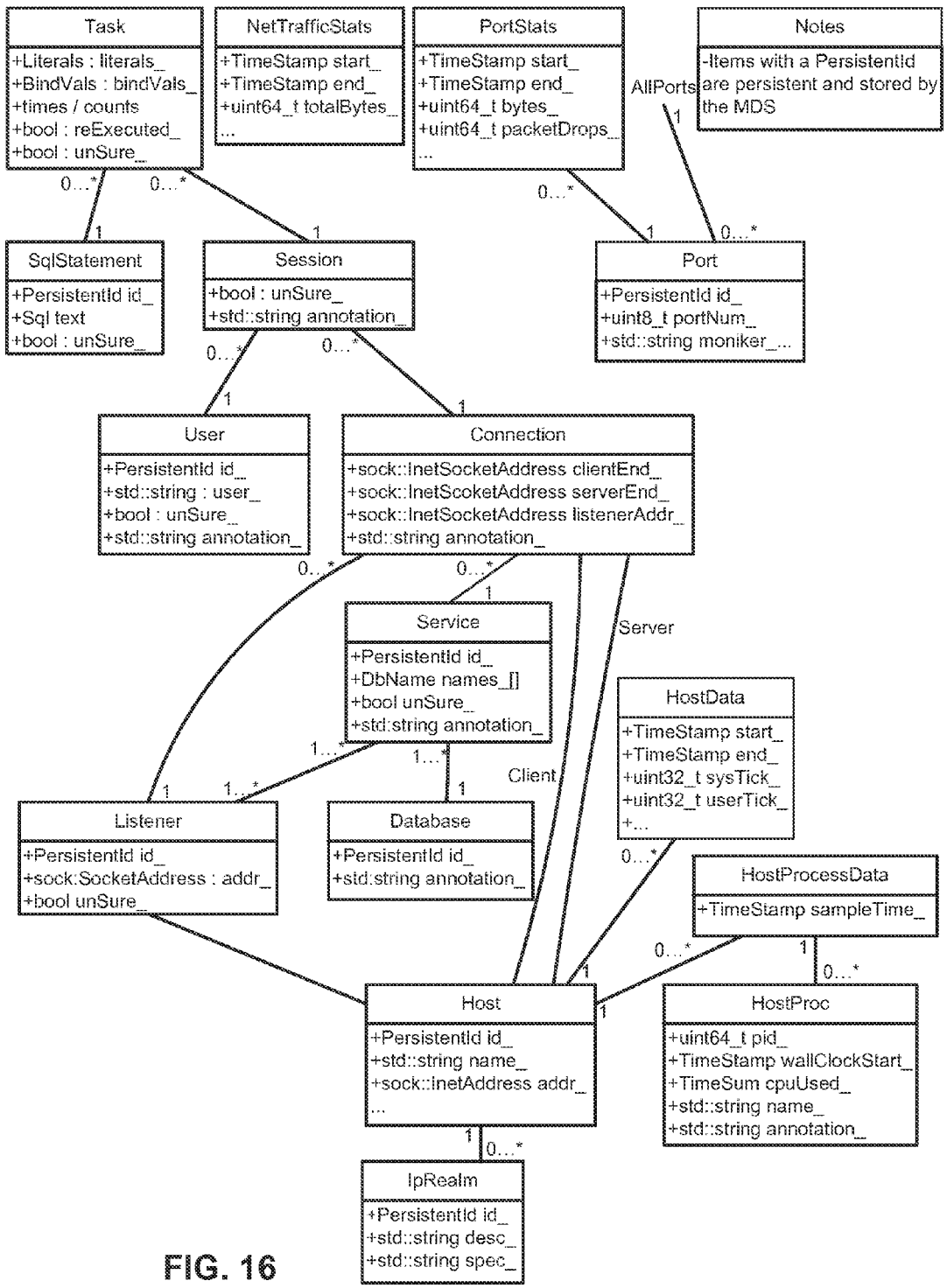
FIG. 16 illustrates example state structures representing the environment of a request, according to an embodiment.

FIG. 16 illustrates some example in-core state structures that represent the environment of the request, according to an embodiment. Specifically, FIG. 16 shows the example in-memory state, as well as the relationships and arity of that state, for the metadata surrounding connections of an embodiment.

Figure 17:
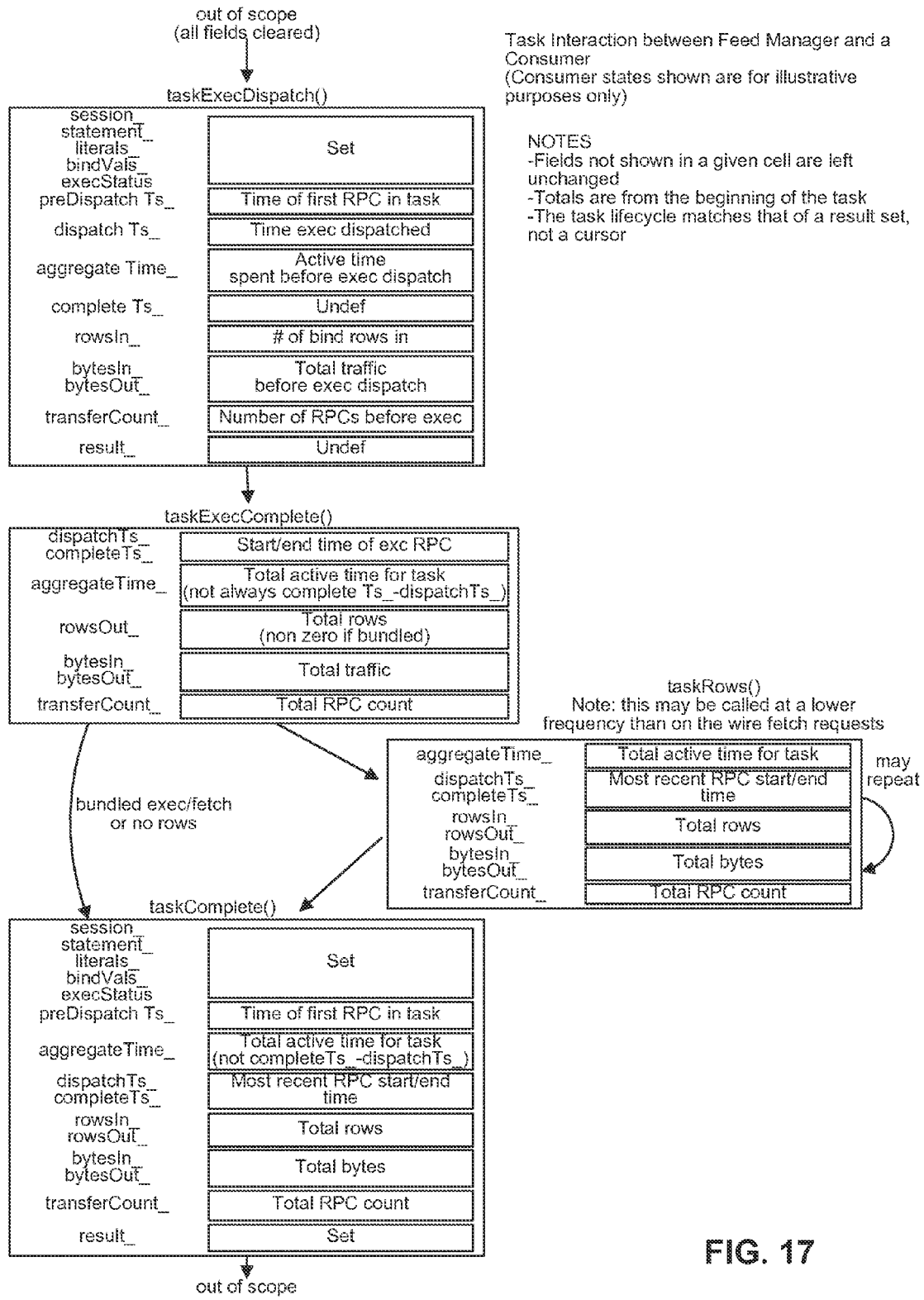
FIG. 17 illustrates an example set of event notifications, according to an embodiment.

FIG. 17 illustrates an example set of event notifications, according to an embodiment. Specifically, FIG. 17 shows the state transitions on a single connection, and describes the interface from the perspective of the application. The calls between states are the semantic actions spoken of above. In addition, the structure shown in FIG. 17 (along with the metadata in FIG. 16) describe the semantic model upon which the semantic actions act. Important contract restrictions across the semantic model API are shown in FIG. 17, according to an embodiment.

4. Language Parsing and Templates

Embodiments of language parsing and templates, which may be performed and utilized, for example, by language and semantics module 1325 and/or analysis modules 1330, 1335, and 1340 in FIG. 13, will now be described in detail. The language processing system, which may encompass modules 1325, 1330, 1335, and 1340, may be referred to herein simply as language system 1325. It should be understood that each of the actions described in this section may be carried out by language system 1325. In an embodiment, language system 1325 analyzes statements (e.g., SQL text) in operations for a request and generates feed byproducts that can be used, for example, by tally module 1345, logging module 1350, learning module 1360, algorithm learning subsystems 1370, algorithm scoring subsystems 1375, and/or scoring module 1365. In an embodiment, these byproducts may comprise:

(1) a semantic signature that identifies the statement as similar to others and assigns it to a template identifier. This signature has the property that two SQL statements compute to the same semantic signature if, and only if, they are substantially identical, ignoring all SQL aspects except literal and bind variable values. In an embodiment, new statement templates are generated as needed, and stored persistently within an internal database.
(2) a lexical analysis of the statement.
(3) a syntactic analysis of the statement.
(4) a semantic analysis of the statement.

4.1. Operation Overview

In an embodiment, language system 1325 analyzes the text of structured data-access commands from lexical and syntactic points-of-view to produce a sequence of discrete tokens and a parse tree, respectively. The semantics of parse trees may be further analyzed in multiple domain-specific ways with a shared semantic analyzer 1340, which computes higher-level semantic properties by analyzing parse trees. Language system 1325 may include multiple instances suited for analyzing a plurality of structured data-access languages and their variants, each producing tokens and a parse tree from a shared set of tokens and parse tree nodes. A specific instance of language system 1325 can be invoked by feed system 1315 with a particular input (e.g., text, such as SQL text).

In an embodiment, language system 1325 provides a common framework for lexically and syntactically analyzing multiple structural data-access languages, with regular expression-based lexical grammars, and Look-Ahead LR (1) parse grammars shared between non-trivially varying dialects via term-rewrite expansion. Both lexical tokens and parser productions for a set of dialects may be represented via completely shared data-type definitions. This vastly simplifies clients by abstracting dialect variation. Semantic analysis may be entirely within the shared domain of parse-tree nodes, and vastly simplified by a top-down, pre-order analysis over homomorphic data types representing parse nodes and parent context.

4.2. Lexical Analyzer

In an embodiment, lexical analyzer 1330 maps input text from multiple structured-data-access languages to sequences of tokens from a fixed, shared set of contructs. This frees abstraction clients from the lexical details of language variants.

4.2.1. Shared Tokens

The concrete tokens used by instances of lexical analyzer 1330 may be generated by language system 1325 from a shared set of token definitions, with rewrites executed, for example, by the m4 macro processor (an open-source tool), which may form a part of language system 1325. For each of the recognized tokens (e.g., of which, in a current implementation, there are four-hundred-eighty-three), the shared definition may comprise:

(1) Token name: a descriptive mnemonic.
(2) Semantic value: parametric data for the token (e.g., of a Standard ML (SML) type, which is a well-known general-purpose, modular, functional programming language with compile-time type checking and type inference).
(3) Token class: classifies tokens (e.g., as one of "synthetic," "keyword," "self," "special," or "dummy").
(4) Token scope: if defined, a bit-mask identifying those structured data-access language variants supporting the token (e.g., variants may include postgreSQL, Oracle™, and Microsoft™ SQL Server™ SQL dialects).

The shared token definitions may be rescanned in domain-specific ways by the lexical and syntactic grammars and supporting SML components described below.

4.2.2. Shared Lexical Analyzer Specification

In an embodiment, language system 1325 generates concrete lexical analyzers 1330 (also referred to herein as "lexers") for language variants based on a single shared specification. This shared specification may be pre-processed by the m4 macro preprocessor to produce concrete lexical analyzer specifications corresponding to the grammar required by, for example, the ml-ulex lexical analyzer generator (an open-source tool). The macro definitions within the shared specification expand to handle the lexical analysis of the supported language variants while maximizing specification sharing between variants.

In an embodiment, the shared specification comprises one or more of the following major elements:

(1) Shared definitions: SML code that defines data types and functions supporting the rules below.
(2) Analyzer states: rules are specialized for multiple lexer states, which, in an embodiment, may include one or more of the following: b-quote, block comment, double-quoted text, x-quote, e-quote, single-quoted text, dollar-quote, bracket-quote, and/or unrepresentable Unicode (e.g., input texts are UTF-8, but with ASCII nulls and unrepresentable characters quoted).
(3) Run-time argument: specifies run-time variables and properties specializing the lexical analysis, and may comprise, in an embodiment, one or more of the following: comment depth, accumulated sub-strings (for a particular lexical state), Boolean indicating whether strings conform to the ANSI standard, Boolean indicating whether high-bit encoding ASCII was seen in a lexical context, Boolean indicating whether a backslash quote was seen, start position of dollar quote, Boolean indicating client-side encoding, current number of literal values seen (lexical analysis provides custom enumeration of literal value positions for various detection algorithms), and/or current number of escaped errors.
(4) Regular expressions: regular expression(s) defining shared and language-variant-dependent token recognizers, which target ml-ulex's regular expression syntax and may be used by the rules below.
(5) Rules: m4 macros expanding to ml-ulex production rules which define the semantics of the ml-ulex-generated lexical analyzer. In a current implementation, there are sixty specific rules in the shared specification before macro expansion.

4.2.3. Shared Token Representation

In an embodiment, all clients of the token-sequence abstraction, above the generated concrete parsers of lexical analyzer 1330, utilize a single shared token representation generated, for example, by m4 macro expansion of a single file to produce an SML structure "SQLLex". Aspects of the specification for the shared token representation may comprise one or more of the following:

(1) a data type "lexeme": a set of token types (e.g., four-hundred-eighty-three token types in a current implementation) as SML zero-arity constructors (mapping one-to-one with the shared tokens above).

(2) a generic enumeration type defining the following functions over the generic lexemes:
   (a) ordinal: maps to a zero-based ordinal.
   (b) string: maps to a descriptive string.
   (c) value: constructs a data type from an ordinal.
   (d) cardinality: the cardinality of the enumeration (equal to the number of lexemes).

(3) a function "lexemeType": maps lexeme to lexeme type (corresponding to the token classes above, defined with a generic enumeration).

(4) a predicate "isLiteral": indicates which tokens represent structured data-access literals in the sense of the DS4 detection algorithm discussed elsewhere herein.

(5) a dialect zero-arity datatype "dialect": comprises one element for each supported dialect and associated enumeration.

(6) a lexical statement class zero-arity data type "stmtClass": indicates the top-level classification of a structured data-access language construct and associated enumeration.

(7) a lexical statement type datatype "stmtType" with associated enumeration representing the concrete language statement type.

(8) a function "typeClass": maps statement type to class.

(9) a function "estimateType": accumulates a purely lexical estimate of a statement's type, given some improper subset of an input statement's lexeme sequence. This estimate is a best-effort mechanism capable of providing putative statement types even for statements which ultimately fail syntactic analysis.

(10) a function "keywordSql": partially maps lexemes to associated SQL keywords, depending upon the concrete language variant generating the lexme (and thereby ignoring keywords that are not defined for the variant).

(11) a function "selfSql": defines self-describing ASCII characters for a particular language variant.

(12) a number of functions and supporting types and data types which accumulate a semantic signature of a statement based on its lexical analysis. This signature depends on all statement tokens except specific literal values (but does depend upon literal lexeme type), and may utilize openSSL (an open-source tool) MD5 functionality.

(13) a number of functions and supporting types/data types representing lexical errors as lexical tokens for non-parser clients.

4.2.4. Generator

In an embodiment, concrete instances of lexical analyzer 1330 are generated by language system 1325 from the common specifications (e.g., via m4-pre-processing) for a plurality of language variants or dialects (e.g., postgreSQL, Oracle™, and Microsoft™ SQL Server™ language variants). The open-source ml-ulex tool may be used to generate near-optimal Deterministic Finite Automatons (DFAs) which implement the lexical analyzers for each supported structured data-access language variant.

4.3. Syntactic Analyzer

In an embodiment, syntactic analyzer 1335 maps token sequences to valid concrete parse trees (e.g., represented as parse nodes) or a syntactic error indication, based on detailed syntax rules of each supported structured data-access language variant.

4.3.1. Lexical Gateway

In an embodiment, parser instances may be generated by language system 1325 from context-free, Look-Ahead LR (1) grammars. However, not all supported structured data-access language variants may be capable of being fully represented this way (e.g., Microsoft™ SQL Server™). A lexical gateway may be used to augment the token sequence emitted by lexical analyzer 1330 (e.g., with a single token of look-ahead) with a semantically equivalent stream modified as follows, to allow for strict LALR (1) parsing:

(1) Composition: two token sequences are mapped to single composite tokens as illustrated in the following table:

| Token 1 | Token 2 | Composite |
| --- | --- | --- |
| NULLS | FIRST | NULLS_FIRST |
| NULLS | LAST | NULLS_LAST |
| WITH | CASCADED | WITH_CASCADED |
| WITH | LOCAL | WITH_LOCAL |
| WITH | CHECK | WITH_CHECK |
| SEMICOLON (MS SQL Server ™) | ICONST | MODULE_NUMBER |

(2) Synthetic statement separator: some language variants (e.g., Microsoft™ SQL Server™) support composite statements which chain together multiple SQL statements with no intervening punctuation whatsoever. This is a decidedly non-LALR (1) construct, which can be handled in the gateway by emitting synthetic CSTMT_SEP tokens immediately before selected tokens which can begin SQL statements (e.g., SELECT, INSERT, UPDATE, DELETE, ALTER, EXEC, EXECUTE, BEGIN, UPDATETEXT, SET, IF, and COMMIT) when within the appropriate context.

4.3.2. Shared Parser Grammar

In an embodiment, language system 1325 implements distinct grammars for the mlyacc open-source tool by expanding m4 macros from a single, shared grammar file which maximizes shared definitions across all supported concrete structured data-access language variants. The specification for the distinct grammars may comprise the following major sections:

(1) Common declarations: a number of useful data types and functions.

(2) Terminals: the mlyacc tool generates token definitions, which may be generated inline from the shared tokens discussed above.

(3) Precedence rules: conditionally defined precedence rules supporting the detailed syntax of supported language variants.

(4) Non-terminals: a number of non-terminals (e.g., two-hundred-fifty in a current implementation) that are utilized by the productions below to describe each supported language variant (e.g., by macro m4 macro expansion).

(5) Productions: define all of the syntactic productions of each supported language variant (e.g., about two-thousand-three-hundred source lines of required productions in a current implementation). The semantic actions for each production produce the common parse-tree nodes discussed below.

4.3.3. Shared Parse Tree Node Representation

In an embodiment, all of the productions from the generated grammars produce concrete parse-tree nodes (generally, fully information-preserving nodes) that are common to each of the structured data-access language variants. Generally, the common parse tree representation and other functionality free the parser clients from having to know the details of each of the language variants. Key aspects of this SML specification may comprise, for example:

(1) Data types and functions representing the complete set of parse errors which can be detected by the concrete parsers.
(2) Lexical and parse exceptions used upon parse failures (or lexical failures for parse actions described below).
(3) A common set of lexical and parse error codes for reporting to the functional and imperative client layers.
(4) Concrete SML types, data types, and enumerations for each kind of parse node. There is no state actually common to each node. Nodes are completely independent from each other and represent specific constructs across all of the language variants. Ultimately, top-level statements in the supported language variants may be represented as polymorphic variants of the SML data type "statement".
(5) A function "stmtType" mapping "statement" to "stmtType" (and associated enumeration) discussed above. This is the parser's determination of a statement type, perhaps, estimated by the lexer.
(6) Utility constructor functions used by the productions of the grammars to instantiate parse tree nodes.

4.3.4. Generator

In an embodiment, concrete instances of the parser are generated from the above m4-expanded specifications, by the open-source mlyacc tool, for each language variant. The resulting parsers will vary by language variant, but the number of generated table entries, in a current implementation, is in the range of twenty-five thousand.

4.4. Functional Interface

In an embodiment, all functional (SML-level) clients of the lexer and parser utilize an interface comprising one or more of the following:

(1) The shared lexical tokens discussed above.
(2) The shared concrete parse-tree nodes discussed above.
(3) An implementation of a lexing/parsing interface defined as:
  (a) Token function: a client-defined token function called to enumerate the token sequence with the following arguments: (i) token: as defined above; (ii) UTF8 substring from the input text (representing the full extent of the token); and/or (iii) a string option providing the canonical representation of certain token semantic values (for those that have canonical representations); and/or (iv) a user-defined accumulator value of a user-defined type. The client-defined token function returns an accumulated value of the same type as above.
  (b) Lex function: lexically analyzes a UTF8-encoded text string (itself encoding ASCII null and non-legal Unicode character sequences with an information preserving transform) with the following arguments: (i) the concrete dialect of the structured data-access language variant to be applied; (ii) a client-specified token function (as above); (iii) UTF8-encoded text to be analyzed; and/or (iv) the initial value passed to the token function and accumulated across all lexical tokens. This function returns a result indicating success or failure of lexical analysis and the accumulated value above;
  (c) Parse function: lexically analyzes and parses a UTF8-encoded text with the following arguments: (i) a concrete language dialect as above; and/or (ii) the UTF8-encoded text to be lexically and syntactically analyzed. This function returns a parse result conveying the root node of the generated parse tree, or an error indication upon parse failure 4.5. Semantic Analyzer In an embodiment, the parse tree, represented by the shared parse nodes discussed above, is completely polymorphic with essentially no commonality. Clients of the parse tree can perform semantic analysis which can be accomplished via a context-accumulating traversal through the nodes of the parse tree.

4.5.1. Generic Parse Tree Traverser

Much of the work associated with various domain-specific semantic analyzers 1340 may be accomplished in a common node representation/traversal framework, which essentially transforms concrete parse-tree nodes into a depth-first, preorder traversal through an Abstract Syntax Tree (AST) that is isomorphic to the parse tree generated above from structured data-access language-variant-specific strings. In an embodiment, such a traverser may utilize the following elements:

(1) data type "parseNode": the polymorphic parse-tree nodes discussed above are mapped, one-to-one, into a single SML data type with a number of variants (e.g., one-hundred-twenty in a current implementation) representing the abstract syntax of the original structured data-access language statements.
(2) data type "context": the context of each AST data type may be represented by a single SML data type with a number of distinct variants (e.g., sixty-nine in a current implementation).
(3) type "visitor": the accumulating state of a depth-first, pre-order traversal of the AST is built by client-defined functions, corresponding to this function type, with one or more of the following arguments: (a) a "parseNode"; (b) the context of the "parseNode" within its parent node; (c) a total accumulation of a client-defined type, recursively built across all of the depth-first, pre-order nodes of the AST; and/or (d) a parent accumulation of arbitrary type, built up solely by callbacks to the ancestor(s) of "parseNode". The "visitor" function may return a tuple comprising: (a) a Boolean indicating that the children of parseNode are to be recursively traversed; (b) the total accumulation, given the above input; and/or (c) the parent accumulation, given the above input.
(4) function "foldParseNode": performs the depth-first, pre-order traversal with one or more of the following arguments: (a) visitor; (b) initial total accumulation; (c) initial parent accumulation; and/or (d) parseNode. This function returns the final total accumulation value.
(5) function "foldStatement": exactly like the foldParseNode function, except that it takes a concrete parse-tree root-statement object.

4.5.2. Doman-Specific Analyzers

In an embodiment, a plurality of domain-specific semantic analyzers 1340 may be implemented. Each of the domain-specific semantic analyzers 1340 may carry out one or more specific functions. Furthermore, each semantic analyzer 1340 may be built using the traversal framework described above, and may comprise or utilize one or more of the following functions:
- (1) function "foldLikeLiterals": this function recursively analyzes the AST associated with a given statement (as above), using the depth-first, pre-order framework, calling back a user-defined function with each "SQLAux.aConst" node syntactically within the context of an SQL "LIKE" operator. It may do this by maintaining a parent stack of "LIKE" applications (particular, differentiated parser conventions on the names of "SQLAux.aExpr" objects of kind AEXPR_OP), and calling back a user-specified function for each embedded "SQLAux.aConst" node. This may be utilized by the parametric detection DP14 algorithm 1980.
- (2) function "foldFuncCallLiterals": this function recursively analyzes the AST associated with a given statement, calling back a pair of functions in the context of function-call applications and literal constants within the context of these applications, respectively. It may do this by traversing the AST (as above), building a stack of function-call evaluation contexts and a stack of "SQLAux.aConst" evaluations, within the function-argument application contexts, and calling back the user-defined functions with these stacks.
- (3) function "foldRecursiveSqlLiterals": this function analyzes the AST associated with a given statement, evaluating a user-specified callback function for each string literal, expected by the semantics of the associated structural data-access language variant, to itself convey text in the same language variant (i.e., recursively). The current implementation recurses the AST as above, filtering for SQL Server™'s explicit or implicit EXEC and EXECUTE statements for the set of recursive stored procedure applications taking SQL literal arguments, and calling the user-defined functions within such contexts.

4.6. Imperative Interface

In an embodiment, the bulk of language system 1325 is implemented in SML, and compiled to executables or dynamic libraries with the MLton open-source tool. SML clients of this functionality may simply call it directly. However, many clients within the disclosed database firewall may be written in the C, C++, or other imperative programming languages. Additionally, the semantics of the code generated by MLton are single-threaded, while the database firewall may be heavily multi-threaded. Accordingly, in an embodiment, a generic multi-threaded SML entry point framework may be provided to resolve these issues. This framework may be provided with an imperative interface to language system 1325.

4.6.1. Multi-Threaded Entry Point Code Generator

In an embodiment, the code generator is a build-time tool which maps general SML-level interfaces to corresponding entry points (e.g., C++ entry points). This provides the necessary utility code to ease integration (e.g., with non-SML-based systems).

The entry point code generator may be driven by a declarative specification. This specification may comprise the following Extended Backus-Naur Form (EBNF) grammar, which specifies a mapping between SML functionality and, as an example, C++ entry points:

```
interface := 'interface' ident '{' types entrypoints map '}'
ident := string c-compatible identifier
```

```
types := 'types' '{' [typelist] '}'
typelist := type [',' typelist ]
type := typeName '{' pairlist '}'
typeName := ident
pairlist := pair [',' pairlist]
pair := 'smlType' '=' ident
      | 'smlReify' '=' ident
      | 'smlAbstract' '=' ident
      | 'cppType' '=' ident | dqstring
      | 'cppIncludes' '=' '[' [cppIncludesList] ']'
      | 'cppReify' '=' ident
      | 'cppAbstract' '=' ident
dqstring := '""' chars '""'
chars := ([^"] | '\"') *
cppIncludesList = dqstring [',' cppIncludesList]
entrypoints := 'entrypoints' '{' eplist '}'
eplist = entrypoint [',' eplist]
entrypoint := ident ':' args return [raisesClause]
args := argList | 'unit'
arglist := eType ['*' arglist]
eType := primType | stringType | jsonType | extType | refType |
         arrayType | vectorType
primType := 'bool' | 'char' | 'int8' | 'int16' | 'int32' | 'int64' |
            'int' | 'pointer' | 'real32' | 'real64' | 'real' | 'word8' |
            'word16' | 'word32' | 'word64' | 'word'
stringType := 'string'
jsonType := 'json'
extType := typeName
refType := primType 'ref'
arrayType := primType 'array'
vectorType := primType 'vector'
return := '->' (eType | 'unit')
raisesClause := 'raises' ':' '{' exn [',' exn]* '}'
exn : ident
map := 'map' '{' [mapList] '}'
mapList := mapPair [, mapList]
mapPair := mapKey '=' ident
mapKey := 'struct' | 'namespace' | 'interface'
```

Copyright 2013 DB Networks.

In an embodiment, the entry point code generator processes input files satisfying the above grammar, and produces one or more instances of a language-specific library (e.g., C++ library) that implements the interface. This makes it very simple for programs (e.g., C++ programs) to utilize (e.g., call) the SML functionality.

While the code generated by the MLton open-source tool is single-threaded (with respect to kernel threads), multiple instances of SML functionality and the run-time code generated above can be linked into a multi-threaded program (e.g., C++ program). This allows parallel SML execution. Accordingly, in an embodiment, run-time support and library functionality (e.g., C++ library) is provided to implicitly or explicitly select a specific instance of the generated code and related SML dynamic library for safe parallel use from another language (e.g., C++), thereby allowing multi-instance run time. In an embodiment, this interface (e.g., C++ interface) may comprise one or more of the following basic elements:

- (1) class "Interface": represents a particular interface generated from the above specification, and may have the following public functions:
  - (a) function "name": returns the name of the interface.
  - (b) generated functions: a function that is isomorphic to each entry point described in the declarative specification and is generated by the code generator.
- (2) class "Library": provides a lockable interface to a specfic instance of a library implementing one or more interfaces per the above specification. It may have the following public functions:

(a) function "instance": returns a unique instance ordinal of the library.
(b) function "isActive": predicate indicating whether the library is currently locked for use by some thread (e.g., C++ thread).
(c) function "manager": returns the manager (below) that controls this instance.
(d) interface "functions": a generated accessor for each entry point implemented by the library.

(3) class "Manager": provides management for all of the available instances of a concrete library, and may include the following public functions:
(a) function "poll": non-blocking call to activate an arbitrary library, and return null if none are available.
(b) function "take": like "poll", but blocks for availability.
(c) function "use": like "take", but provides a lexically-scoped context which automatically frees the taken library when destroyed.
(d) function "release": returns a library to the managed pool.

4.6.2. Language System C++ Interface

In an embodiment, an interface to the SML-based language system described above is provided. This interface may correspond to the following code-generator specification:

```
interface sqlParserI {
  types { }
  entrypoints {
    (* int32_t lexSsq (uint32_t dialect, ssq *sql, lexCB_t lexCB,
    uint8_t **ctx, bool litsOnly, uint8_t *digest, uint32_t *leLen,
    uint8_t *leStr,
    uint32_t *stmtT)
    Lex the given statement, in the given dialect (an ordinal of the
    XXX enum) calling the lexical callback lexCB of the form:
    uint8_t* (lexCB_t* ) (uint32_t lexT, int32_t isLit, uint32_t
    offset, uint32_t len, uint32_t clen, uint8_t *cstr, uint8_t
    *ctx);
    where lexT is an ordinal of the XXX enum, isLit is non-zero if
    the lexeme represents a literal, offset and len provide the
    offset and length of the lexeme within sql, clen and cstr provide
    the length and data for a canonical string representing the
    lexeme's value (if clen is zero, then thee lexme *has* no
    canonical value), and ctx is an application-defined opaque
    context, initially *ctx, but repeatedly "accumulated" returned in
    *ctx (best effort -- includes the effect of all successfully
    recognized lexemes). If litsOnly is non-zero, only callbacks will
    be made for literal lexemes, only. Digest is a caller-allocated
    MD5, 128-bit semantic digest, unique wrt the source sql, EXCEPT
    FOR any literal values within the statement (the returned value
    is best-effort, that is, if a lex error occurs, it will include a
    representation of all of the lexeme's before the error). Returns
    the statement type in stmtT, as an ordinal of
    ef::SqlStatement::Type (this is a best-effort, estimated type and
    may be ST_UNKNOWN). Returns 0, on success, and a non-zero
    error
    code (see the LE_XXX members of SQLAux.errorCode, on lex
    error.
    If error result, and leLen is non-zero, on entry, it contains the
    length of a byte array pointed to by leStr, and on exit, leLen
    will contain the length of the descriptive lex error string
    actually written to this array. *)
    lexSsq : word * pointer * pointer * pointer * bool * pointer *
    word ref * pointer * word ref -> int,
    (* int32_t lex (uint32_t dialect, const char *sql, lexCB_t lexCB,
    uint8_t **ctx, bool litsOnly, uint8_t *digest, uint32_t *leLen,
    uint8 *leStr, uint32_t *stmtT)
    Just like above, but lexes a concrete string, rather than an Ssq.
    *)
    lexStr : word * string * pointer * pointer * bool * pointer *
    word ref * pointer * word ref -> int,
    (* int32_t parse (uint32_t dialect, uint32_t sqlId, const uint8_t
    *sql, uint32_t *peLen, uint8_t *peStr, uint32_t *stmtT)
    Parse sql, in the given dialect, identified with the given sqlId.
    Sql statement type ordinal resulting from the parse is returned
    in stmtT. The function returns a status code, and should never
    raise an exception. On success, 0 is returned, otherwise
    error codes are per SQLAux.errorOrdinal( ), which is parallel with
    SqlStatement::ParseResult. On error, peLen and peStr are
    analogous
    to leLen and leStr, above. *)
    parse : word * word * string * word ref * pointer * word ref ->
    int,
    (* there will be lots of parser-intensive walkers beyond here *)
    (* uint8_t* foldLikeLiterals(uint32_t sqlId, flitCB f, uint8_t
    *ctxInit);
    Fold a function f of the form:
    uint8_t* (*flitCB) (uint32_t likeT, uint32_t lidx, uint8_t* ctx);
    over the parse tree associated with sqlId, where ctxInit is an
    initial, arbitrary state object, likeT is an ordinal in the XXX
    enum, lidx is the offset of the associated literal (in the
    context of the pattern argument to SQL LIKE (and related
    functions)), and ctx is the accumulated state object. Returns the
    final value of the state object. Raises UnknownSqlId if sqlId
    doesn't match a previously parsed/cached statement, or, fails
    ef::SqlStatement::get(sqlId) if not yet cached. *)
    foldLikeLiterals :       word * pointer * pointer -> pointer
       raises : {UnknownSqlId, LexError, ParseError},
    (* uint8_t* foldFuncCallLiterals(uint32_t sqlId, fccCreate
    create, fccAdd add, fclitFCB f, fclitACB, uint8_t* ctx);
    Fold the functions, fclitFCB, and fclitACB of the forms:
    uint8_t* (*fcFCB) (uint8_t *fcc, const uint8_t *fName, word
    fNameSz, uint8_t ctx);
    where fcc is is a stack context (below), funcName is the name of
    a function application (which may or may not involve arguments,
    and ctx is a user-defined accumulating context, and:
    uint8_t* (*fcACB) (uint8_t *fcc, uint32_t lidx, uint8_t *ctx);
    where lidx is the application of a literal at index lidx in the
    lexical sequence of the statement's literal values, to the top
    element of the stack context ctx,
    The stack context for the above calls is built by exactly one
    call to fccCreate, and one or more calls to fccAdd. The first:
    uint8_t* (*fccCreate) (uint8_t **ctx);
    Initializes a user-defined context, returned by the function. On
    entry *ctx is the accumulation context (above), which is also
    returned as *ctx. This call returns an opaque stack context
    passed to the above two functions. The second stack building call
    is:
    void (*fccAdd) (uint8_t *fcc, uint8_t **ctx, const uint8_t
    *fName, uint32_t fNameSz, uint32_t aidx);
    where fcc is a context created by fccCreate, ctx is an in-out
    accumulation context as above, funcName is a represents a
    function invocation (previously the subject of a fcFCB callback),
    and aidx represents an ordinal in the argument spectra of this
    function application.
    ctx is the initial value of the user-defined accumulation
    context. The call returns the final value of this accumulation.
    *)
    foldFuncCallLiterals : word * pointer * pointer * pointer *
    pointer * pointer -> pointer
       raises : {UnknownSqlId, LexError, ParseError},
    (* uint8_t* foldRecursiveSqlLiterals(uint32_t sqlId, flspeCB f,
    uint8_t *ctxInit);
    Fold a function f of the form:
    uint8_t* (*rslCB) (uint32_t lidx, uint8_t* ctx);
    over any recursive literals containing embedded sql statements
    found in the statement associated with sqlId. Returns the
    accumulation of opaque contexts, whose initial value is ctxInit.
    *)
    foldRecursiveSqlLiterals : word * pointer * pointer -> pointer
       raises : {UnknownSqlId, LexError, ParseError}
  }
  map { }
}
```

Copyright 2013 DB Networks.

5. Log and Tally Systems

Embodiments of tally system 1345 and log system 1350, illustrated in FIG. 13, will now be described in detail. Tally system 1345 and/or log system 1350 may record events that are output from feed 1315 for subsequent use by learning module 1360 and master scoring module 1365.

5.1. Log System

In an embodiment, log system 1350 maintains a large wraparound buffer mapped into memory from a file on permanent media (e.g., solid-state drive or other hard drive). The operating system may manage mapping the file (which may be large, e.g., 200+ Gigabytes) into a number of smaller-sized in-core pages using standard memory-mapping facilities. Log system 1350 can use the mapping facilities to map a much smaller section of the overall log into memory. Several such sections can be mapped into memory. As each section fills up with log data, the next section may be used, a new section may be mapped, and an old section may be released. The result, in effect, is a 200-Gigabyte circular buffer of structured messages. The structure of each message may include a length field which determines the start of the next record. In addition, the log buffer may also contain a header region that holds an offset to the next available space (e.g., the oldest record in the system or a blank space).

In an embodiment, many central processing unit (CPU) cores may simultaneously use the log buffer. Thus, entries are not maintained in strict timestamp order. A separate index may be kept in a persistent database which maps from a timestamp range to a range of offsets in the log buffer. This can be used by clients of the log system (i.e., other modules) to find traffic in which they are interested, given a time range with a resolution of, for example, five minutes. It should be understood that the resolution of the time range may be any number of minutes or seconds, depending on the particular design goals. To prevent too many slow accesses to the underlying database, a write-back cache (e.g., of sixty-four five-minute time spans) may be maintained for index entries.

The messages in the log buffer may refer to a previous message, where needed, to avoid duplicating data. A session-creation message can contain the log offset of the connection-creation message with which it is associated. A task-execute message can contain the offset of the session-creation message for the session with which it is associated. When a series of execution requests are chained together, each one can contain a pointer to the very first execution of that request.

The pointers used by the index and the self-references can contain a generation number and a byte offset in the log buffer. The generation number is used to determine if the log has wrapped around, and thus, that the data is no longer available for a given pointer value.

In an embodiment, log system 1350 receives all feed events, extracts all the unique information from them, and then writes them to the next available location in the log buffer. The amount of traffic determines how much time the log buffer can represent. For example, at very energetic, continuous traffic rates (near the top of the system's capacity) a 200-Gigabyte log buffer can hold approximately seven days' worth of traffic. A high level of compression can be achieved due to frequently-used data (e.g., SQL commands, client and server IP specifications, etc.) being written to a separate database once (e.g., the database of feed system 1315) and assigned an identifier (e.g., an identifier from feed system 1315) which is only written in each individual log record. An additional measure of compression can be achieved due to later records back-referencing prior records in a chain of operations, rather than duplicating all the required data with every operation.

Using log system 1350, the output of feed 1315 can be reconstructed between any two logged points in time. Thus, these feed 1315 outputs can drive learning module 1360 and/or scoring module 1365, as if these modules were learning or scoring directly from the feed data in a live capture.

5.2. Tally System

In an embodiment, tally system 1345 keeps summary data for all traffic aligned, for example, on five-minute boundaries (or some other boundary duration). This summary data can be used to create summaries of traffic for learning system 1360, operating interfaces 1395, and the like. Operation of the tally system 1345 will now be described.

In an embodiment, operations and events can be grouped together in tally groups based on one or more of the following:

(1) SQL template identifier from the feed.
(2) time identifier, which is a five-minute span (or other predetermined time span) identified by how many five-minute time periods (or time periods of another predetermined time length) had occurred between a certain time (e.g., Dec. 31, 1969 Universal Coordinate Time (UTC)) and the time in question.
(3) user identifier from a session login record.
(4) service identifier from the session login record, mapped to the server TCP port and name by feed metadata.
(5) client host identifier, mapped to the network IP address and realm of the database client by the feed metadata.
(6) server host identifier, mapped to the network IP address and realm of the database server by the feed metadata.

In an embodiment, one or more of the following data may be kept for each tally group:

(1) Counts of the number of request executions started, number of requests parsed or prepared but not executed, number of requests re-executed (chained), and/or number of requests executed with accompanying fetch data.
(2) Total number of rows and/or bytes transferred from client to server and/or server to client.
(3) Time that the server has spent executing requests.
(4) Time that the server has spent servicing fetch requests.

6. Learning System

In an embodiment, learning system 1360 is responsible for coordinating learning (e.g., model building) for one or more algorithms (e.g., analytical modules used by master scorer 1365). In an embodiment, each of the actions described in this section may be carried out by learning system 1360. There are two primary forms of learning: (1) time-based; and (2) event based. All learning may be specified via operator interface module 1395. For example, an operator may enter parameters and/or commit events to a learning specification through one or more user interfaces provided by operator interface module 1395. These operator-specified parameters and committed events to the specification may be written to an internal database.

Figure 18:
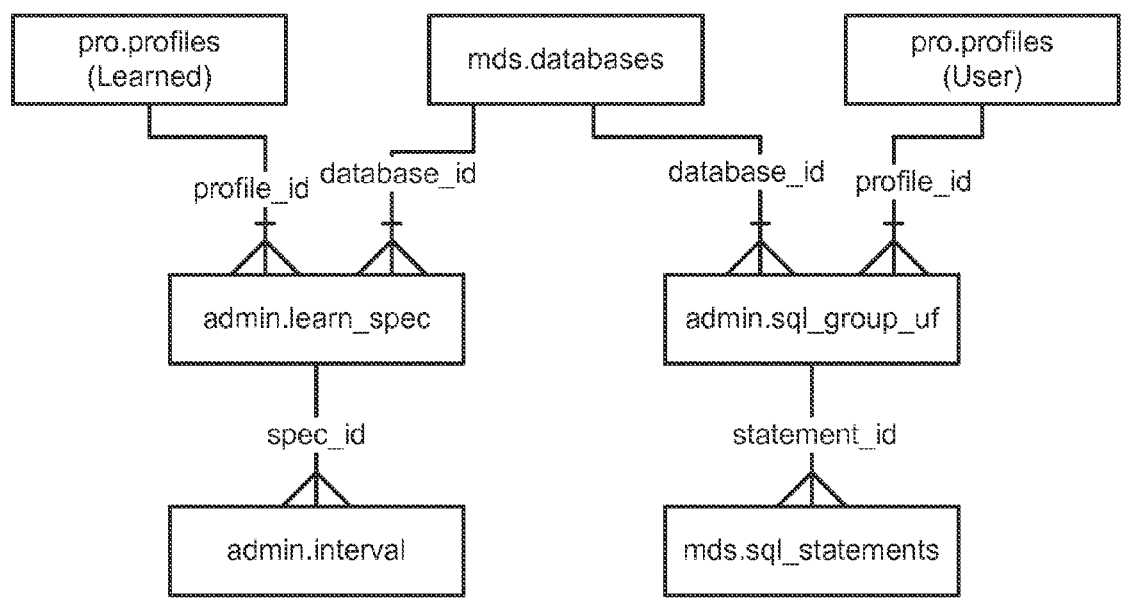
FIG. 18 illustrates an example of a time and user learning schema, according to an embodiment.

FIG. 18 illustrates an example time and user learning schema, according to an embodiment. Specifically, FIG. 18 shows how a learning set for a database can be specified via timed learning (a set of intervals tied together with a learning specification, all under a specific profile identifier, to allow groups of them to be swapped in and out) and via "user" (i.e., per-statement) learning, where a set of statements to be learned are directly specified by the "sql_group_uf" field and an overarching profile identifier. The profile identifiers allow the learning and scoring systems to run multiple times in the same system. Thus, learning and/or scoring can be executed in production mode, and, at the same time, trial learning for a different learning set and/or trial scoring may be executed without disrupting the production activities.

6.1. Time-Based Learning

In time-based learning, an operator identifies a database and a time period or periods that are representative of normal traffic for an application. Using the operator interface provided by operation interface module 1395, a message or signal can be sent to learning system 1360 to initiate a learning cycle. Learning system 1360 can create a database transaction context which each of a plurality of scoring algorithms may use. If any algorithm's learning fails, all learning can be rolled back via this transaction context. Each algorithm is then given the learning specification and calculates learned data based on the data from tally module 1345 and log module 1350 that has been stored for the relevant time period. Some algorithms may depend on calculations performed by other algorithms. Thus, in an embodiment, learning system 1360 executes the scoring algorithms in a specific order. For example, with respect to the exemplary algorithms described in greater detail below, the algorithms may be executed in the following order: DS1, DS2, DS3, DS4, DS6, DS9, DS10, and DP14.

Figure 19:
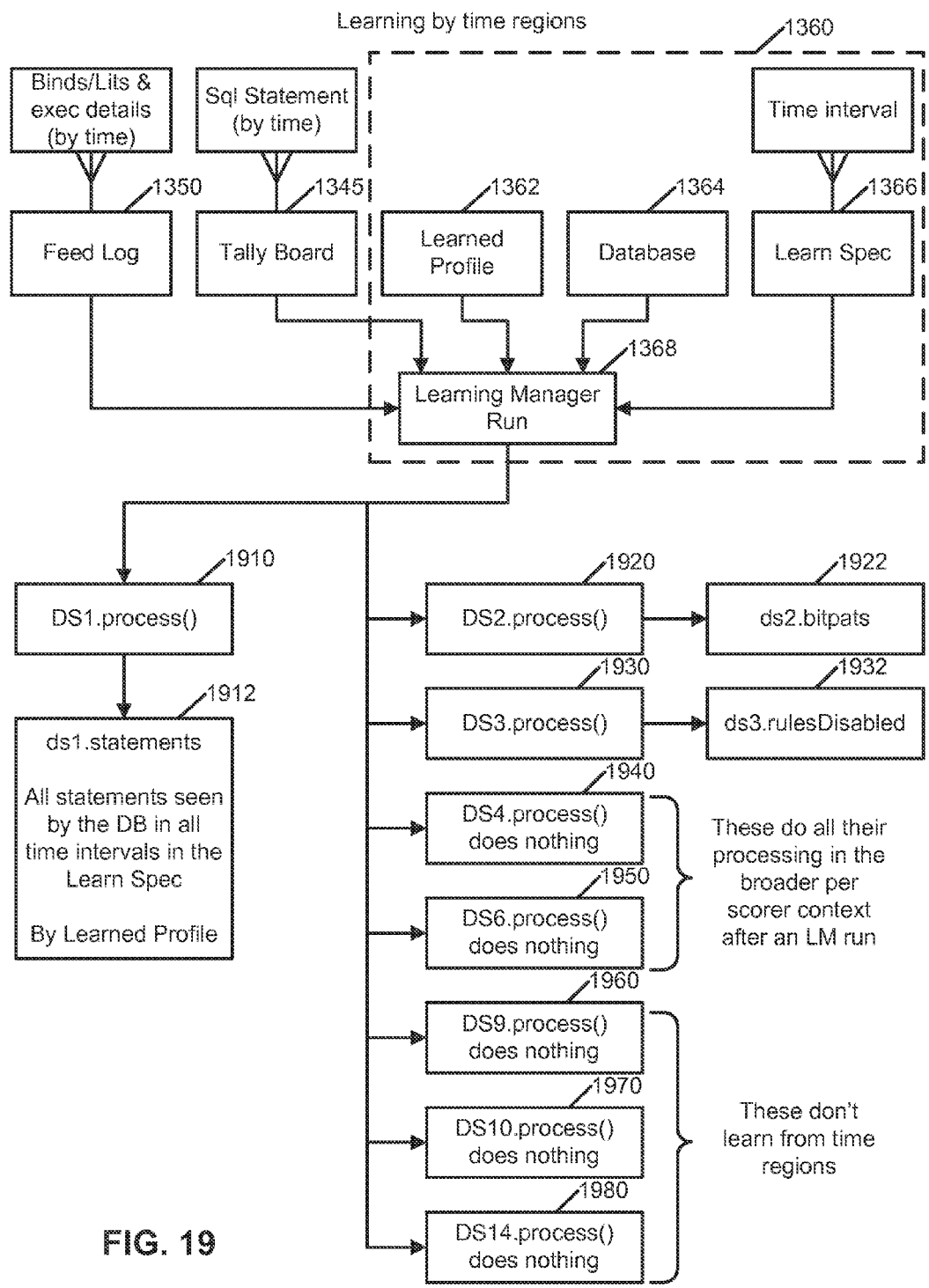
FIG. 19 illustrates example inputs to a time-based learning system and a summary of byproducts of learning for the illustrated algorithms, according to an embodiment.

FIG. 19 illustrates example inputs to a timed-based learning system and a summary of the byproducts of learning for each of the illustrated algorithms, according to an embodiment. In the illustrated embodiment, log module 1350 receives binds, literals, and execution details (e.g., from feed 1315) by time (i.e., for one or more time spans), and tally module receives statements (e.g., SQL statements) by time. Log module 1350 and tally module 1345 then pass output data (e.g., summary data 1355) to a learning manager 1368 of learning system 1360. Learning manager 1368 also receives, as input, a learned profile 1362 and a learning specification 1366, which is based on or includes one or more time intervals. Learning manager 1368 may retrieve the learned profile 1362 and learning specification 1366, as well as other data from database 1364. Learning manager 1368 then executes or initiates execution of the learning phases for one or more scoring algorithms, e.g., using parameters received as or derived from the inputs (e.g., learned profile 1362, database 1364, and/or learning specification 1366). In this learning phase, these algorithms are executed to configure them according to learned profile 1362 and learning specification 1366, i.e., to "teach" the algorithms. For example, each algorithm may comprise a model (e.g., of acceptable traffic) that is updated in the learning phase, according to the input passed to it (e.g., acceptable traffic and/or other input or parameters passed to it by learning manager 1368). This updated model can then be used in the scoring phase to determine whether or not input traffic is acceptable or not.

The scoring algorithms may comprise DS1 1910, DS2 1920, DS3 1930, DS4 1940, DS6 1950, DS9 1960, DS10 1970, and DP14 1980, which are described in greater detail elsewhere herein. One or more of the algorithms may be executed and generate outputs in the learning phase. For example, in the illustrated embodiment, DS1 is executed and produces an output "ds1.statements" 1912 comprising all statements seen by the database, in all time intervals specified by learning specification 1366, for learned profile 1362. In addition, DS2 is executed to produce relevant bit patterns 1922, and DS3 is executed to produce an identification of a set of rules 1932 (e.g., to be disabled). Notably, DS4 and DS6 do not produce outputs in the illustrated learning manager run, since these algorithms are only relevant to the broader context of scoring (e.g., performed by master scorer 1365). Furthermore, DS9, DS10, and DP14 do not learn from the time regions or time intervals of learning specification 1366.

6.2. Event-Based Learning

In event-based learning, an operator may mark certain events, which were previously judged as attacks, as non-attacks, and commit these changes (e.g., using one or more inputs of one or more user interfaces provided by operator interfaces module 1395). Learning system 1360 then includes these marked and committed events in the algorithms' models of acceptable traffic. Specifically, each algorithm that has a learning change is notified that changes have been made to the event-based learning specification(s) by the operator. Accordingly, each algorithm may subsequently recalculate its learned state.

7. Master Scorer

Embodiments and operations of master scorer module 1365, illustrated in FIG. 13, will now be described in detail. Master scorer module 1365 coordinates operation of all the algorithms (e.g., algorithms 1910-1980) to evaluate feed events against the learned models of each algorithm.

Figure 20:
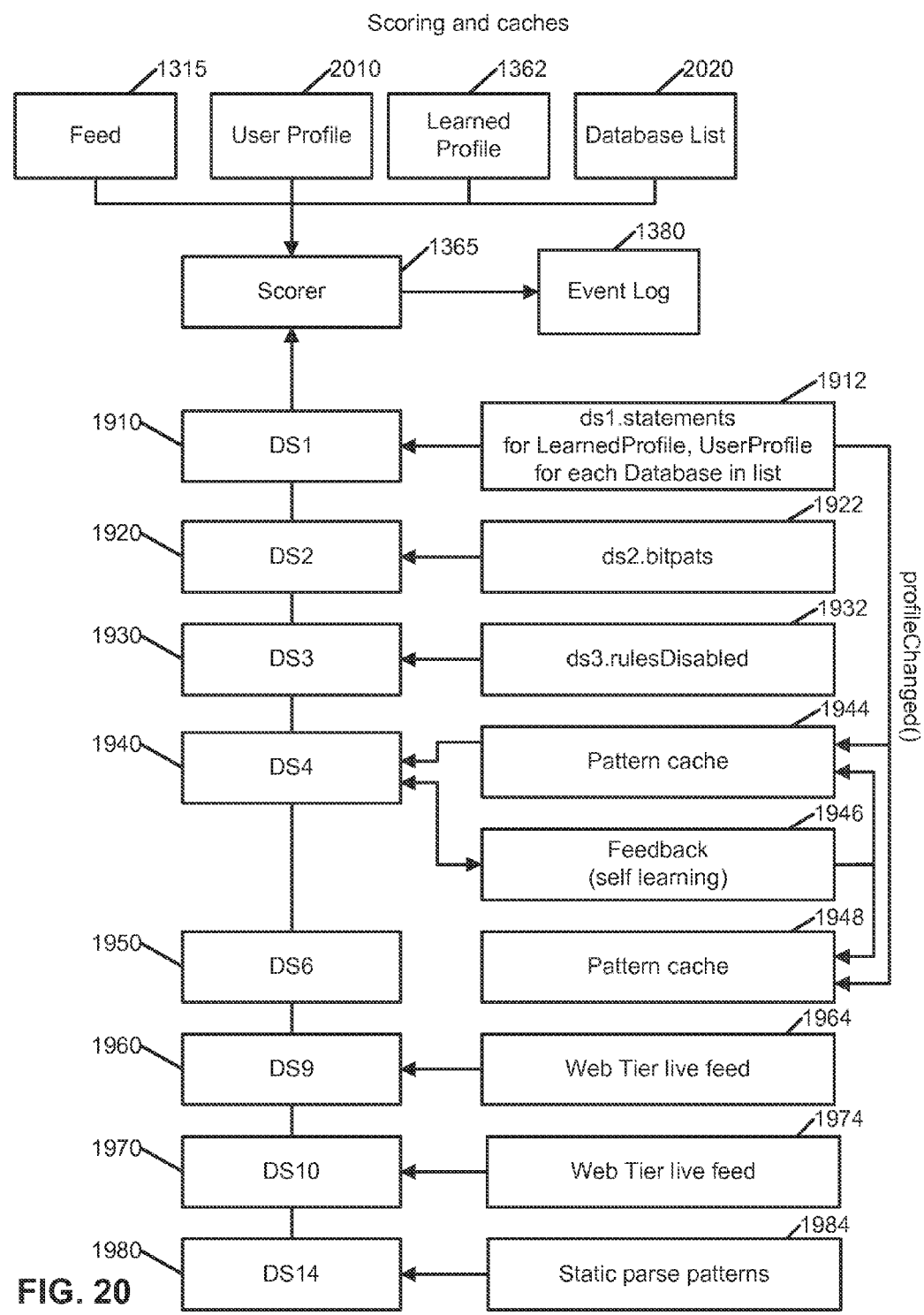
FIG. 20 illustrates a high-level data and control flow around a master scorer, according to an embodiment.

FIG. 20 illustrates high-level data and control flow around master scorer module 1365, according to an embodiment. A feed operation from feed 1315 is passed into master scorer module 1365 for evaluation. Master scorer module 1365 may also receive, as inputs, a user profile 2010, learned profile 1362, and/or a database list 2020. Together, user profile 1010 and learned profile 1362 specify the set of model and feed data upon which master scorer 1365 will operate. In an embodiment, master scorer 1365 could comprise two or more scorers—e.g., one using a test version of user profile 1010, and one using the production version of user profile 1010—while each of the scorers utilize the same learned (e.g., time-based) profile 1362. Database list 2020 is a filter specification, which conveys, to the scorer 1365, which database identifiers are to be scored (all other traffic may be ignored and not scored).

In the illustrated embodiment, master scorer module 1365 signals each scoring algorithm, in turn, that there is an event to be evaluated. Each algorithm then generates a group of concept scores that are dependent on the operation (e.g., database operation) to be evaluated (described in greater detail elsewhere herein). It should be understood that the scoring algorithms may be run serially or in parallel, and that some of the algorithms may be run in parallel, while others are run serially. In an embodiment, each of one or more of the algorithms may have access to scores from earlier runs of the same algorithm and/or other algorithms, such that the scoring generated by the algorithm depends and is affected by the earlier scores. For instance, the illustrated algorithms may be notified by master scorer module 1365 in the following order: DS1 1910, DS2 1920, DS3 1930, DP14 1980, DS4 1940, DS6 1950, and DS10 1970. In an embodiment, the latter four algorithms (i.e., DP14, DS4, DS6, and DS10) are only invoked for events that carry an SQL payload, rather than a simple Remote Procedure Call (RPC) message.

An example embodiment of a scoring method performed by master scorer module 1365 will now be described. In the illustrated scoring method, each algorithm provides a narrow view on the threat level of a given operation. Thus, in isolation, none of the algorithms may provide practical performance due to a high rate of false positives. However, in the described combination, the false-positive rate is significantly reduced to a practically useful level without compromising detection sensitivity, e.g., by combining scores output by two or more of the plurality of scoring algorithms. In the illustrated embodiment, the concepts, intermediate scores, and final score are floating point values in the range 0 to 1, and the following operations (which are binary, unless otherwise noted) are defined:

| Name | Operator | Definition (LHS/RHS = left/right-hand side) |
|---|---|---|
| Fuzzy AND | & | minimum of LHS and RHS |
| Fuzzy OR | \| | maximum of LHS and RHS |
| Fuzzy Multiply | * | numeric product of LHS and RHS |

| Name | Operator | Definition (LHS/RHS = left/right-hand side) |
|---|---|---|
| Equality | == | LHS and RHS are equivalent |
| Greater | > | LHS is numerically greater than RHS |
| Greater or Equal | >= | LHS is numerically greater than or equivalent to RHS |
| Less | < | LHS is numerically less than RHS |
| Less or Equal | <= | LHS is numerically less than or equivalent to RHS |
| Unary Complement | ~ | 1.0 minus RHS |
| Unary is Not Set | is not set | LHS has no value (NULL) |
| Unary is Set | is set | LHS has a non-null value |
| Unary is True | is true | LHS has a value greater than 0.0 |
| Unary is False | is false | LHS has a value of 0.0 |

The illustrated scoring method follows the following logic, in which a named concept from a given scorer (e.g., one of algorithms 1910-1980) is annotated as scorername.conceptname (e.g., DS1.novelty) and in which fuzzy logic operations are used as defined above:

```
[feed event received];
invoke algorithms in order: DS1, DS2, DS3, DP14, DS4, DS6, DS9, DS10;
if (DS4.novelty is not set) { novelty = DS1.novelty; }
else { novely = DS4.novelty; }
if (DS4.isInsertion is not set) { isInsertion = NULL; }
else { isInsertion = DS4.isInsertion; }
if (isInsertion is set) {
   if (DS4.allAdjacent is true) { isInsertion = isInsertion &
      DS4.allAdjacent; }
}
if (DS4.notAppVariation) { notAppVariation = DS4.notAppVariation; }
if (DS6.notAppVariation) { notAppVariation.DS6.notAppVariation; }
fishySQL = DS2.fishySQL;
dosPatterns = DP14.dosPatterns;
if (!novelty) { novelty = 0.5; }
if (!notAppVariation) { notAppVariation = 0.5; }
if (!isInsertion) { isInsertion = 0.5; }
if (!fishySQL) { fishySQL = 0.5; }
if (!dosPatterns) { dosPatterns = 0.5; }
threat = (novelty & isInsertion & notAppVariation)
     | (fishySQL & isInsertion)
     | dosPatterns;
if (DS9.allInsertsFound) { threat = (1.0 – threat) *
DS9.allInsertsFound; }
if (threat >= 0.3) { signal an attack; }
```
Copyright 2013 DB Networks.

At a high level, the example code above calculates, using an infinite-valued logic system ("fuzzy logic"), the final score that the scorer 1365 will assign to events being scored. In this embodiment, the final output is a "threat" value between zero and one, where a threat value greater than 0.3 is considered an attack.

In the example above, the logic blends the concept outputs from the algorithms. Each algorithm produces one or more fuzzy-logic score concepts that make an assertion about some aspect of its model's analysis. For example, "ds1.novelty" is a concept that asserts that, given the specified learning and user profiles, the scored statement was or was not experienced during learning. In an embodiment, this "ds1.novelty" concept is binary, e.g., its value will be either 0.0 or 1.0, with 1.0 representing that the scored statement was not learned. Other concepts, such as the DS4 algorithm's concept of application variation may take on values between zero and one, depending on the "strength" of the assertion (e.g., from certain to uncertain).

In an embodiment, the name of a concept or assetion implies the direction of certainty. For example, a value of 1.0 for the concept "isInsertion" would mean that an algorithm is certain that the scored statement represents an insertion, whereas a value of 0.0 would mean that the algorithm is certain that the scored statement does not represent an insertion. All of the concepts represented by the algorithms may work in this manner. For example, the concept "notAppVariation" may assert, more or less strongly, that a scored event represents something that an application would not do. Given this framework, the fuzzy logic "&", "|", and "!" in the above code can be described as follows:

"&" (fuzzy AND) is the minimum value of its two operands, i.e., the least certain assertion.

"|" (fuzzy OR) is the maximum value of its two operands, i.e., the most certain assertion.

"!" (NOT) simply means the concept was not produced by the algorithm (e.g., the value is undefined, the algorithm could not make any sort of assertion, or a lack of an assertion due to a lack of data or context).

In addition to the scoring method, master scorer module 1365 and/or learning system 1360 may issue advisories based on scored concepts. For example, concepts from DS2, DS3, and DS8 with scores greater than 0.5 (or some other predetermined threshold) may cause an advisory to be issued. These advisories may be delivered as events (e.g., via event notification module 1390), but marked with an advisory indication. This mechanism can be used to alert an operator of potentially unsafe operations (e.g., via operator interfaces module 1395).

8. Event system

Embodiments and operations of an event system, e.g., comprising event log module 1380 and/or event notification module 1390, illustrated in FIG. 13, will now be described in detail. In an embodiment, the event system receives threat notifications from master scorer module 1365. When a threat is signaled, the event system may gather detailed forensic evidence from each of algorithms' 1910-1980 (or a different set of algorithms') scoring activities, including the concepts generated and algorithm-specific data (described in greater detail elsewhere herein). The gathered forensic evidence and data surrounding the feed event itself may be logged into a database (e.g., via event log module 1380). Operator interface module 1395 may also be notified of a new event by event notification module 1390. Thus, operator interface module 1395 can display a summary message, in one or more user interfaces, indicating the severity of the event and/or a control (e.g., input, frame, or other display) that allows an operator to inspect the forensic data. Event notification module 1390 may also send an alert notification via a SYSLOG facility to an operator-defined external network entity.

9. Algorithms

Embodiments of the scoring algorithms 1910-1980, mentioned above, will now be described in detail. While one or more of these algorithms may be described as developing models of acceptable traffic in the learning phase and scoring based on whether captured traffic matches these models of acceptable traffic in the scoring phase, it should be understood that, in other embodiments, these algorithms could alternatively develop models of suspicious traffic in the learning phase and score based on whether captured traffic matches these models of suspicious traffic in the scoring phase, and vice versa.

9.1. DS1

In an embodiment, the purpose of DS1 algorithm 1910 is to classify SQL statement templates as having been learned or not. An SQL statement template is identified by its structural signature. A structural signature of a statement will generally differ if the statement changes in a manner other than a change in the values of its literals.

DS1 algorithm 1910 may maintain a set of all unique SQL templates seen during a learning (e.g., an execution by learning manager 1368). For time-based learning, tally system 1345 may be queried for every unique statement within one or more specified time ranges for a database being learned. For event-based learning, SQL templates associated with operator-marked events may be generated and/or added to the learned set for a given database.

9.1.1. DS1 Learning

Figure 21:
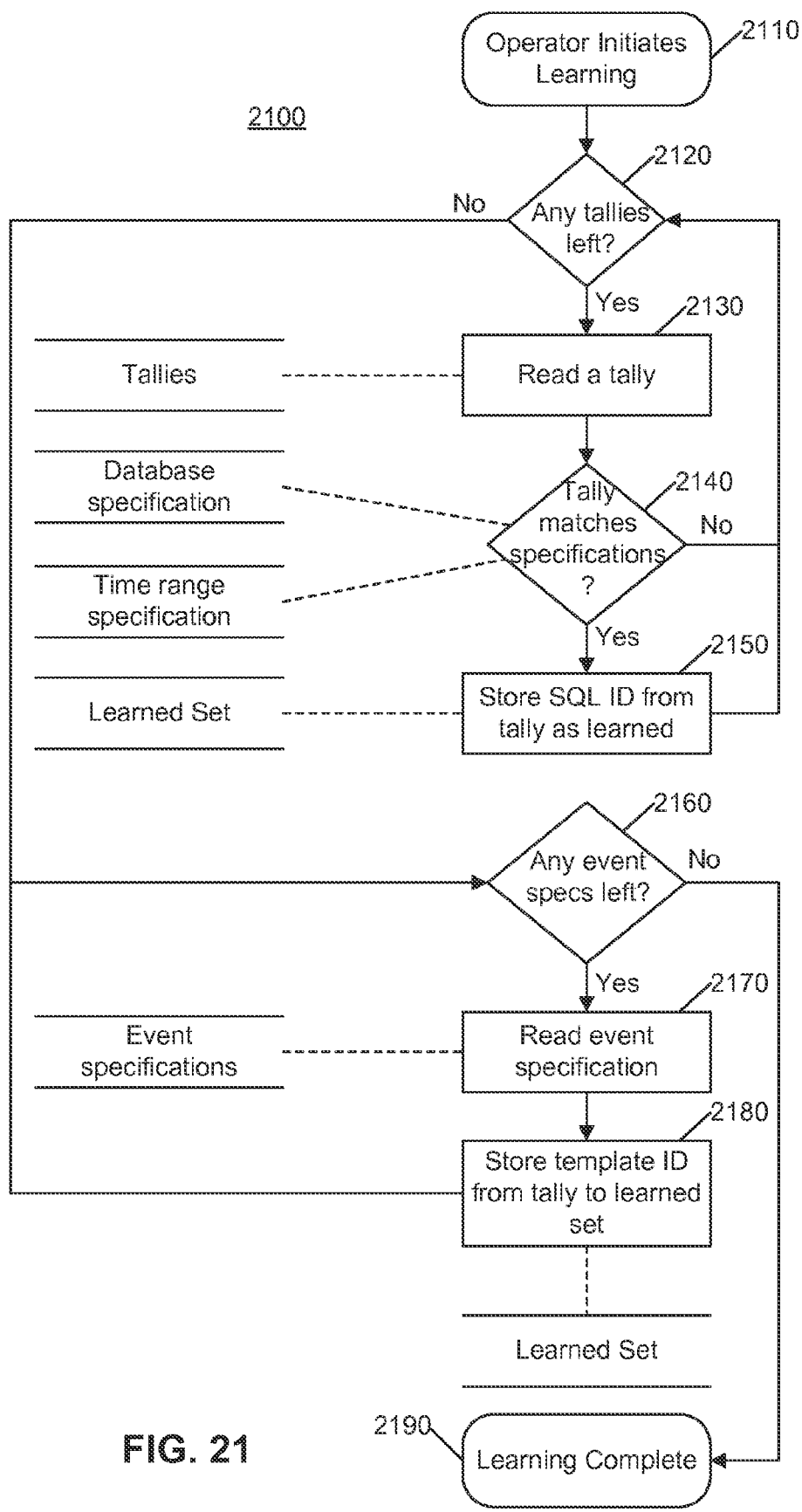
FIG. 21 illustrates a process of generating a set of SQL templates in a learning phase of an illustrated scoring algorithm, according to an embodiment.

FIG. 21 illustrates a process 2100 of generating a set of SQL templates in a learning phase of DS1 algorithm 1910, according to an embodiment. In step 2110, an operator initiates learning (e.g., via operator interfaces module 1395). Alternatively or additionally, this learning may be initiated automatically according to a predetermined schedule or triggering event. In step 2120, it is determined whether any tallies (i.e., recorded operations from tally system 1345) remain. If so, the process proceeds to step 2130; otherwise, the process proceeds to step 2160.

In step 2130, the tally is read. In step 2140, if the tally matches a database specification (e.g., satisfies one or more criteria) and a time-range specification (e.g., is within a specified time range), the process proceeds to step 2150; otherwise, the process returns to step 2120. This specification check, in step 2140, filters out tallies that are for databases other than the one for which learning is being performed or that are outside of the specified time range. In step 2150, an SQL identifier for an SQL template that matches the tally is added to a learned set of SQL templates.

In step 2160, it is determined whether any event specifications remain. If so, the process proceeds to step 2170; otherwise, the process proceeds to state 2190 in which learning is complete. In step 2170, an event specification is read and compared to a database of event specifications. In an embodiment, each tally has a list of event(s) that it represents (e.g., "prepare," "execute," "fetch," and/or combinations thereof). Thus, in step 2170, events can be filtered so that, for example, only events that contain an "execute" are scored.

In step 2180, an SQL identifier for an SQL template that matches the event (i.e., an SQL identifier on which the tally is keyed) is added to the learned set of SQL templates. Accordingly, the output of the process in step 2190 is a learned set of SQL templates.

9.1.2. DS1 Scoring

In an embodiment, in the scoring phase, DS1 algorithm 1910 marks up events with the concept "DS1.novelty". This concept is 0.0 if, for the event being evaluated, an SQL template was found in the set of learned templates (e.g., thereby indicating that the event is acceptable). On the other hand, the concept is set to 1.0 if, for the event being evaluated, an SQL template was not found in the set of learned templates (e.g., thereby indicating that the event may represent an attack).

Figure 22:
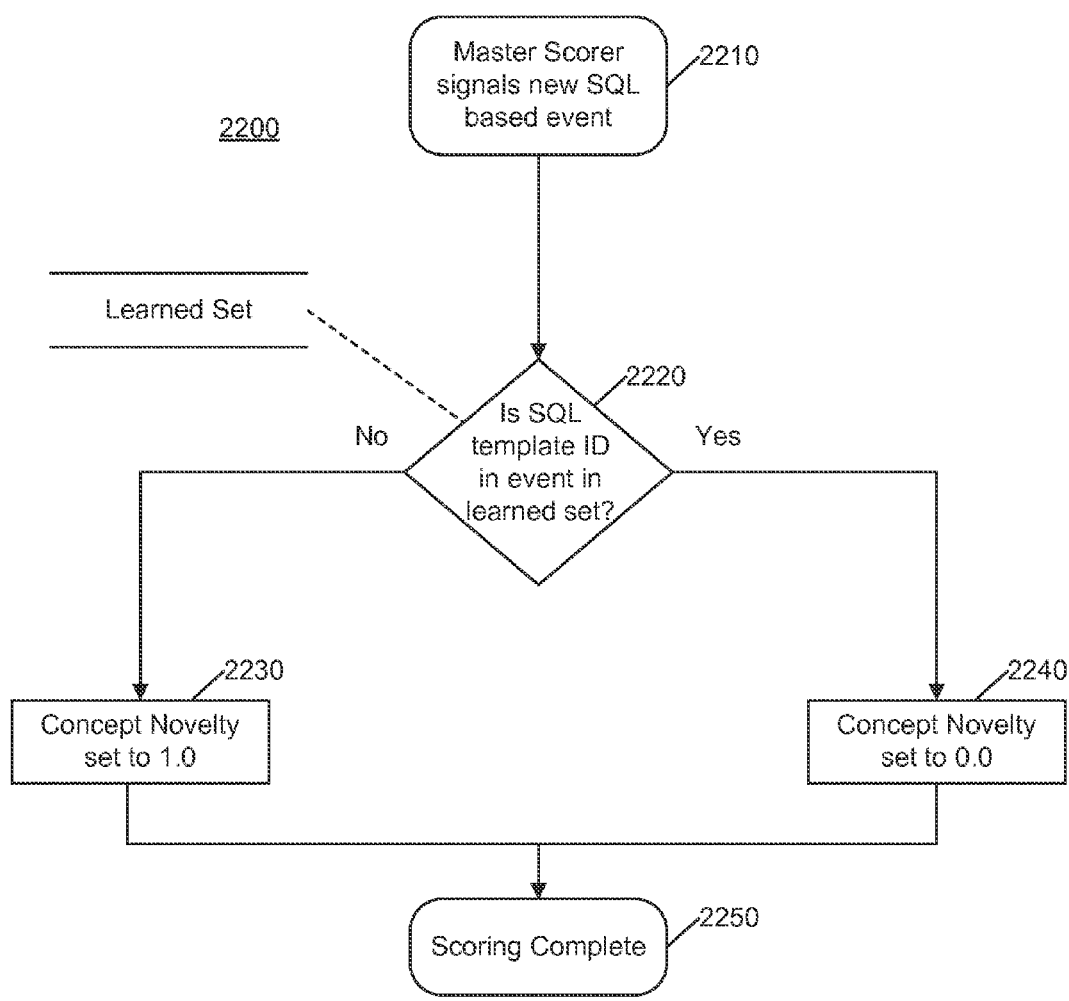
FIG. 22 illustrates a process of scoring in a scoring phase of an illustrated scoring algorithm, according to an embodiment.

FIG. 22 illustrates a process 2200 of scoring an event in a scoring phase of DS1 algorithm 1910, according to an embodiment. In step 2210, master scorer module 1365 signals a new SQL-based event. In step 2220, it is determined whether or not an SQL template, matching the event, is identified in a learned set (e.g., generated by process 2100). If so, the novelty concept is set to 0.0. Otherwise, if a matching SQL template was not identified, the novelty concept is set to 1.0.

9.2. DS2 and DS3

In an embodiment, DS2 algorithm 1920 and DS3 algorithm 1930 are used to detect possible attacks by looking for elements and fragments of a language (e.g., SQL) that are known to be used by attackers or other hackers.

For example, DS2 algorithm 1920 may search incoming SQL for artifacts of an SQL injection. By way of illustration, such artifacts may include SQL inside of comments, multiple inline comments, equality expressions (e.g., "1=1"), etc. The rules or criteria applied by DS2 algorithm 1920 are not attack-specific, and thus, are much harder to fool than a typical black-list expression matcher.

DS3 algorithm 1930 may search incoming SQL for segments that satisfy a set of one or more configurable and upgradable rules. In an embodiment, the rules language understands the various SQL syntaxes of SQL variants. Thus, the rules can be expressed in high-level expressions. Each rule may also comprise or be associated with descriptions to help operators determine why the rule is important and/or why a matching SQL segment is potentially dangerous. DS3 algorithm 1930 is essentially an extension and improvement of a black-list expression matcher.

In an embodiment, DS2 algorithm 1920 and DS3 algorithm 1930 share a number of common attributes. For instance, both may operate on SQL. While neither is often definitive of an attack, both provide evidence of a potential attack and clues about attack techniques. Furthermore, they both can be used during learning to inform (e.g., other scoring algorithms) of possible attacks, during scoring to influence the score, and during analysis to explain what an attack might be trying to do. Both of the algorithms are able to operate regardless of errors in the incoming SQL. In addition, in an embodiment, for both algorithms, rules that are matched during the learning phase (e.g., representing normal SQL operations), are automatically ignored during the scoring phase. In the analysis phase, incoming SQL is rechecked by both algorithms against all of the rules for both algorithms, even if the rule was disabled in the learning phase. Also, an administrator can use both algorithms to improve the quality of an application's code.

However, DS2 algorithm 1920 and DS3 algorithm 1930 may also differ in some respects. For example, DS2 algorithm 1920 may comprise rules to identify artifacts of insertion techniques, and not specific black-list patterns or expressions. These rules may include a rule to identify mismatched parentheses and/or quotes, a rule to identify common insertion techniques such as valid SQL in comments, and/or a rule to identify common equality techniques such as "∥1=1" which can be used to invalidate comparisons.

DS3 algorithm 1930, on the other hand, may comprise rules that are scripted according to "what to look for" and/or "where to look for it." Furthermore, each rule may comprise or be associated with a name and/or description (e.g., containing the attack technique(s) which the rule is designed to help detect). The rules for DS3 algorithm 1930 may comprise rules to identify the use of dangerous functions often used by attackers, rule(s) to identify erroneous operators (e.g., Oracle™-specific operators used for Microsoft™ SQL Server), rule(s) to identify privileged operations not normally allowed by applications, and/or rule(s) to identify statistical or structural information about a database that can be used by attackers. In an embodiment, each rule for the DS3 algorithm 1930 comprises one or more of the following elements or attributes:

(a) Whether the rule is database-specific, or applies to any type of database;
(b) The field type to which the match applies (e.g., operator, function, etc.);
(c) Whether or not the field is "careless" (i.e., whether it matters which case the field is in, since many SQL syntaxes are ambivalent to the case used, i.e., lowercase or uppercase, for keywords or operators);
(d) The severity of the rule (e.g., 1=harmless, 2=annoying, 4=dangerous, 8=crtirical, etc.);
(e) A short description to be used in match summary reports; and
(f) A long description to be used in detailed event reports.

9.2.1. DS2 Learning

In an embodiment of the learning phase for DS2 algorithm 1920, an array of flags may be produced using the following steps:

Step 1: Do a one-pass lexical scan of SQL looking for the following items or group of items, and incrementing one or more counters (e.g., for each of the items) whenever one of the items or groups of items are identified: comment, inline comment, single quote, double quote, non-ASCII text, MD5 string, comment bang, hexadecimal, plus or minus operator, semicolon, union operator, inline comment and SQL, inline comment and a quote, an expression (e.g., Boolean expression) that is always true, and/or an operation comprising an OR operator and an expression that is always true.

Step 2: Examine one or more key counters to determine whether any of them comprise uneven counts (i.e., not divisible by two) and set corresponding flags accordingly. For example, the array of flags may comprise a flag indicating whether or not uneven comments were found ("uneven comments found" flag) and a flag indicating whether or not unmatched quotes were found ("unmatched quotes found" flag). If the counter for comments comprises an uneven number, the "uneven comments found" flag may be set to true; otherwise the flag can be set or retained at false. If the counter for quotes comprises an uneven number, the "unmatched quotes found" flag may be set to true; otherwise, the flag can be set or retained at false. It should be understood that each flag may, but does not necessarily, comprise a Boolean data type, having only two possible values, one for true and the other for false. However, it should be further understood that other data types may be used, including integer values (e.g., the counters themselves), strings, etc.

Step 3: Examine the remaining (non-key) counters to determine whether they are non-zero and set corresponding flags accordingly. For example, the array of flags may further comprise one or more of the following flags that can be set based on an examination of corresponding counters: "one comment found," "multiple comments found," "inline comment found," "single quote found," "double quote found," "non-ASCII found," "MD5 string found," "comment bang found," "hexadecimal found," "plus or minus found," "semicolon found," "union found," "inline comment and SQL found," "inline comment and quote found," "always true found," "OR plus always true found." It should be understood that if the counter for comments is one, the "one comment found" flag can be set to true, if the counter for comments is greater than one, the "multiple comments found" flag can be set to true, if the counter for inline comments is greater than zero, the "inline comment found" flag can be set to true, if the counter for single quotes is greater than zero, the "single quote found" flag can be set to true, and so on.

Step 4: Store the generated array of flags. In an embodiment, the array of flags may be subsequently reviewed and/or edited by an administrator. This array of flags may be subsequently used in the scoring process to disable one or more rules, as described below. For example, depending on whether a flag is set or not set (e.g., true or false), a corresponding one of the rules may be ignored or used in the scoring phase.

9.2.2. DS2 Scoring

In an embodiment, scoring in DS2 algorithm 1920 is optimized to be done quickly, according to the following steps:

Step 1: The same four-step procedure, as performed in the learning phase (described above), is performed on incoming SQL to generate an array of flags.

Step 2: The array of flags learned in the learning phase (described above) is loaded.

Step 3: The loaded array of flags from the learning phase is compared to the generated array of flags. In an embodiment, this comprises inverting and arithmetically AND'ing the loaded array of flags from the learning phase with the array of flags generated in Step 1 of the present scoring procedure (i.e. scored & ^learned). Alternatively, the array of flags generated during this scoring phase could be inverted and arithmetically AND'ed with the array of flags generating during the learning phase (i.e., learned & ^scored). In either case, in this embodiment, the result of the operation is that any flags which were set to true in both arrays of flags will obtain a value of false. Of course, it should be understood that other methods of comparing an array of flags or values may be used.

Step 4: If the resulting array is null (i.e., the result of the operation results in all false values), a score of zero is returned, indicating that no new rules have been violated, and the process ends. Otherwise, if the resulting array is not null, the process continues on to Step 5.

Step 5: If, in Step 4, the resulting array is not null, a score is calculated from the resulting array. In an embodiment, a lookup table may be used to convert the flags set to true (e.g., non-zero flags, or flags with Boolean values of "true") in the array into a single score. This lookup table may map non-matching bit flags to score components, which can then be aggregated into an overall score.

9.2.3. DS3 Learning

In an embodiment, the learning phase for DS3 algorithm 1930 comprises the following steps:

Step 1: The rules for a particular monitored database are loaded into a static instance of DS3 algorithm 1930 at application start-up or initiation.

Step 2: As incoming SQL is input to the instance of DS3 algorithm 1930, the SQL is compared against each of the loaded rules. For each rule that is matched to the SQL, the matched rule is added to a learned set of rules. Matching is performed by evaluating each element of the rule against the SQL input. As a non-limiting example, the following rule expresses that the field type "CSFunction" should be scanned for the pattern "LEAST" for non-Oracle databases, because "LEAST" is an Oracle-only construct:

| # | Field Type | String to Match | DB Type | Severity | Reason | Description |
|---|---|---|---|---|---|---|
| 1 | CSFunction | LEAST | Non-Oracle | 1 | Oracle-only function | max or min number or string in list |

If found, the severity associated with this potential attack may be scored as "1".

Step 3: Once all of the loaded rules have been examined, the learned set of rules is stored. Alternatively or additionally, the set of unmatched rules may be stored as an unlearned set of rules.

These steps may be performed for each of a plurality of monitored databases (e.g., separate database servers or separate databases on the same server), and a learned set of rules can be separately stored for each of the monitored databases.

9.2.4. DS3 Scoring

The scoring phase for DS3 algorithm 1930 may be similar to the learning phase, except that only unlearned rules are examined. In other words, if a match is identified for a particular rule during the learning phase, DS3 algorithm 1930 will not attempt to match that rule during the scoring phase. Thus, while a behavior represented by the rule may perhaps be considered suspicious in the abstract, if that behavior is found to be utilized in the actual application, the corresponding rule will be disregarded in the context of that application.

As an example, in an embodiment, the procedure for the scoring phase comprises the following steps:

Step 1: The unlearned set of rules is loaded into a static instance of DS3 algorithm 1930 at application start-up or initiation.

Step 2: As incoming SQL is input to the instance of DS3 algorithm 1930, the SQL is compared against each of the unlearned rules.

Step 3: For each of the unlearned rules that is matched to the SQL, a score is obtained (e.g., returned, calculated, etc.).

Step 4: Once all of the unlearned rules have been examined and a score has been obtained for each matching unlearned rule, the scores are combined into or otherwise result in a single score. The scores may be (but are not necessarily required to be) combined into the single score in a non-linear way. For example, the unlearned rule having the highest severity may determine the single score.

9.3. DS4

In an embodiment, DS4 algorithm 1940 lexically examines new statements and creates artifacts representing individual concepts. In the scoring phase, these concepts may be combined with concepts from other algorithms to determine whether a newly arrived statement (e.g., SQL statement) is likely an attack. In particular, DS4 algorithm 1940 may be aimed at discovering attacks that are based on injecting further SQL into existing statements.

In an embodiment, the concepts represented by the artifacts created by DS4 algorithm 1940 based on an examined new statement comprise one or more of the following:

(i) The new statement is not based on an edit of any existing statement, indicating that the new statement is not an attack against an existing statement.

(ii) The new statement is a member of a small group of statements based on another statement. If the group is not small, the new statement is more likely to be application variation.

(iii) The new statement fits into an existing statement with a minimal number of edits. A statement with more edits is more difficult to create through injection.

(iv) The new statement can be created from an existing statement where all insertions are adjacent to literals. If all of the insertions are not adjacent, then likely the only way that the new statement could be an attack is if the application allows an external entity to enter native SQL.

In an embodiment, DS4 algorithm 1940 operates by taking statements (e.g., SQL statements) and breaking them down into a series of lexemes. These lexemes are used to represent the natural grouping of characters as syntactic elements in a language, such as SQL. DS4 algorithm 1940 can create either normal lexemes or raw lexemes, the difference being how the literals are represented.

In an embodiment, if normal lexemes are being created, literals are folded into one of two reserved lexemes (represented by lexeme identifiers) for string and numeric literals. A first lexeme identifier would be for string literals, and a second lexeme identifier would be for numeric literals. The literal lexemes are the only lexemes with a predefined value. All other lexeme values are assigned at the time that the string to be turned into lexeme(s) is encountered. The following table illustrates how lexeme identifiers may be assigned in one scenario:

| String | Lexeme Identifier |
|---|---|
| 'This is a string' | 1 |
| 'foo bar' | 1 |
| 23 | 2 |
| 100.34 | 2 |

In an embodiment, if raw lexemes are being created, as the raw lexemes are gathered, the character(s) that define the start or end of a literal string are treated simply as word break characters. For example, in the same scenario illustrated above, identifiers for raw lexemes may be assigned as follows:

| String | ' | This | | is | | a | | string | ' |
|---|---|---|---|---|---|---|---|---|---|
| Identifier | 3 | 4 | 5 | 6 | 5 | 7 | 5 | 8 | 3 |
| String | ' | foo | | bar | ' | | | | |
| Identifier | 3 | 9 | 5 | 10 | 3 | | | | |
| String | 23 | | | | | | | | |
| Identifier | 11 | | | | | | | | |
| String | 100.34 | | | | | | | | |
| Identifier | 12 | | | | | | | | |

All other groups of characters may create unique lexemes. For example, the statement, "select 1.2, foo, 'hello' from bar, where foo>1.3;" would turn into the following lexemes:

| select | | 1.2 | | , | | foo | | , | | 'hello' | | from | | bar | | , | | where | | foo | | > | | 1.3 | | ; |
|---|---|---|---|---|---|---|---|---|---|---|---|---|---|---|---|---|---|---|---|---|---|---|---|---|---|---|
| 3 | | 4 | 2 | | 5 | 4 | 6 | | 5 | 4 | | 1 | 4 | 7 | 4 | 8 | 5 | 4 | | 9 | 4 | 6 | 4 | 10 | 4 | 2 | 11 |

If raw lexemes are used, the same string turns into the following raw lexemes:

| select | | 1.2 | | , | | foo | | , | | ' | hello | ' | | from | | bar | | , | | where | | foo | | > | | 1.3 | | ; |
|---|---|---|---|---|---|---|---|---|---|---|---|---|---|---|---|---|---|---|---|---|---|---|---|---|---|---|---|---|
| 3 | | 4 | 12 | | 5 | 4 | 6 | | 5 | 4 | 14 | 15 | 14 | 4 | | 7 | 4 | 8 | 5 | 4 | | 9 | 4 | 6 | 4 | 10 | 4 | 13 | 11 |

In an embodiment, DS4 algorithm 1940 groups statements into trees by associating one statement with another statement that it may have been constructed from by only adding lexemes. For instance, a first statement "3 4 5 7 8" would not be in the same group as a second statement "3 4 5 8 7", since there is no way to make one from the other simply by adding lexemes. However, a third statement "3 8 4 5 7 8" would be a member of the group headed by the first statement, and a fourth statement "3 8 4 6 5 7 8" would be a member of the group headed by the third statement. When grouping statements together, DS4 algorithm 1940 may use folded literal lexemes.

In an embodiment of DS4 algorithm 1940, to determine how one statement is related to another statement, a modified version of Myers' Diff algorithm is applied to the two sets of lexemes representing the statements. The Myers' Diff algorithm is described by Eugene W. Myers in his paper, "An O(ND) Difference Algorithm and Its Variations," published in Algorithmica, November 1986, which is hereby incorporated herein by reference. The algorithm can be modified to require that the larger statement be only insertions into the shorter statement. Use of this modified algorithm provides a means to compute the minimal number of edits, and therefore, to determine both the most likely statement and the most likely injection point of an attack on an existing statement.

In an embodiment of DS4 algorithm 1940, an edit distance is calculated with the primary key being the number of insertions required and the secondary key being the number of lexemes that are inserted. For instance, if statement A can be created from statement B by a single insertion of ten lexemes into statement B, and statement A can be created from statement C by two insertions of a single lexeme into statement C, statement B is considered to have the minimal edit distance from statement A. Minimum edit distance is used to select what statement is the base or head of the group to which another statement belongs. If there is no way to create statement A from statement B by just adding lexemes, then the edit distance is null.

9.3.1. Learning

In an embodiment, DS4 algorithm 1940 begins by learning statements which may later be subject to injection attack. The learning activity can be limited to grouping statements into groups. These groups can be used to answer the "group is small" question. They can also be used to limit the number of statements which must be examined when looking for the statement that a new statement might be attacking.

9.3.2. Scoring

In an embodiment of DS4 algorithm 1940, scoring initially comprises finding a victim statement. The victim statement is the learned statement with the closest edit distance to the statement being scored. If there is no victim statement, a "forms new group" artifact is true, and no other resulting artifacts have meaning. Given a statement with a closest edit distance, DS4 algorithm 1940 examines the details of the "diff" (e.g., calculated by the modified Myers' Diff algorithm) to create one or both of the following artifacts: a "fits well" artifact which is generated based on the number of inserts required, and an "all adjacent" artifact which is generated by checking to see if the lexemes which were inserted were against a literal lexeme. In addition, DS4 algorithm 1940 may set a "small group" artifact based on the number of statements determined to be in the group headed by the victim statement.

9.3.3. Quoting

Consider the first statement "Select id from users where name='joe' and password='xx';". An example attack may involve inserting "joe';—" as the name, creating the second statement "Select id from users where name='joe';— 'and password'foo';". The naïve thing would be to treat 'and password=' as a literal, and remove those lexemes. This would make it such that the second statement appears to not be an insertion against the first statement.

To work around this, when looking to see if one statement is an insertion on another insertion, the following steps may be taken:

Step 1: Remove the literal lexemes from the statement which is thought to be the victim of an attack. In the above, this would result in the original statement being transformed to "Select id from users where name= and password=;".

Step 2: Turn the statement which is being evaluated as a potential attack into raw lexemes, treating quote characters as stand-alone lexemes, thereby exposing the innards of the quoted string as multiple lexemes. No matter how the quotes are arranged, the attacked statement will look like a series of insertions on the original statement. The following shows the alignment of lexemes:

Select id from users where name= and password=;

Select id from users where name='joe; —' and password='foo';

By doing the diff in this manner, it is clear that, at the spot where literals were expected, what was found was "joe';—". In an embodiment, DS4 algorithm 1940 accomplishes the above by using normal lexemes, with the literal lexemes elided for the statement which is being considered as a possible victim of an attack, and using raw lexemes for the statement which is being scored as a possible attacker. Once the insertions have been found for the statement being scored, a new set of lexemes are generated. These are generated by going through the "diff" output. Any runs of lexemes that were only present in the suspect statement can be turned back into character strings. These character strings can then be turned into lexemes using the normal method. This results in returning literal lexemes for SQL that has not been attacked. Any valid SQL that got subsumed by an attack will not be in the runs of lexemes that are only present in the statement being scored. A "diff" can then be done with the cleaned up set of lexemes and the victim statement to determine the artifacts to be returned.

9.3.4. Performance

When a large number of statements need to be considered, either when forming groups in the learning phase or when looking at a statement during the scoring phase, the time required to perform the operation can become an issue. In an embodiment, one or more of the following techniques are employed to limit the number of statements which must be examined in detail:

(a) Groups ordered by lexeme count. A list of all groups, which have been ordered by the lexeme count of the base statement in the group, is kept. All statements in groups, whose base statement has a lexeme count greater than the statement being examined, are known to create a null edit distance. Thus, once the first group is encountered whose base statement has a lexeme count greater than the statement being considered, no further groups need to be examined;

(b) Check for the ability to be generated only by insertions. It is possible to check in order N time if it is possible to create one statement from another by only insertions. This can be done by setting a pointer to the first lexeme in both the larger and smaller statements. The smaller statement is then iterated through. For each lexeme in the shorter statement, an iterator for the longer statement is repeatedly incremented and checked until it points at the same lexeme as the iterator for the shorter statement. If the end of the longer set of lexemes is reached, it was not possible to create the longer statement from the shorter statement by insertion only. These statements can then be dropped from further consideration.

(c) Group base. If it is not possible to insert the suspect statement into the statement which heads a group, then it is known to be impossible to insert the statement into any member of the group. All statements in the group, by definition, contain all the lexemes in the statement which heads the group in the same order. Therefore, if it is not possible to find the base statement in the suspect statement, it is impossible to find any of the statements in the group, and thus, they need not be considered at all.

(d) Statements ordered by lexeme count. Each group contains a list of statements ordered by lexeme count. Once a statement is encountered whose lexeme count is greater than the lexeme count of the statement being examined, no further statements in the group need be considered as a possible insertion.

9.4. DS6

In an embodiment, the purpose of DS6 algorithm 1950 is to detect structural attacks. Specifically, DS6 algorithm 1950 may identify structural SQL injection attacks that result in new structural data-access statements that are distinct from those new statements commonly emitted by application code generation.

9.4.1. Operation Overview

As previously described, structural injection attacks occur when application-level user input (often, but not necessarily, via the web interface of an application) is merged into structural data-access language statements dynamically generated by an application, in such a way as to form statements lexically, syntactically, and semantically distinct from what was intended by the application.

From the syntactic point of view, the production of a distinct new structural data-access statement (i.e., differing in structure, ignoring literal values, from those previously seen in the normal operation of an application) is a necessary condition for SQL injection attack. Unfortunately, since application tiers can be expected to generate distinct new statements indefinitely, from a wide variety of template-driven, code-generation techniques, this is not a sufficient condition. It is typical for application tiers to dynamically generate structural data access statements from complex templates, instantiated from user input dynamically. Therefore, the full set of syntactically distinct statements generated by the application may emerge slowly over an unknown time scale, which may not even be finite.

The basic theory of operation behind DS6 algorithm 1950 is that, within some syntactic contexts, the evolving set of statements generated by application template expansion can be transformed into trees that are isomorphic to their parse trees, and that these trees can be unified with a tree of pattern-matching nodes. The evolving pattern-matching tree represents the variability of the code generation template(s) of the application, and will admit new, previously unseen statements because they reflect this pattern of application variability. Conversely, attacking statements, arising not from application code generation, but from user input (e.g., SQL injection), will be unlikely to unify with the tree pattern, and thus, will be detected.

9.4.2. Approach

In an embodiment, the polymorphic parse-tree representation, produced by language system 1325, is transformed into a monomorphic representation that is isomorphic with the parse tree, but with certain details flattened to ease pattern recognition. The nodes of this tree may be initially grounded to specific features of the input parse tree, but can be augmented by patterns that represent variation both intrinsic to individual nodes and extrinsic to the tree structure. For any input tree, a grouping can be stateles sly computed which is matched to exactly one evolving pattern. A fast, ordered, top-down tree-difference algorithm to find the minimum top-down edit distance between an input ground-state tree and its pattern can be employed.

This edit distance serves two functions. First, the input can be unified with the pattern by interpreting the edit distance as a minimal set of pattern augmentations, thereby incrementally expanding the patterns to reflect nominal application code generation. This is an example of machine learning. Second, the edit distance can be transformed into an estimate of the likelihood that the input represents structural injection in the domain of the data access language versus expected application code generation variation, thereby detecting injections and discriminating potential false positives.

9.4.3. Implementation

An example implementation will now be described according to a non-limiting embodiment.

9.4.3.1. LABEL, FACET, and TREE Signatures

In an embodiment, the SML signature LABEL defines the intrinsic, potentially comparable state of the nodes of a tree in terms of abstract comparability and equality functions. This allows for the representation of mutable, but comparable, label changes, in contrast to non-comparable, label-type differences.

In an embodiment, the FACET signature expresses the ability to represent the detailed comparison of comparable labels in terms of abstract properties called "facets." This signature supports both detailed, facet-wise comparison of labels and the generation of facet patterns which unify multiple comparable, but non-equal, labels.

In an embodiment, the TREE signature defines trees of labeled, facetted nodes, extending these base formalisms to represent top-down, tree-to-tree comparisons in terms of the insertion, deletion, and replacement of facetted nodes. The TREE signature defines a dynamic-programming-based difference computation which finds the minimum edit distance between two trees in terms of these concepts.

9.4.3.1. LABEL Signature

LABEL is an abstract SML signature for the intrinsic features of a tree node, specifying the following components:

type "label": the opaque state of a label.

function "hash": provides a 32-bit hash value for a label.

function "equals": a predicate comparing two labels for semantic equality. Two labels are considered identical if this function returns true when applied to them.

function "comparable": a predicate indicating whether two labels can be meaningfully compared. Incomparable labels correspond to strictly distinct equivalence classes (see discussion of the FACET signature below).

function "reify": represents a label concretely on a text-oriented data output stream.

function "abstract": creates an abstract label from its concrete representation on a text-oriented data input stream.

function "print": writes a user-sensible representation to a text output stream.

The LABEL abstraction may be implemented concretely as described below.

9.4.3.2. FACET Signature

FACET is an SML signature for a specific pattern-unifying feature of comparable labels. Components may include:

structure "label": a concrete LABEL implementation associated with the FACET.

function "facets": given a "label", optionally provides a function generating a vector of facets for the label, initially unifying only the features of the specific label. If no function is provided, the label has no comparable facets, and trivially matches comparable labels. The order of facets within the vector is significant (see discussion of function "probe" below).

function "index": given a facet, returns the ordinal within the vector returned by function "facets".

function "probe": tests whether a given facet pattern matches a given comparable label, returning one of the following results: NoMatch (the labels do not match with respect to a facet); Match (the labels match with respect to a facet), and MatchImmediate (the labels match with respect to a facet, and, provided that facets with indexes less than that of the specified one also match, no further testing is required to prove label equivalence).

function "augment": unifies a given facet pattern with a given, comparable label, such that a subsequent application of the probe function would return Match or MatchImmediate.

function "domainSize": returns a lower bound of the size of the domain of labels with features unified in the given facet pattern.

function "isSparse": returns true if the given facet admits all comparable labels, such that further augmentations can be skipped without semantic effect.

function "reify": generates an external concrete representation of the facet on a text-oriented stream.

function "abstract": creates an abstract facet from an external text-oriented stream.

function "print": creates a user-sensible representation of the facet on the given text stream.

The FACET abstraction may be implemented concretely as described below.

9.4.3.3. TREE Signature

The TREE abstraction specifies pattern-matching trees with functionality including, without limitation, minimal edit-distance computation, extrinsic (inter-node) pattern matching, and/or unification in terms of the LABEL and FACET functionality discussed above. All of this functionality can be realized concretely without direct reference to LABEL or FACET functionality by the TreeFun SML functor discussed elsewhere herein. In an embodiment, TREE may specify the following (eliding trivial elements):

type "context": an implementation-specified type which represents the augmented state of one or more patterns which can share this context.

type "node": an implementation-specified type which represents both the ground and pattern-matching nodes and their children, recursively.

datatype "nodeType": specifies the extrinsic pattern-matching characteristics associated with a node, which may include: Single (ground, i.e., requiring exactly one node matching the associated one); Plus (requires one or more nodes matching the associated one); Option (requires one or zero nodes matching the associated one); and/or Kleene (requires zero or more nodes matching the associated one). The semantics of matching are non-trivial and discussed below with respect to the function "topDownDiff" of the TreeFun functor.

type "basis": an implementation-defined type that represents the labels which have been augmented to form the pattern intrinsically matching a node. Note that this is distinct from the set of labels which intrinsically match the node.

type "facetCtx": a concrete record representing the intrinsic pattern of a node, and comprising: facets (a vector of facets initially created by function Facet.facets( ) above, but augmented by the basis of the associated node); and basis (the basis of the associated node).

function "foldPre": applies a user-specified function in a depth-first, pre-order fashion, given a user-specified initial value and node. The user-specified function takes a node and user-specified accumulation value as arguments, and produces a new accumulation.

function "foldPost": exactly like function "foldPre", but traverses in depth-first, post-order.

function "mkContext": creates a new context.

function "mkNode": creates a new node given a context, label, and list of child nodes (themselves, previously created).

function "label": given a context and a node, returns the associated label.

function "height": given a node, returns the maximum chain of reference by transitive closure over children. If the node has no children, it returns 0.

function "children": given a node, returns its children.

function "parent": given a context and a node, returns the nodes parent, if any.

function "isParent": given a context and two nodes, returns true if the first node is an improper parent (e.g., in the sense that a node is its own improper parent) of the second node.

function "nodeType": given a context and a node, returns the "nodeType".

function "basisSize": return the number of labels in the given basis.

function "basisFold": apply the given function over the labels of the basis. This function takes a label and a user-specified accumulation value, and returns the final value of the accumulation.

function "facetCtx": given a context and a node, returns the "facetCtx" of the node or none, if it has not yet been cached or is trivially matchable (i.e., comparability implies a match).

type "facetMismatch": a record type describing an intrinsic match failure with the following components: label (the associated label failing to match a node intrinsically); and/or facets (those facets which failed to match the label, or, put another way, those requiring augmentation to allow the label to unify the pattern).

data type "labelMatch": a concrete data type representing the result of attempting to match the intrinsic patterns of two nodes, with variants: LMIdentical (the nodes are identical, in the sense that their labels pass equality and the target has no facets); LMMatch (the nodes match); LMMismatch (the nodes do not match, and conveys a list of "facetMismatch" objects representing the failures, since, in general, pattern-to-pattern matching may be supported); and/or LMIncomparable (the labels associated with the nodes are not comparable, or, put another way, their patterns cannot be augmented).

data type "edit": concrete data type representing the minimal tree edit operations necessary to transform a target node into a source node, non-trivially. Variants may include one or more of the following:

(1) Replace: the target node is an in-place replacement for the source, described by "replacement" below.
(2) Insert: the target is a new node, inserted as described by an embedded record with fields: src (an optional source node to the left of the inserted, or, if none, the insertion is the left-most child of the source node's parent); and tgt (the inserted node).
(3) Delete: the source node was deleted in the target, as described by an embedded record with fields: src (the node which was deleted in the target); and tgt (an optional target node to the left of the deleted, or, if none, then the deleted node is the left-most child of the target node's parent).

type "replacement": represents a target replacement for a source node as a concrete record type with fields: src (source node); tgt (target node); match (labelMatch); widen (an optional widening of the target node type needed to accommodate the source, if needed); and/or edits (an optional "editSeq", described below, defining the recursively defined edits necessary to unify the target into the source pattern).

type "editSeq": a concrete record type describing the cost and edits associated with a replacement, and comprising the following fields: cost (a real number representing the cost of the transformation); and/or edits (a list of "edit-Pairs", described below).

type "editPair": a concrete type representing a costed edit, including the elements of an edit (described above) and a real number representing its cost.

type "diffSpec": a concrete record specifying the way a difference computation is to be accomplished, and comprising the following fields: cost (a function mapping a context and an edit to a real number representing the cost of the edit); threshold (a real number which, if finite, then merge costs above this threshold are not considered by the difference computation but abandoned); and/or map (a Boolean which, if true, always produces an "edit-Map", described below, even if costs are zero and there are no edits).

type "editMap": concrete record type representing the result of a difference computation, and comprising the following fields: context (context); spec (a "diffSpec" specifying the computation); cost (a real number indicating overall cost of the transformation); and/or replacement (a "replacement" describing the necessary mapping).

function "topDownDiff": computes exhaustively the top-down minimal tree edit distance (in terms of the above definitions) given a context, "diffSpec", source node, and target node. Returns an "editMap" if the trees are not trivially matched (or if the "diffSpec" passes true for the map field), which can be used to augment the target-tree pattern into the source-tree pattern.

function "augment": unifies the edits associated with a given edit map into the source-pattern tree, returning a tuple of the new, minimal context and root of the pattern tree;

function "augmentLabel": given a context, node, and label, attempts to unify the label with the node's intrinsic pattern. Returns true if the pattern was modified by unification, or false if it was trivially unified.

function "reify": writes a concrete representation of the given context and tree node, recursively, to the given output stream.

function "abstract": builds and returns a new context and node from the reified data on the given input stream.

9.4.3.4. TreeFun Functor

The TREE signature is implemented concretely by the TreeFun functor, which takes a FACET structure (which itself defines a LABEL structure) as an argument, i.e., completely independent of these details. A fast, top-down, tree edit distance computation may be implemented, which produces a mapping which can be efficiently unified with the source tree pattern. This process can be carried out repeatedly to implement a type of machine learning to recognize structural patterns latent in the input trees. This functionality is the core of the DS6 algorithm's syntactic pattern-recognition detector. Formal SML implementations of each of the key features described in the signature, plus expository text amplifying the most important features of this implementation, will now be provided.

9.4.3.4.1. Key Data Structures

A number of simple data structures can be used to give context to functional descriptions later in this section:

```
type identity = int
datatype node = Node of {
    ident : identity,
    labelIdent : identity,
    height : int,
    children : node list
}
structure LabelArray = MonoArrayFn( type elem = Label.label )
structure LabelQueue = QueueFun( structure Array = LabelArray )
type basis = LabelQueue.queue
type nodeAux = {
    node : node,
    parentIdent : identity,
    nodeType : nodeType,
    facetCtx : facetCtx option
}
structure NodeAuxArray = MonoArrayFn( type elem = nodeAux )
structure NodeAuxQueue = QueueFun( structure Array =
NodeAuxArray )
type context = {
    intern : ( Label.label, identity ) HashTable.hash_table,
    labelMap : LabelQueue.queue,
    aux : NodeAuxQueue.queue
}
```

Copyright 2013 DB Networks.

The node and context types can provide fast "interning" of nodes and labels as integers in an atom table for portable, trivial identity comparisons. In an embodiment, the atom table is implemented as a hash which maps the strict equivalence features of labels and nodes to distinct integers, allowing inexpensive identity comparison. The "nodeAux" record separates the mutable intrinsic and extrinsic pattern-matching aspects of nodes from the nodes themselves. All of the mutable state may ultimately be stored off of the context object.

9.4.3.4.2. Basic Tree Functionality

The following SML definitions illustrate how the above data structures can be initialized and used to implement the basic tree functionality of the signature, according to an embodiment:

```
fun foldPre f a (node as Node {children, ...}) =
    let
        val a' = f (node, a)
    in
        List.foldl (fn (node, a) => foldPre f a node) a' children
    end
```

```
fun size node = foldPre (fn (_, sz) => sz + 1) 0 node
fun foldPost f a (node as Node {children, ...}) =
    let
        val a' = List.foldl (fn (node, a) => foldPost f a node) a children
    in
        f (node, a')
    end
val dummyNode =
    Node {ident = ~1, labelIdent = ~1, height = ~1, children = nil}
val dummyNodeAux =
    {node = dummyNode, parentIdent = ~1, nodeType = Single, facetCtx =
    NONE}
fun mkContext ( ) = {
    intern = HashTable.mkTable
        (Label.hash, Label.equals) (10, Internal),
    labelMap = LabelQueue.queue (10, Label.default),
    aux = NodeAuxQueue.queue (10, dummyNodeAux)
}
fun mkNodeAux
        ({nodeType, facetCtx, ...} : nodeAux)
        (context as {intern, labelMap, aux} : context)
        label children =
    let
        val ident = NodeAuxQueue.length aux
        val labelIdent =
            case HashTable.find intern label of NONE => (* intern new
                label *)
                let
                    val labelIdent = HashTable.numItems intern
                in
                    HashTable.insert intern (label, labelIdent);
                    LabelQueue.append (labelMap, label);
                    A.assertf A.normal (fn ( ) =>
                        if LabelQueue.length labelMap = (labelIdent + 1) then
                            NONE
                        else SOME "hash and label queue out of sink");
                    labelIdent
                end
            | SOME labelIdent => labelIdent
        val height = List.foldl (fn (Node {height, ...}, mx) =>
            if height > mx then height
            else mx) ~1 children
        val node =
            Node {ident = ident, labelIdent = labelIdent, height = height + 1,
                children = children}
    in
        NodeAuxQueue.append
            (aux, {node = node, parentIdent = ~1, nodeType = nodeType,
                facetCtx
                = facetCtx});
        List.app (fn child => updateParent context (child, node)) children;
        node
    end
val mkNode = mkNodeAux dummyNodeAux
fun label ({labelMap, ...} : context) (Node {labelIdent, ...}) =
    LabelQueue.sub (labelMap, labelIdent)
fun height (Node {height, ...}) = height
fun children (Node {children, ...}) = children
fun parent ({aux, ...} : context) (Node {ident, ...}) =
    case #parentIdent (NodeAuxQueue.sub (aux, ident)) of ~1 => NONE
        | idx => SOME (#node (NodeAuxQueue.sub (aux, idx)))
fun isParent ({aux, ...} : context) (Node {ident = pident, ...}) node =
    let
        fun isParent (Node {ident, ...}) =
            if ident = pident then true
            else
                let
                    val {parentIdent, ...} = NodeAuxQueue.sub (aux, ident)
                in
                    if parentIdent = ~1 then false
                    else isParent (#node (NodeAuxQueue.sub (aux, parentIdent)))
                end
    in
        isParent node
    end
fun nodeType ({aux, ...} : context) (Node {ident, ...}) =
    #nodeType (NodeAuxQueue.sub (aux, ident))
val basisSize = LabelQueue.length
val basisFold = LabelQueue.foldl
fun facetCtx ({aux, ...} : context) (Node {ident, ...}) =
    #facetCtx (NodeAuxQueue.sub (aux, ident))
```

Copyright 2013 DB Networks.

Nodes are initialized with ground (dummy) auxiliary state (i.e., no pattern matching), and a number of atom tables are maintained for later efficient comparison (particularly in the tree-difference implementation described below).

9.4.3.4.3. Function "topDownDiff"

With the above definitions, the features of a fast, top-down tree-difference algorithm will now be described. An embodiment may be implemented in SML as follows, in which the comments in the form of "(*Note: <number>*)" correspond to the subsequent exposition:

```
fun topDownDiff
        context
        (spec as {cost, threshold, map}) snode tnode : editMap option =
    let
    (* Note: 1 *)
        fun replacePair (src as Node {labelIdent = srcIdent, ...}, tgt as Node
                {labelIdent = tgtIdent, ...}) =
            if Label.comparable (label context src, label context tgt) then
                let
                    val match =
    (* Note: 2 *)
                        if srcIdent = tgtIdent andalso
                            not (Option.isSome (facetCtx context tgt))
                            (* facetted targets must be checked for congruence *)
                        then
                            LMIdentical
                        else
    (* Note: 3 *)
                            case facetCtx context src
                                of NONE =>
                                    (case Facet.facets (label context src)
                                        of NONE =>
    (* Note: 4 *)
                                            (* always matches, anyway *)
                                            LMMatch
                                        | SOME _ =>
```

```
(* Note: 5 *)
                                                                (* not yet concrete, thus, not yet learned*)
                                                                LMMismatch nil)
                                              | SOME {facets, ...} =>
(* Note: 6 *)
                                                  case matchNodeFacets context (facets, tgt)
                                                        of nil => LMMatch
                                                         | fml => LMMismatch fml
                                       val widen =
(* Note: 7 *)
                                           case (nodeType context src, nodeType context tgt) of
                                               (Single, Single) => NONE
                                             | (Single, nt) => SOME nt
                                             | (Plus, Option) => SOME Kleene
                                             | (Plus, Kleene) => SOME Kleene
                                             | (Option, Plus) => SOME Kleene
                                             | (Option, Kleene) => SOME Kleene
                                             | _ => NONE
                                       val replace =
(* Note: 8 *)
                                           Replace {src = src, tgt = tgt, match = match, widen =
                                                  widen, edits = tdd (src, tgt)}
(* Note: 9 *)
                                       val cost = cost context replace
                                   in
                                       (replace, cost)
                                   end
                     else
                         (Replace {src = src, tgt = tgt, match = LMIncomparable, widen =
                                   NONE, edits = NONE}, Real.posInf)
(* Note: 10 *)
             and tdd (src as Node {children = schildren, labelIdent = slabel, ...},
                      tgt as Node {children = tchildren, labelIdent = tlabel, ...})
                    : editSeq option =
                 let
                     val slen = List.length schildren
                     val tlen = List.length tchildren
(* Note: 11 *)
                     val m : edits Array2.array = Array2.array (slen + 1, tlen + 1,
                                                  (0.0, nil))
(* Note: 12 *)
                     fun add ((cost1, edits), edit : edit) : edits =
                         let
                             val cost2 = cost context edit
                         in
                             (cost1 + cost2, (edit, cost2)::edits)
                         end
(* Note: 13 *)
                     fun merge ((cost1, edits1), (cost2, edits2)) = (cost1 + cost2,
                                               edits2 @ edits1)
(* Note: 14 *)
                     fun nonTrivial (cost, pairs) = cost > 0.0 orelse not (List.null
                                               pairs)
                 in
(* Note: 15 *)
                     List.foldl (fn (src, i) =>
                         let
                             val base = Array2.sub (m, i – 1, 0)
                             val srcType = nodeType context src
                             val edits =
                                 if srcType = Option orelse
                                     srcType = Kleene then base
                                 else
                                     add (base,Delete {src = src, tgt = NONE})
                         in
                             Array2.update (m, i, 0, edits);
                             i + 1
                         end) 1 schildren;
(* Note: 16 *)
                     List.foldl (fn (tgt, j) =>
                         let
                             val base = Array2.sub (m, 0, j – 1)
                         in
                             Array2.update (m, 0, j,(add (base, Insert {src = NONE, tgt
                                     = tgt})));
                             j + 1
                         end) 1 tchildren;
```

|   |   |
|---|---|
| (* Note: 17 *) | ```
List.foldl (fn (src' as Node {labelIdent = slabel, ...}, i) =>
    let
        val srcType = nodeType context src'
    in
        List.foldl (fn (tgt' as Node {labelIdent = tlabel, ...}, j)
            =>
            let
``` |
| (* Note: 18 *) | ```
                val tdd = Future.future (fn ( ) =>
                    (* descend into subtrees *)
                    case replacePair (src', tgt')
                        of pair as (Replace {edits, ...}, cost) =>
                            if map orelse
                                cost > 0.0 orelse
                                Option.isSome edits then
                                (cost, [pair])
                            else
                                (* not needed, after all *)
                                (0.0, nil)
                         | _ => raise Match)
``` |
| (* Note: 19 *) | ```
                val ss =
                    let
                        val base as (cost, _) = Array2.sub (m, i − 1, j
                            − 1)
                    in
                        if not (Real.isFinite cost) orelse
                            (Real.isFinite threshold) andalso
                            cost > threshold then
                            (* over budget *)
                            (Real.posInf, nil)
                        else
                            merge (base, tdd ( ))
                    end
``` |
| (* Note: 20 *) | ```
                val is =
                    let
                        val base = Array2.sub (m, i, j − 1)
                        val is1 as (cost1, _) = add
                            (base, Insert {src = SOME src', tgt = tgt'})
                    in
                        if srcType = Plus orelse
                            srcType = Kleene then
                            let
                                val is2 as (cost2, _) =
                                    merge (base, tdd ( ))
                            in
                                if cost1 < cost2 then is1
                                else is2
                            end
                        else is1
                    end
``` |
| (* Note: 21 *) | ```
                val ds =
                    let
                        val base = Array2.sub (m, i − 1, j)
                    in
                        if srcType = Option orelse
                                srcType = Kleene then
                            base
                        else add (base, Delete {src = src', tgt =
                            SOME tgt'})
                    end
``` |
| (* Note: 22 *) | ```
                val ms = List.foldl (fn (e1 as (cost1, _), e2 as
                    (cost2, _)) =>
                    if cost2 < cost1 then e2 else e1) ss [is, ds]
            in
                Array2.update (m, i, j, ms);
                j + 1
            end) 1 tchildren;
            i + 1
        end) 1 schildren;
``` |

```
(* Note: 23 *)
            let
                    val edits as (cost, pairs) = Array2.sub (m, slen, tlen)
            in
                    if nonTrivial edits then SOME {cost = cost, edits = List.rev
                                                        pairs}
                                       else NONE
            end
        end
     in
(* Note: 24 *)
        case replacePair (snode, tnode)
           of (Replace (replacement as {edits, ...}), cost) =>
                   if map orelse cost > 0.0 orelse Option.isSome edits then
                       let
                           val emap : editMap = {context = context, spec = spec,
                                                 cost = cost, replacement = replacement}
                       in
                           SOME emap
                       end
                   else
                       NONE
            | _ => raise Match
    end
```

Copyright 2013 DB Networks.

In an embodiment, the computation is essentially a kind of dynamic programming that considers the replacement of a source tree node with a target tree node, recursively, so that only mutations at the same level (from the root of the comparison down) are considered. The general solution to the ordered tree-difference problem is known to be at least order $n^4$, given a tree of size n. The unordered tree difference problem is known to be NP-complete, so this simplification may be essential to making the overall approach practical.

The flow of the algorithm can be described as follows, with reference to the notes embedded in the SML implementation above:

Note 1: The algorithm starts with a single call to the "replacePair" utility function, which will determine the cost (i.e., minimum edit distance) and necessary augmentations to replace the source node ("src") with the target ("tgt"). If the associated labels are incomparable, then the resulting "Replace" variant edit object is immediately returned as "LMIncomparable" with infinite cost. At the top level, this indicates that the nodes are not unifiable. When called recursively below, the "tdd" auxiliary function will optimize away from such replacements.

Note 2: In computing the "labelMach", if the source and target nodes are identical AND if the target is not faceted, then the match is identical.

Note 3: Otherwise, if the source facets are not yet cached (and since identity checks failed, this implies a non-match), then:

Note 4: If the source is not faceted, comparability implies "LMMatch".

Note 5: Otherwise, the source facets are not yet concrete and a mismatch is implied (the augmentation will be computed later).

Note 6: If the source facets are already cached, then a utility function "matchNodeFacets" is executed. Function "matchNodeFacets" may be defined with the following SML:

```
fun matchNodeFacets context (facets, tgt) =
    let
        fun addMismatch (label, fml) =
            let
                val facets = matchLabelFacets (facets, label)
```

```
            in
                if List.null facets then fml
                else
                    {label = label, facets = facets}::fml
            end
     in
        case facetCtx context tgt
           of NONE => addMismatch (label context tgt, nil)
            | SOME {basis, ...} =>
                   LabelQueue.foldr addMismatch nil basis
    end
```

Copyright 2013 DB Networks.

The "matchNodeFacets" function computes a list of mismatched facets, and returns a list of non-matching facets, which, if nil, indicates a match ("LMMatch"), and if not nil, indicates a mismatch ("LMMismatch"):

(1) If the target is faceted and cached (which is not true in the usual case in which the target is a ground node), then a basis accumulator is called for each label of its basis. If not cached, then the function is applied to the target label.

(2) The accumulator function calls "matchLabelFacets", which may be defined by the following SML, which accumulates only the non-matching of non-sparse facets, respecting the "MatchImmediate" optimization:

```
fun matchLabelFacets (facets, label) =
    let
        val length = Vector.length facets
        fun nonMatching (idx, nm) =
            if idx = length then nm
            else
                let
                    val facet = Vector.sub (facets, idx)
                in
                    if Facet.isSparse facet then nonMatching (idx + 1, nm)
                    else
                        case Facet.probe facet label
                           of Facet.NoMatch => nonMatching (idx + 1, facet::nm)
                            | Facet.Match => nonMatching (idx + 1, nm)
                            | Facet.MatchImmediate =>
                                    if List.null nm then nil
```

```
            else nonMatching (idx + 1, nm)
        end
    in
        nonMatching (0, nil)
    end
```

Note 7: Any necessary widening of the target "nodeType" promoting is computed, as shown.

Note 8: A "Replace" edit variant with the match and widen fields is computed. Then, the DP algorithm described below recursively produces edits associated with unifying the children of the target and source nodes, and assigns the produced edits as the "edits" field of "Replace".

Note 9: The cost of the "Replace" edit is computed with the user-defined cost function, and the (edit, cost) tuple is returned.

Note 10: The "tdd" function recursively analyzes the children of source and target nodes, considering the various possibilities for unification. In an embodiment, the implementation is broadly based on the principles of dynamic programming, but has been non-trivially extended:
  (1) to accumulated alternative difference/unification information as part of analysis and costing.
  (2) to effect a top-down analysis, vastly reducing the time complexity of this problem.
  (3) to consider extrinsic pattern matching directly within the analysis (also vastly reducing cost).
  (4) a very flexible representation of intrinsic pattern matching as a sequence of orthogonal comparison/costing/unification primitives and combinatorial calculus.
  (5) the representation of top-down extrinsic tree patterns as single, optional, plus, and clean alternatives, differentiated by the comparability predicate.
  (6) potentially budgeted, cutting off branches of non-productive analysis for efficiency.

Note 11: Like the DP algorithm, the approach is to break the overall problem into a number of sub-problems, and to memoize the result of each sub-problem to minimize time complexity. Memoization is an optimization technique that avoids repeating the calculation of results for previously-processed inputs. The two-dimensional array "m" performs this memoization. As per standard DP, the dimension of the array is source-size-plus-one by target-size-plus-one in order to represent all left comparisons and the position to the left of the left-most nodes. The type of the memoization array is tuples of cost/edit list pairs.

Note 12: The "add" utility function takes two arguments: a tuple of cost/edit list pairs and a new edit, which it accumulates into a new cost/edit list pair.

Note 13: The "merge" utility function merges two cost/edit list pairs.

Note 14: The "non-trivial" utility function is a predicate that returns true if a cost/edit list pair cannot be ignored either due to non-zero cost or costless edits, which are possible if the unification is being run simply to identify zero-cost augmentations.

Note 15: The first phase of the algorithm considers the possibility that a source node might be deleted to the left of all target nodes. Since Option and Kleene source nodes admit such deletions, they are considered costless. The cost/edit list tuples in the zero position of the target are updated, representing deletion to the left of the left-most target node.

Note 16: The second phase is analogous to the first, but considers target node insertions to the left of the left-most source node, updating the source zero memoization positions. Note that there is no source pattern to consider, and thus, no analogous role for source "nodeType".

Note 17: The third phase is the most complex, because it considers non-degenerate source/target pairs, determining the minimum cost between replacement, deletion, and insertion.

Note 18: The cost of a potential replacement is just a recursive application of the "replacePair" function. However, it may or may not be needed, so it is computed lazily as a result of the local "tdd" function. If needed, "replacePair" is called and, if mapping is forced or replacement is non-trivial, returns a cost/edit list pair with a single member. Otherwise, the returned tuple is (0.0, nil) representing no cost or edits.

Note 19: The "ss" value represents the potential cost of replacement, but only computes replacement if the base cost (previous sub-problem) is finite and within a user-defined budget. If not, then the cost is infinite, so that this path will be abandoned by the DB algorithm (to avoid incurring additional analytic cost).

Note 20: The "is" value represents the potential cost of insertion to the right of the source position. However, if the source is a Plus or Kleene node, there is the possibility of replacement of the source node (i.e., unification), because this node represents potentially more than one match. Therefore, this cost is compared with the insertion cost, and, if lower, this cost/edit list pair is returned instead.

Note 21: The "ds" value represents the potential cost of deletion of a source node to the right of the target position. If the "srcType" is an Option or Kleene, then this incremental cost is zero. Otherwise, it is added to the base.

Note 22: The "ms" is simply the minimum of replacement, insertion, or deletion, and is memoized.

Note 23: Finally, the (source length, target length) member of the memoization array will contain the minimum cost/edit list pairs, and, if non-trivial, an optional editSeq is returned (the result of the auxiliary function "tdd").

Note 24: As mentioned above, the "topDownDiff" function involves a single call to "replacePair". If the result is a "Replace" variant, and, if mapping is forced or the cost is non-trivial, the optional editMap is returned. Otherwise, unification is trivial and NONE is returned. This is the overall result of the computation.

9.4.3.4.4. Function "augment"

In an embodiment, one key function of the TREE signature is given in a utility function "augmentAux", which takes an "editMap" and produces a new root node which unifies the target node (or pattern) into the source pattern. This guarantees that the new construct and ones like it will be recognized in the future. An implementation in SML is illustrated as follows:

```
fun augmentAux
    ({context = context as {aux, ...}, spec,
      replacement as {src, ...}, ...} : editMap) =
    let
(* Note: 1 *)
        fun augmentNodeAux {src, tgt, match, widen, edits} =
            (case match
(* Note: 2 *)
              of LMMismatch fml =>
                let
                    val srcLabel = label context src
                    val tgtLabel = label context tgt
                    val ({basis, ...}, fml) =
                        if List.null fml then
                            let
                                (* this invariant was implied in topDownDiff *)
                                val fctx as {facets, basis} =
```

```
                    initFacetCtx context (src,
                        Option.valOf (Facet.facets srcLabel) ( ))
                in
                    (fctx, matchNodeFacets context (facets, tgt))
                end
            else
                (* so was this one *)
                (Option.valOf (facetCtx context src), fml)
        in
            List.app (fn {label, facets} =>
                augmentFacets (basis, facets, label)) fml
        end
    | _ => ( );
(* Note: 3 *)
        Option.app (fn nt => updateNodeType context (src, nt)) widen;
(* Note: 4 *)
        case edits
            of NONE => false
             | SOME ({edits, ...} : editSeq) =>
(* Note: 5 *)
                let
                    fun skip (_, hasNRs) = hasNRs
                    fun edit (edit, hasNRs) =
                        case edit
                            of Replace replacement =>
                                let
                                    val hasNRs' = augmentNodeAux replacement
                                in
                                    hasNRs orelse hasNRs'
                                end
                             | _ => true
                in
                    foldEdits context skip edit false (edits, src)
                end)
(* Note: 6 *)
        val spec = specUpdateMap (spec, false)
        fun augmentTree ({src, edits = NONE, ...} : replacement) = src
          | augmentTree ({src, edits = SOME {edits, ...}, ...} :
                replacement) =
            let
                fun accept (src, tgt) =
                    let
                        val aug =
                            case topDownDiff context spec src tgt
                                of NONE => SOME src (* works as is *)
                                 | SOME (emap as {cost, ...}) =>
                                    if Real.isFinite cost then
                                        SOME (augmentAux emap)
                                        (* whatever it takes *)
                                    else
                                        NONE (* not possible *)
                    in
                        Option.app (fn aug =>
                            case nodeType context aug
                                of Single => updateNodeType context (aug, Plus)
                                 | Option => updateNodeType context (aug, Kleene)
                                 | _ => ( )) aug;
                        aug
                    end
                fun skip (child, (nchildren as child'::nchildren', true)) =
                    (* attampt to coalesce *)
                    (case accept (child', child)
                        of NONE =>
                            (child::nchildren, false)
                         | SOME child'' =>
                            (child''::nchildren', true))
                  | skip (child, (nchildren, _)) = (child::nchildren, false)
                fun edit (Replace replacement, (nchildren, _)) =
                    ((augmentTree replacement)::nchildren, false)
                  | edit (Insert {tgt, ...}, (nchildren, new)) =
                    let
                        fun insert tgt =
                            (updateNodeType context (tgt, Option);
                             (tgt::nchildren, true))
                        fun unique node =
                            case nodeType context node
                                of Single => true
                                 | Option => true
                                 | _ => false
                    in
                        case nchildren
                            of nil => insert tgt
                             | nchild::nctl =>
                                if new orelse
                                    unique nchild then
                                    case accept (nchild, tgt)
                                        of NONE =>
                                            (* could not replace, just insert *)
                                            insert tgt
                                         | SOME nchild' =>
                                            (nchild'::nctl, true)
                                else
                                    insert tgt
                    end
                  | edit (Delete {src, ...}, (nchildren, _)) =
                    (case nodeType context src
                        of Single => updateNodeType context (src, Option)
                         | Plus => updateNodeType context (src, Kleene)
                         | _ => ( );
                     (src::nchildren, false))
                val (nchildren, _) =
                    foldEdits context skip edit (nil, false) (edits, src)
            in
                mkNodeAux
                    (NodeAuxQueue.sub (aux, identity src))
                    context (label context src) (List.rev nchildren)
            end
    in
        if augmentNodeAux replacement then
            augmentTree replacement
        else
            src
    end
```

Copyright 2013 DB Networks.

The notes in the SML above will now be described:

Note 1: The utility function "augmentAux" unifies the intrinsic patterns of the source tree as required (given as a replacement). This is all represented as mutable state within the context. Thus, this function returns true if the extrinsic state must be modified (resulting in a new tree), and returns false if only intrinsic changes were made to mutable state, so that the original tree can be returned.

Note 2: If the match is a mismatch, then, if the mismatch list is null, the "topDownDiff" algorithm has indicated that the facet context for the source node has not yet been initialized. Thus, the fact context is initialized here, and then this context and the mismatching unifications are considered here. Otherwise, the cached context and previously-computed mismatch list are considered here.

Note 3: For each mismatch, the function "augmentFacets" is applied. This function updates the basis with the new label, and then calls the client-defined augment method with the same label (a concrete implementation is discussed below):

```
fun augmentFacets (basis, facets, label) =
    (LabelQueue.append (basis, label);
     List.app (fn facet => Facet.augment facet label) facets)
```

Note 4: The widening of node types are applied directly.

Note 5: If there are no edits, then false is returned. No new tree is required since all unifications were intrinsic.

Note 6: If edits are given, then the auxiliary function "foldEdits" is applied. This function traverses the children of the given node, applying the first user-defined accumulator function until the first edit is applicable. Then it traverses the edits, applying the second user-defined accumulator to the edit. It repeats this pattern until children or edits are exhausted, and returns the final value of the accumulator. It may have a SML signature of:

```
val foldEdits :
    context -> (node * 'a -> 'a) -> (edit * 'a -> 'a) -> 'a
    -> (edit * cost) list * node -> 'a
```

Note 7: Compute a new specification. The new specification is like the original, but with the map override set to false (this will be in scope for the "augmentTree" function).

Note 8: The "augmentTree" function computes the new tree, if necessary, for unification.

9.4.3.4.5. Function "augmentLabel"

Function "augmentLabel" may be implemented in SML as follows:

```
fun augmentLabel context (node, label') =
    let
        val label = label context node
    in
        if Label.equals (label, label') then
            false
        else
            let
                val fctx =
                    case facetCtx context node
                     of NONE =>
                        Option.map (fn facets =>
                            initFacetCtx context (node, facets ( )))
                            (Facet.facets label)
                      | fctx => fctx
            in
                case fctx
                 of NONE =>
                    (* trivially matched *)
                    false
                  | SOME {facets, basis} =>
                    (augmentFacets
                        (basis, matchLabelFacets (facets, label'), label');
                     true)
            end
    end
```

Copyright 2013 DB Networks.

9.4.4. Parse Tree Transformation 9.4.4.1. Concrete "Label" Structure

The generic LABEL signature described above (which operates in terms of trees of any facetted, labeled nodes, per the above definitions), which is isomorphic to the language system parse trees, may be implemented using the elements described in the following subsections (excluding trivial elements).

9.4.4.1.1. Data Type "Label"

Data type "label" is a single SML data type representing all possible parse nodes. It is informally, but directly, presented below as SML (the "SQLAux" components are the polymorphic parse-tree nodes produced by language system 1325):

```
structure P = SQLAux
    datatype label =
        SetOp of {
            op' : P.setOperation,
            all : bool
        }
      | ValuesClause
      | Select
      | CTextExprList
      | ExprListOption
      | ResTargetList
      | IntoClauseOption
      | TableRefList
      | ExprOption
      | ExprList
      | SortByListOption
      | SortByList
      | LockingClauseList
      | SelectLimitOption
      | CTextExpr
      | TypeCast
      | FuncCall of {
            aggStar : bool,
            aggDistinct : bool
        }
      | AExpr of P.aExprKind
      | NullTest of P.nullTestType
      | BooleanTest of P.boolTestType
      | SubLink of P.subLinkType option
      | XmlExpr of {
            op' : P.xmlExprOp,
            xmloption : P.xmlOptionType
        }
      | XmlSerialize of P.xmlOptionType
      | ColumnRef
      | AExprConst of P.value
      | ParamRefOption
      | ParamRef of P.paramRef
      | AIndirection
      | CaseExpr
      | ArrayExpr
      | RowExpr
      | MinMaxExpr of P.minMaxOp
      | CoalesceExpr
      | CurrentOfExpr of int
      | TypeNameOption
      | TypeNameList
      | TypeName of {
            timezone : bool,
            setof : bool
        }
      | ResTarget
      | IntoClause of P.onCommitAction
      | TableRef
      | SortBy of {
            sortByDir : P.sortByDir,
            sortByNulls : P.sortByNulls
        }
      | LockingClause of {
            forUpdate : bool,
            noWait : bool
        }
      | SelectLimit
      | RangeVar of {
            istemp : bool,
            inhOpt : P.inhOption
        }
      | RangeFunction
      | JoinExpr of {
            jointype : P.joinType,
            isNatural : bool
        }
      | RangeSubselect
      | NameList
      | Name of string
      | NameOption
      | AliasOption
      | Alias
      | ColumnDefList
      | ColumnDef of bool
      | JoinQualOption
      | JoinQual
      | CaseWhenList
      | CaseWhen
      | IndirectionElList
      | StringIEl
      | AIndicesIEl
      | NullIEl
      | SetToDefault
      | ConnectByOption
      | ConnectByClause of bool
      | PriorExpr
      | Insert
      | InsertColumnItemList
      | InsertColumnItem of string
```

-continued

```
| SelectStmtOption
| WhereOrCurrentClauseOption
| WhereOrCurrentClause
| SetClauseList
| Update
| Delete
| AlterSessionSet of string
| AExprList
| Exec
| ExecModule of string option
| CompoundStmt
| ModuleParamList
| ModuleParam
| MPVConstValue
| MPVKeyword
| MPVParamVar of bool
| MPVNullValue
| MPVDefault
| ExecOptionList
| XORecompile
| XOResultSets
| ResultSetDefListOption
| ResultSetDefList
| RSDInline
| RSDObject
| RSDType
| RSDXml
| InlineResultSetDefList
| InlineResultSetDef of bool option
| Use
| SetStmt
| SetBinaryClause of bool
| SetExprClause
| Block
| UpdateText of {bulk : bool, withLog : bool}
| UpdateTextSrcOption
| UpdateTextSrc
| UpdateTextObject
| SetTransaction
| TransactionIsolation of P.transactionIsolation
| TransactionMode of P.transactionMode
| TransactionRollbackSegment
| IfStmt
| SimpleStmtOption
| TopClauseOption
| TopClause of {percent : bool, withTies : bool}
| LtdTableHintList
| LtdTableHint of P.limitedTableHint
| CommitStmt
| CommitClause
| CommitScopeOption
| CommitAuxOption
| CommitScope of P.commitScope
| CommitAux
| FromList
| FromListElm of bool
| TableHintList
| TableHint of int
| IndexTableHint of bool
| THIndexForceSeekOption
| THIndexForceSeek
| SelectType
| SqlStatement
```

Copyright 2013 DB Networks.

9.4.4.1.2. Function "mkSqlStmt"

Function "mkSqlStmt" generates a Tree.node for an input Tree.context and top-level parse tree statement (SQLAux.statement). In other words, it maps concrete parse trees to isomorphic nodes which can be manipulated by the DP machinery discussed above, unified in the pattern-matching sense, and is crucial to the system's operation as an effective injection detector. The isomorphism implemented by this function is trivial, i.e., parse-tree nodes map one-for-one to Tree.nodes, except for a few crucial cases found by a combination of design and empirical evidence. This procedure may be described informally with SML source code, which recursively generates a Tree.node root for a top-level parse tree statement, as follows:

The notes in the SML above will now be discussed:

Note 1: In most cases, optional components are mapped to explicit option nodes to simplify extrinsic pattern matching in their parents (i.e., a single node, with or without children, is always present).

Note 2: Expressions are the most complex type, dependent upon the parse node expression variants.

Note 3: Left-associative AExpr nodes are destructured as lists of expressions to give the extrinsic pattern matcher something more "bushy" to work on. This approach, which has non-trivial benefits in the overall number of false-positive rejections, was discovered empirically by direct experimentation with sampled applications.

Note 4: This normalizes SQL Server™ module naming.

Note 5: The top-level result of this function is always "SqlStatement", with the children resulting from "mkNode" above.

9.4.4.1.3. Function "hash"

Function "hash" maps each of the label variants to ordinal integers. The hash may comprise a bitwise XOR of these integers. The state associated with the variants is recursively analyzed.

9.4.4.1.4. Function "equals"

Function "equals" provides the system equals operator, since data types are "eqtypes", defined recursively.

9.4.4.1.5. Function "comparable"

Function "comparable" returns false if the labels are different variants. For "AExpr", the function also requires that the associated expression kinds match. This ensures that intrinsic matching is not attempted between dissimilar expressions. For "ExecModule", the function requires that module names are equal. This ensures that intrinsic matching is not attempted for argument spectra from different stored procedures. This approach was discovered empirically with actual application data.

9.4.4.2. Concrete "Facet" Structure

FACET may be implemented concretely for the TREE structure. A complete implementation may be given in SML as follows:

9.4.5. Detector

In an embodiment, the DS6 sytnactic pattern-based injection detector has the following interface to the database firewall, described herein, and may have the following implementation that utilizes the above functionality:

function "score": computes a score given an integral database identifier, and "sqlIdent" object (referring to an SQL statement). The form of the "sqlIdent" may be represented using the following SML, which reflects the fact that some statements have children (e.g., a stored procedure call with an SQL-text argument) which are also statements, and therefore, must also be analyzed recursively:

```
type dbKey = int
type sqlId = dbKey
type 's composite' = {
  base : sqlId,
  children : 's list
}
datatype 's composition' = SIMPLE | COMPOSITE of 's composite'
datatype sqlIdent =
  SqlIdent of {sqlId : sqlId, composition : sqlIdent composition'}
(* ground it all *)
```

-continued

```
type composite = sqlIdent composite'
type composition = sqlIdent composition'
```

Copyright 2013 DB Networks.

The resulting score may be represented in the following SML form:

```
datatype error =
    ERR_PARSE of SQLAux.error (* general failure to lex/parse *)
    | ERR_PATTERN (* there is no valid pattern due to parse errors *)
    | ERR_BUDGET (* budget exceeded, no difference/augmentation
        possible *)
type score = {
    notAppVariation : real option, (* 0.0 - 1.0 *)
    nonMatching : int,
    errors : error list
}
```

Copyright 2013 DB Networks.

The score represents the level of confidence that DS6 algorithm 1950 has in the proposition that a statement is an attack and not likely arising from application variation. In an embodiment, DS6 algorithm 1950 may be implemented as follows, according to an embodiment:

(1) Recursive analysis: if the "ident" passed above represents a composite statement, then the base case and all children are analyzed. Otherwise, just a single case is analyzed. However, the analysis is the same in both cases, and is simply accumulated in the composite case.

(2) Caching: when scoring a particular SQL statement, a fast in-memory cache may be consulted first. Thus, the same statement is not repeatedly analyzed when results are returned from the cache.

(3) Cache miss: on a cache miss, the SQL text is first located in a metadata system (MDS). The MDS is an embedded SQL database which is queried. The resulting SQL text is then parsed by language system 1325 (discussed above), and the resulting SQL text and parse tree are considered.

(4) If a parse error occurs, then the statement cannot be scored by DS6 algorithm 1950, and an error result is returned (e.g., to the caching layer).

(5) On parse success, the statement is statelessly matched to a group identifier by top-level statement type (in the parse tree). This group defines a common context for pattern matching.

(6) A cache matching a group identifier to a "Tree" pattern is checked to find the tree pattern associated with the group:

(7) If not found, then a pattern is synthesized as follows:
  (a) The set of all matching statements matching the group (by type, pre-computed by language system 1325, and stored in MDS) is read from the database (the members of this set were established by learning manager 1368 and stored persistently).
  (b) A digest based on these statement identifiers is computed and a DS6 database table is consulted for a persistently stored pattern.
  (c) If the persistent pattern is not found in the database, then a pattern is built:
    (i) Each statement of the group is considered in turn.
    (ii) Each statement is parsed as above.
    (iii) For the first statement, a new pattern, entirely grounded by the statement is constructed as described above.
    (iv) For subsequent statements, the top-down tree difference and unification information is computed between the accumulating pattern and the augmenting statement.
    (v) If augmentation is required, the statement is unified with the pattern.
    (vi) The final pattern, unifying all of the statements of the group is written to the persistent database and returned.
  (d) If a persistent pattern is found, it is validated:
    (i) The previously computed digest is compared with a persistent form stored with the pattern. If it matches, then no changes have been invalidated the pattern, and it is returned.
    (ii) If the persistent pattern is invalidated, due to changes in learning manager 1368, then a new version of the pattern is created, per the above procedure, the persistent store is updated, and the pattern is returned.

(8) If a cached pattern is found, then it is validated:
  (a) An in-memory generation identier is checked. A match indicates that no changes have been made in learning manager 1368. Thus, the pattern is trivially validated.
  (b) The digest for the group is computed, as per above. If it matches the pattern, it is validated and returned.
  (c) If the digest fails to match, then the pattern is freshly created, per the above procedure, the persistent store is updated, and the pattern is returned.

(9) The in-memory pattern cache is updated with the validate pattern.

(10) A top-down difference is computed, per above, for the statement with respect to its pattern.

(11) If the statement is trivially unified with the pattern, a zero cost is associated with the result.

(12) If the statement is non-trivially unified, the cost function used by the difference algorithm is non-trivial, and the cost is returned for consideration. This cost function may be given by the following SML:

```
fun cost context edit =
    case edit
    of Tree.Replace {match, widen, edits, src, ...} =>
        let
            val m =
                case match
                of Tree.LMIdentical => 0.0
                | Tree.LMMatch => 0.0
                | Tree.LMMismatch nil => 1.0
                | Tree.LMMismatch fml =>
                    let
                        val {facets, ...} =
                            Option.valOf (Tree.facetCtx context src)
                        val bits =
                            BitArray.array (Vector.length facets, false)
                    in
                        List.app (fn {facets, ...} => List.app (fn facet =>
                            BitArray.update (bits, Facet.index facet, true))
                            facets) fml;
                        Real.fromInt
                            (BitArray.foldl
                                (fn (true, nm) => nm + 1
                                | (false, nm) => nm) 0 bits) /
                            Real.fromInt (Vector.length facets)
                    end
                | Tree.LMIncomparable => raise Match
            val lcl = case widen of NONE => m | SOME _ => m +
                ((1.0 − m) / 2.0)
            val st = case edits of NONE => 0.0 | SOME {cost, ...} => cost
        in
            lcl + st
```

```
end
 | Tree.Insert {tgt, ...} => Real.fromInt (Tree.size tgt)
 | Tree.Delete {src, ...} => Real.fromInt (Tree.size src)
```

Copyright 2013 DB Networks.

(13) The resulting score is cached in memory for subsequent use.

(14) The cost of all of the potentially recursive events is accumulated, and then translated into a score measuring the systems confidence that the statement can be unified with the associated patterns via the formula: score=$0.5^{cost}$.

(15) The final value of notAppVariation returned is: 1.0—score. This reflects the DS6 confidence in the proposition discussed above.

function "createEvent": given an event identifier and an "sqlIdent" object, stores, in DS6's persistent database, sufficient information to describe DS6's attack evidence for subsequent reporting and archiving (regardless of how learning sets and patterns may be modified in the future). This function may be implemented as follows:

(1) Record top-level information about the event from the DS6 algorithm's point-of-view:
  (a) Event identifier.
  (b) Profile (passed by learning manager 1368).
  (c) Database (also, from learning manager 1368). All DS6 scoring may be in the context of a specific database).
  (d) SQL identifier (of the top-level statement, if recursive).
  (e) top-level score.
(2) For each base or recursive SQL text associated with the statement, utilize the same procedure as for scoring. For each costed comparison greater than 0.0, create auxiliary information including:
  (a) Event identifier.
  (b) SQL identifier.
  (c) pattern digest.
  (d) cost.
  (e) digest.
  (f) reified pattern (for subsequent regeneration and reporting).
  (g) group identifier.

9.5. DS8

In an embodiment, a DS8 algorithm (not shown) is provided to test for lexical errors, e.g., in SQL-based operations. The DS8 algorithm may analyze the learned set from DS1 algorithm 1910 for lexical errors. The templates thus extracted can be stored in a learned set of the DS8 algorithm.

In an embodiment, if the learning phase of the DS8 algorithm is initiated (e.g., by an operator or automatically), the DS8 algorithm iterates through each template in the learned set of templates generated by DS1 algorithm 1910. For each template in this learned set of templates from DS1 algorithm 1910, the DS8 algorithm determines whether the template has lexical error(s). If the DS8 algorithm determines that the template has lexical error(s), the template is stored in a learned error set by the DS8 algorithm.

In an embodiment, in its scoring phase, the DS8 algorithm uses the language system analysis of an SQL-based event to be scored to determine if the target statement has lexical error(s). The DS8 algorithm can mark up events with the concept "DS8.lexicalError". If there was no lexical error detected, the "DS8.lexicalError" concept is set to 0.0 to reflect the fact that the target statement is not likely an attack from this point of view. On the other hand, if one or more lexical errors are detected, the DS8 algorithm computes this quantity based on the background frequency of lexical errors within the learned set. This computation computes the conditional probability that the lexical error(s) observed (by type) might have arisen from the background error frequencies within the learned set. This probability is then returned as the value of the "DS8.lexicalError" concept.

9.6. DS9 and DS10

In an embodiment, the goal of DS9 algorithm 1960 and DS10 algorithm 1970 is to match a suspected SQL injection string with a component of an HTTP web request. If there is a positive match, then the algorithms determine that the HTTP request is being used to deliver an SQL injection. The information gained from such a match can be tremendously useful.

Both algorithms may extract the same HTTP data field(s), but may use different sources for HTTP data. Furthermore, in embodiments, only DS10-connected devices (e.g., web agents) can perform real-time response and session blocking.

Figure 23:
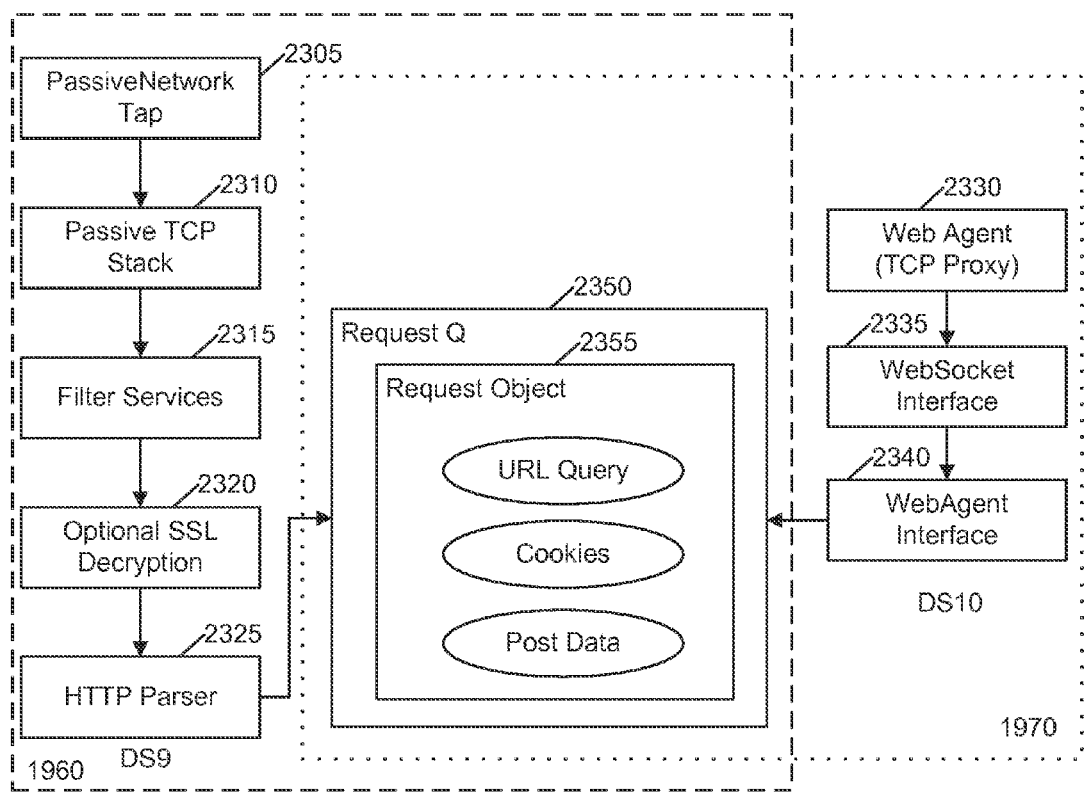
FIG. 23 illustrates data feeds for two illustrated scoring algorithms, according to an embodiment.

FIG. 23 illustrates the data feeds for both DS9 algorithm 1960 and DS10 algorithm 1970, according to an embodiment. DS9 algorithm 1960 uses an internal passive TCP stack 2305 to reassemble traffic sniffed by a passive network tap 2305 on at least one network port of a database firewall. This port can be connected to a properly-configured span port of a router that handles the HTTP traffic to web applications. If the network traffic is encrypted, the decryption key should be provided by the administrator so that DS9 algorithm 1960 can provide clear text to HTTP parser 2325 via decryption 2320. HTTP parser 2325 tracks the HTTP protocol used on each monitored connection, and extracts the information from possible attack points. The extracted information is provided to a request queue 2350 as a request object 2355. DS10 algorithm 1970 can use an outgoing web socket connection 2335 to connect to external web agents 2330. A web-agent-specific protocol can be used to transfer attack point information from the HTTP request and responses to request queue 2350 in a request object 2355 via web agent interface 2340.

In an embodiment, the goal of DS9 algorithm 1960 and DS10 algorithm 1970 is to match an SQL injection string with data from an attack point. Both algorithms may accomplish this using the following steps:

Step 1: Receive a suspected SQL injection string.

Step 2: Generate or otherwise determine a time window from the timestamp of the SQL injection string and the database command that contained it. This time window may be dynamic based on the throughput and/or measured latency of the relevant application server(s).

Step 3: Search or filter request queue 2350 to extract request object(s) 2355 within the determined time window. Each request object 2355 contains the data from suspected attack points in the HTTP requests, as well as a timestamp. These attack points may include, for example, the cookie, the Universal Resource Locator (URL) query, the POST data, and/or any unusual values in the HTTP header tags.

Step 4: Attempt to match the data in request object(s) 2355 to the suspected SQL injection string. For instance, the algorithms may attempt to match the URL query of the HTTP request, the cookie of the request, and/or the POST data of the request to the SQL injection string. Matching an HTTP cookie to the SQL injection string can be complicated, since the cookie value may be encrypted, unencrypted, encoded, or plain text. Accordingly, the algorithms can attempt to decode a cookie before attempting to find a match to the suspected SQL injection string. For instance, the following sub-steps may be performed for cookie matching:

Sub-Step A: Receive the cookie from request object 2355.

Sub-Step B: Attempt to decode the cookie. Initially, it may be determined if the cookie encoding method has been preconfigured. In an embodiment, an administrator can perform this preconfiguration or provide a hint as to what encoding method is used. For instance, operator interfaces module 1395 may allow an administrator to insert script code to perform custom decodings. If the encoding method is preconfigured, the cookie can be decoded. Otherwise, all known cookie-decoding methods may be attempted until the cookie is either decoded or no more cookie-decoding methods remain to be tried. Examples of cookie-encoding methods comprise Base64, Base96, and Hexadecimal. If the cookie is unable to be decoded, no match is returned.

Sub-Step C: If the cookie is successfully decoded, perform the comparison of the cookie with the suspected SQL injection string. If a match is found, the match is returned (e.g., with the cookie tag). Otherwise, if no match is found, no match is returned.

Step 5: If data in request object(s) 2355 matches the suspected SQL injection string, the match is recorded, and a score of 1.0 can be returned. In addition, DS10 algorithm 1970 may also notify web agent 2330. If no match is found, a score of 0.0 can be returned.

In an embodiment, DS10 algorithm 1970 performs a release-hold calculation. Specifically, DS10 algorithm 1970 may periodically receive a "done event" with a timestamp. DS10 algorithm 1970 can use this timestamp to calculate the point in time at which it is known that no attacks occurred, and release all responses being held which occurred before that point in time.

Figure 24:
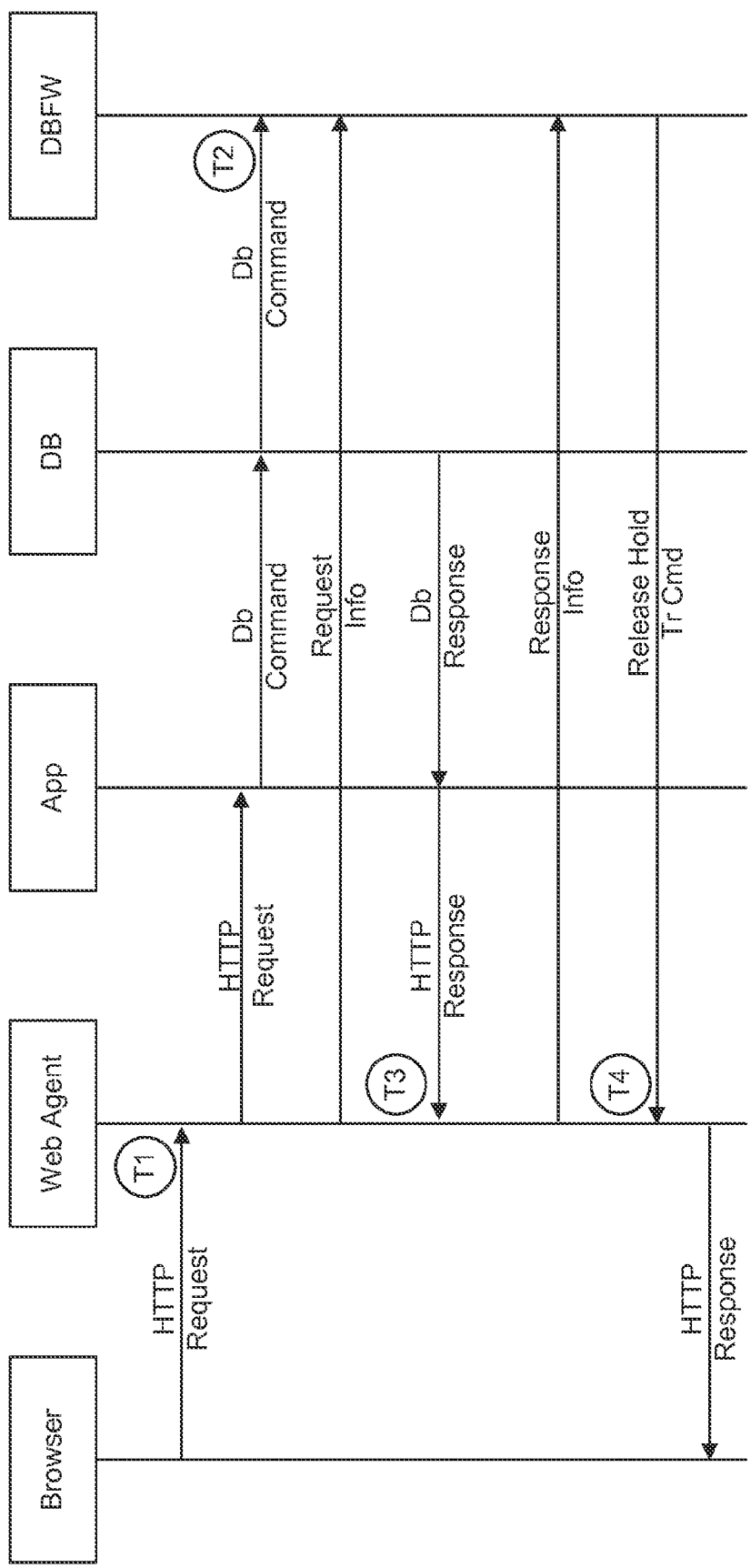
FIG. 24 illustrates timing in the context of release-hold management of an illustrated scoring algorithm, according to an embodiment.

FIG. 24 illustrates the system timing in the context of the release-hold management of DS10 algorithm 1970, according to an embodiment. It is always true that $T_1 > T_2 > T_3$, and that $T_2 < T_4$. Once all database commands have been processed that are $T < T_2$, the release-hold command can be issued for time $T_{RH}$. Inside the database firewall, this is done via the "done event" mentioned above. Specifically, the "done event" is received by DS10 algorithm 1970 at $T_2$. $T_{RH}$ is calculated by DS10 algorithm 1970 as $T_2 - T_D$, where $T_D$ represents an estimate of the maximum delay between $T_1$, when the web agent received the request, and $T_2$, when the database command is issued. $T_D$ may be calculated on the basis that $T_D$ is always less than $T_3 - T_1$, which can be measured exactly. Once calculated, $T_{RH}$ can be sent to the web agent.

9.7. DP14

In an embodiment, DP14 algorithm 1980 detects search patterns in SQL operations that may cause a denial of service. There is no learning phase in DP14 algorithm 1980. Rather, patterns are analyzed only during the scoring phase in a stateless manner. Specifically, DP14 algorithm 1980 may use the syntax analysis 1335 of language system 1325 to examine the pattern parameters to any "LIKE" clauses or other potentially time-consuming clauses in SQL inputs. If the clause (e.g., LIKE clause) is detected with a leading wildcard pattern (either as part of the static SQL or as part of a passed-in parameter or a parameter to a function that creates a search filter, e.g., to the LIKE operation), a concept "DP14.dosPatterns" may be set 1.0. If no such patterns are detected, "DP14.dosPatterns" is instead set to 0.0.

9.8. DP15

In an embodiment, a DP15 algorithm (not shown) is provided that looks for denial-of-service and performance issues on the database by using a learned set that predicts the runtime of SQL statements.

In a learning phase, the DP15 algorithm may extract performance parameters for each learned SQL operation (e.g., each SQL template in the learned set of DS1 algorithm 1910). For example, these parameters may include, without limitation, time from execute dispatch to first response from database server (e.g., in nSec), number of rows returned, amount of data returned in bytes, and/or time from execute dispatch to final result on request. For each SQL template, a minimum, maximum, and standard deviation may be calculated for each of these parameters, and this data may be stored on a per-template, per-database basis. The average frequency of each operation may also be calculated.

In its scoring phase, the performance metrics for an operation being scored may be calculated and compared by the DS15 algorithm to the stored learned per-template, per-database performance parameters. The DS15 algorithm may then set a "DP15.exceedsMargins" concept based on the performance metrics. For example, the "DP15.exceedsMargins" concept may be set to 1.0 if any of the performance metrics fall outside one standard deviation of their learned values. Otherwise, the "DP15.exceedsMargins" concept may be set to 0.0.

In an embodiment, the DS15 algorithm may use a comprehensive statistical kernel function that predicts performance metrics, based on time of day, location in business cycle, performance of groups of operations, etc. to identify distressed database situations that are not related to a specific statement.

10. Web Agents

In an embodiment, a Database Firewall (DBFW) Web Agent is provided. The DBFW Web Agent may communicate with and receive directed actions from one or more components of system 1300 (e.g., mitigation module 1385 and/or master scorer 1365). The DBFW Web Agent is a TCP proxy-based application that both provides the database firewall with key information, and provides the database firewall with the ability to effect the outcome of an SQL injection attack. It is considered a slave device to the database firewall, which may support many such agents simultaneously. DBFW Web Agent is utilized as one of the protective components of a server-based system.

The DBFW Web Agent can perform any or all of the following operations: gather statistics on web traffic, block or redirect individual responses to suspected attacks, and/or block or redirect all requests by a designated session. A DBFW Web Agent can be a stand-alone device or embedded in any or all of the following system components: network firewall, application firewall, load balancer, and/or application front-end web server application. The web agent may monitor HTTP traffic for new servers, and notify the database firewall of their existence, so that monitoring/blocking can be easily configured for them.

10.1. Database Firewall Module

Figure 25:
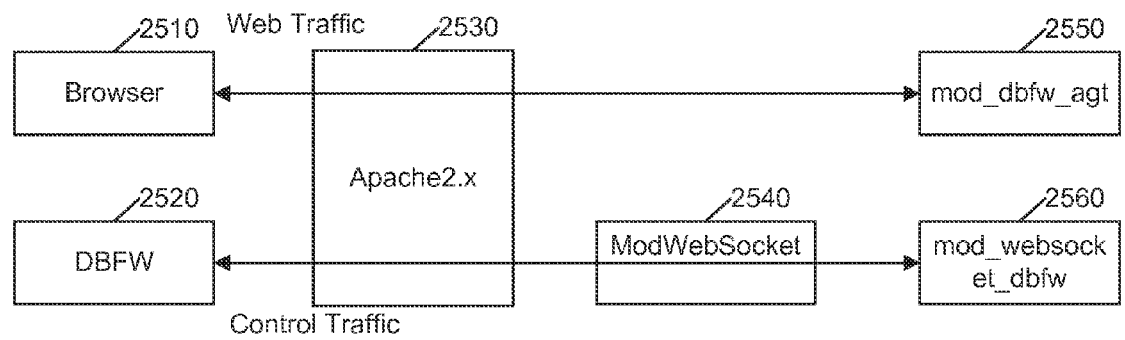
FIG. 25 illustrates an arrangement of components around a web agent, according to an embodiment.

In an embodiment, the DBFW Web Agent may be implemented in the form of a set of Apache2-based modules. FIG. 25 illustrates an arrangement of components, according to an embodiment. These components include a browser or other client application 2510 (e.g., providing the user interface), a database firewall 2520 (e.g., system 1300), an Apache server 2530, a web general socket module 2540 ("ModWebSocket"), and implementation-specific modules 2550 ("mod_dbfw_agt") and 2560 ("mod_websocket_dbfw").

Modules 2540, 2550, and 2560 represent the components of an implementation of a DBFW Web Agent module. As illustrated, web traffic flows through mod_dbfw_aft 2550 and control traffic flows through mod_websocket_dbfw 2560.

In an embodiment, mod_dbfw_agt 2550 logically sits between browser 2510 and the application, and performs the actual real-time traffic monitoring. For each HTTP request received, mod_dbfw_agt 2550 may perform the following logic:

Step 1: Analyze the request to determine if it needs further action. For instance, mod_dbfw_agt 2550 may analyze the request to determine if module 2550 is enabled on the corresponding web service. If action on the corresponding web service is enabled, further steps are taken. Otherwise, if action on the corresponding web service is disabled, the request is forwarded to the application.

Step 2: If action by mod_dbfw_agt 2550 on the web service corresponding to the request is enabled, mod_dbfw_agt 2550 determines whether it should block the request/session. Specifically, mod_dbfw_agt 2550 may examine the request for attack points.

Step 3: If mod_dbfw_agt 2550 identifies one or more attack points, it may extract key information to send to database firewall 2520. This information can be used at database firewall 2520 by DS10 algorithm 1970, described above, to correlate with a suspected attack. If a correlation is found, then database firewall 2520 can command the DBFW Web Agent (e.g., mod_dbfw_agt 2550) to block the response to this request. Otherwise, the request can be forwarded by mod_dbfw_agt 2550 to the appropriate application.

An HTTP request can comprise various attack points, which can be identified by mod_dbfw_agt 2550 (e.g., in Step 2 above), including, without limitation, the URL query, header field, and POST or PUT data (e.g., via form data or in the hidden data of an HTML page). Applications perform their functions in various ways. Some applications keep application state in the query or hidden data. This state may be used in queries to the database in order to find the next step of an operation. For example, some applications may record some of the optional tag information in a header field of an HTTP request into the database. Thus, this tag information, if unchecked, represents an opening for attack. Accordingly, in an embodiment, mod_dbfw_agt 2550 identifies the tag information as a point of attack, and passes this tag information to database firewall 2520 to be checked for variant information.

In an embodiment, in addition to the request processing described above, mod_dbfw_agt 2550 also performs response processing. This response processing may comprise extracting data for database firewall 2520 and/or a holding operation. Specifically, according to an embodiment, the response processing of mod_dbfw_agt 2550 may comprise the following steps for each response received (e.g., from an application):

Step 1: Analyze the response to determine if it needs further action. For instance, mod_dbfw_agt 2550 may analyze the response to determine if module 2550 is enabled on the corresponding web service. If action on the corresponding web service is enabled, further steps are taken. If action on the corresponding web service is disabled, the unaltered request is forwarded to browser 2510.

Step 2: If action by mod_dbfw_agt 2550 on the web service corresponding to the response is enabled, mod_dbfw_agt 2550 extracts response information and sends the extracted information to database firewall 2520.

Step 3: After sending the extracted response information to database firewall 2520, mod_dbfw_agt 2550 determines whether it should hold the response (e.g., based on a communication from database firewall 2520). If mod_dbfw_agt 2550 determines that it should not hold the response, it forwards the unaltered response to browser 2510. Otherwise, mod_dbfw_agt 2550 holds the response until either the hold is released or an action is directed by database firewall 2520. In order to provide reliability, mod_dbfw_agt 2550 may maintain a hold timer in case database firewall 2520 is delayed in its response, and send timeout information to database firewall 2520 if the hold timer expires.

Step 4: If an action is directed by database firewall 2520, mod_dbfw_agt 2550 performs the directed action for the response (e.g., forwarding the response to browser 2510, blocking the response, etc.).

From the perspective of browser 2510 or other client, its request may result in any one of a plurality of configured outcomes, depending on the configuration of database firewall 2520 and/or the correlation determined by DS10 algorithm 1970. An administrator can configure the appropriate directed action based on a security policy. For instance, the potential directed actions may comprise one or more of the following:

(1) Sending a "please wait" communication to the client, which may hold the connection open, e.g., to allow for a trace-back to the client and/or slow robotic clients by using up their threads.

(2) Redirecting the client, which allows the system to present the user with more information as to what happened and what the user can do about it.

(3) Closing the connection, which provides the least information to the potentially attacking client.

(4) Sending a custom message to the client.

(5) Forwarding the normal (e.g., unaltered) webpage to the client.

Figure 26:
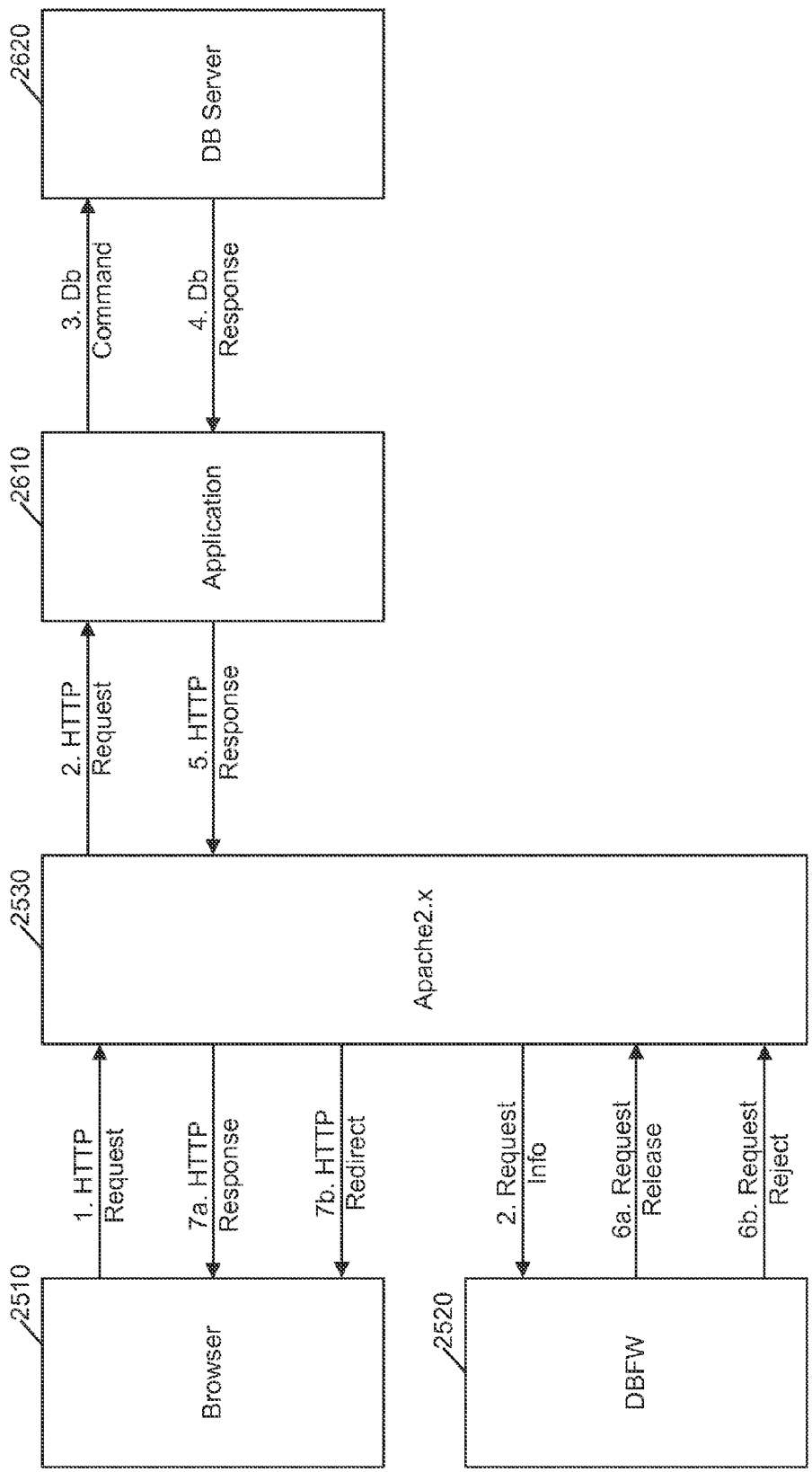
FIG. 26 illustrates the timing of a web agent, according to an embodiment.

FIG. 26 illustrates the timing of a DBFW Web Agent, according to an embodiment. Specifically, FIG. 26 illustrates the progress of an HTTP request through the system and the other actions that it propagates and upon which it depends. As illustrated, the request travels normally from Steps 1 through 5. Step 6 is where database firewall 2520 must make the decision to either release or block the request. For example, if database firewall 2520 decides to release the request, a release message is sent to server 2530 (e.g., to mod_dbfw_agt 2550) in Step 6a, which forwards the response to browser 2510 in Step 7a. On the other hand, if database firewall 2520 decides to block the request, a reject message (e.g., comprising a directed action) is sent to server 2530 (e.g., to mod_dbfw_agt 2550) in Step 6b, which performs a directed action in Step 7b (e.g., a redirection).

Figure 27:
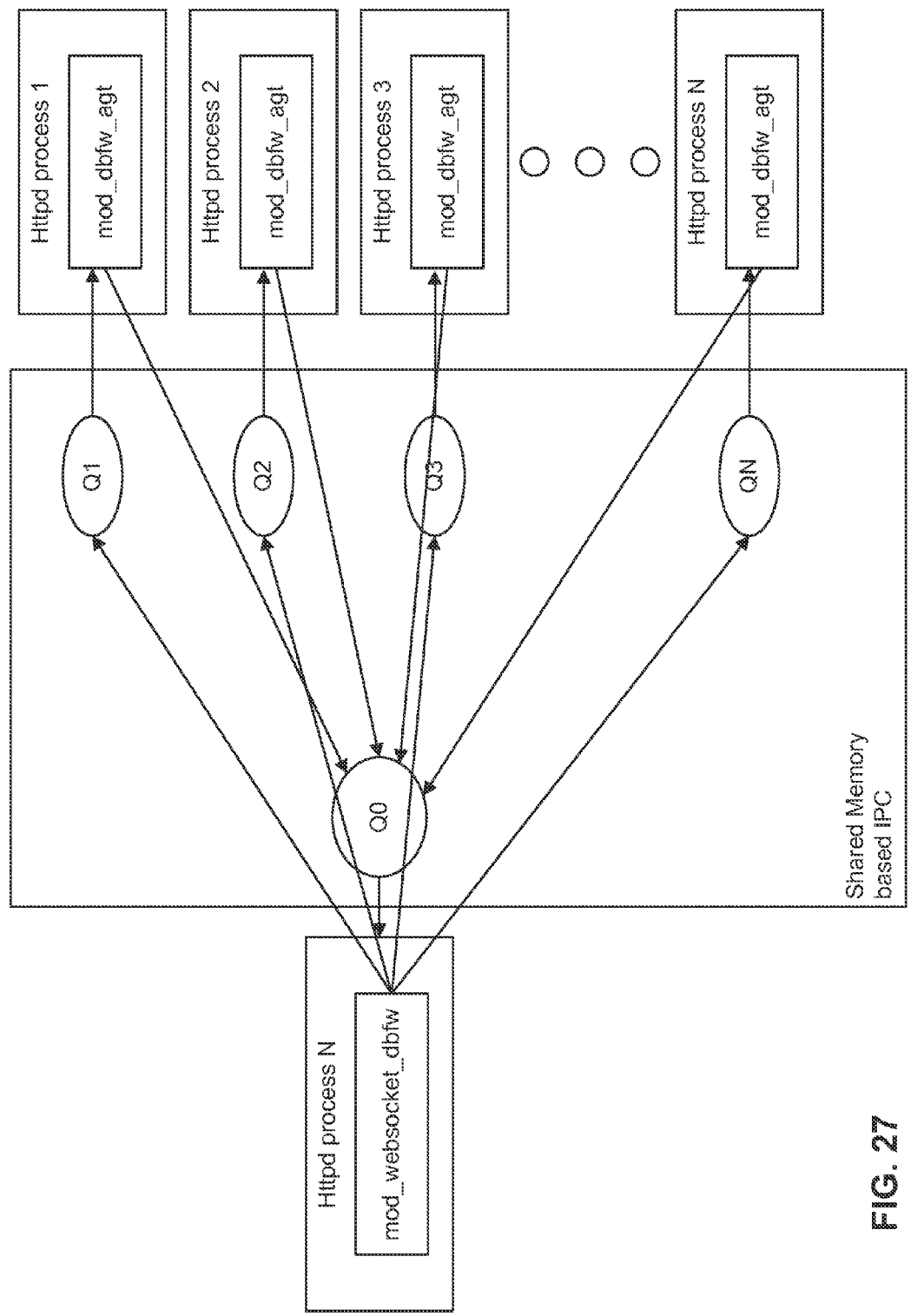
FIG. 27 illustrates an inter-process communication mechanism, according to an embodiment.

In an embodiment, mod_websocket_dbfw 2560 performs all of the communications with database firewall 2520. For instance, mod_websocket_dbfw 2560 may use a custom inter-process communication (IPC) mechanism to communicate with each instance of mod_dbfw_agt 2550. This IPC mechanism is illustrated in FIG. 27, according to an embodiment. Specifically, FIG. 27 shows a multiplexing scheme where the thread running the communications to the engine of database firewall 2520 (e.g., via websocket mod_websocket_dbfw 2560) manages and communicates with one or more DBFW agents (e.g., mod_dbfw_agt 2550) which handle the actual interception of traffic and pending of requests. In addition, the illustrated queues Q0-QN queue requests and responses regarding single requests to be scored and/or analyzed. The IPC mechanism may be specific to the illustrated Apache-based DBFW Web Agent, with other DBFW Web Agents having other processing models with different IPC requirements.

10.2. Web-Tier Interface

In an embodiment, to gain the full benefit from SQL injection protection, an interface is provided between database firewall 1520 and a web tier monitoring point (e.g., DBFW Web Agent). This web-tier interface provides a means to gather web access information (e.g., URL/Uniform Resource Identifier (URI), POST parameters, cookie values, etc.) along with optional context information (e.g., sessions, authenticated users, etc.). This information may be used to further discriminate the activities between the application server and the database server to improve the sensitivity and reduce the false positive frequency of SQL injection detection.

In addition, if the web-tier device (e.g., DBFW Web Agent) is capable of blocking web-user activity, the web-tier interface can be used to identify user sessions that are potentially creating an SQL injection threat.

In an embodiment, the web-tier interface comprises a number of RPC entry points supported by web-tier agents and called dynamically by database firewall 2520. The wire protocol for these interfaces can be encapsulated via HTTPS and comply with the JSON-RPC specification. This allows easy implementation, for example, via one or more available libraries supplied by DB Networks of San Diego, Calif. It should be understood that JSON-RPC is a well-known remote procedure call protocol encoded in JavaScript Object Notation.

In an embodiment, in addition to the discrete synchronous RPC entry points, the init( ) call of the web-tier interface enables an asynchronous stream, over which high-rate, per-request data flows, to minimize overhead. Although the web-tier interface is asynchronous, it maintains numerous kinds of flow.

The following flow illustrates mutual authentication and that, when new services are discovered, their information is sent to database firewall 2520 for addition and/or removal by an administrator. In the illustrated flows, DBFW refers to database firewall 2520 and WTA refers to a web-tier agent (e.g., the DBFW Web Agent, described above):

```
DBFW    <=> WTA
    Mutual Authentication.
    => The initial WebSocket connection (over HTTPS) from DBFW
    => DBFW Authentication
    <= WTA Authentication (or an error message)
    Addition/Removal of Services:
    <= newService (as they are detected by WTA)
    => addService (as instructed by the DBFW administrator)
    => removeService (as instructed by the DBFW administrator)
```

Periodically, each unit may send a heartbeat message after mutual authentication:

```
        DBFW    <=> WTA
            => DBFW Heartbeat
            <= WTA Heartbeat
```

Depending on the capabilities of the web-tier agent and administrator preferences for database firewall 1520, a few different traffic flow patterns can be seen. By way of illustration only, three flows are illustrated that may be seen following mutual authentication: simple monitoring, response blocking, and session blocking.

Simple Monitoring. Even if a web-tier agent has no active traffic capabilities, it can still feed database firewall 2520 valuable information to help in determining the existence of an attack and identifying the attacker:

```
DBFW    <=> WTA
    => Set Session Action (to start a disconnect, redirect, error
        notification, etc.)
    <= HTTP Request (filtered to types that can contain injections)
    <= HTTP Response (filtered to types that can contain injections)
    => Attack Event (optionally sent to WTA so it can log it)
```

Response Blocking. If the web-tier agent is capable of holding messages, it can be set to hold the responses for particular kinds of requests until directed to release them. This can be used to block and discard the response to an attack request. This operation may be performed even if no session is detected. For instance, this may be performed in an inline/proxy device (e.g., proxy, load balancer, or firewall). When the web-tier agent detects traffic, it may initiate the following message flow:

```
DBFW    <=> WTA
    => Set Session Action (to response holding)
    <= HTTP Request (filtered to types that can contain injections)
    <= HTTP Response (filtered to types that cancontain injections)
    (at this time, WTA holds the Response until instructed to release
    or discard it)
    => Attack Event (an optional verbose description of the attack)
    <= Event Adjudication
    => Discard Response (this can include the option to set a
        blocking cookie so that this browser/client can be tracked
        even if no session information is detected)
    OR
    => Release Response
```

Response holding (i.e., holding a response until released or discarded) can be used alone or in cooperation with session blocking, described below.

Session Blocking. After the initial response blocking, described above, additional requests to a session can also be blocked before they affect the database. When the database firewall 2520 detects an "evil" session (i.e., a session comprising a malicious request/response), it can block future requests on just that session using the following message flow:

```
DBFW    <=> WTA
    => Set Session Action (to start a disconnect, redirect, error
        notif. for a session)
    (If a new request comes in using this session, it is
    automatically acted upon.)
    <= Action Notification
    => Set Session Action (optionally, done later to clear the
        blocking)
```

Session Blocking can be used alone or in cooperation with response holding.

11. Mitigation

Embodiments and operations of mitigation module 1385, illustrated in FIG. 13, will now be described in detail. In an embodiment, each of the actions described in this section are carried out by the mitigation module 1385. In an embodiment, three forms of attack mitigation are provided: web blocking, database session killing, and/or database inline blocking. These three forms of mitigation may be configurable by an operator on a per-database basis.

11.1. Web Blocking

In web blocking mode, responses to web requests are held until they are known to not create an attack on the database. When an attack is detected, data is blocked at the web tier. Furthermore, future requests made by the same client, session, or login may be rejected. This is described above in more detail, with respect to the web-tier interface.

11.2. Database Session Killing

The operator may configure administrator-level credentials for a database into the system. In database session killing mode, when an attack is detected (e.g., attacking SQL), an administrative command is issued to the database server to kill the session executing the attack.

11.3. Database Inline Blocking

In database inline blocking mode, a Layer 4 (Transport Layer) proxy system is used between the database server and its clients. The TCP stack in a Linux kernel may be modified to appear transparent at Layer 2 and above (i.e., at the Data Link Layer and above) to the database server and its clients. To the system, it appears that the clients are creating a TCP connection to the proxy system, and the proxy system, in turn, establishes a TCP connection to the database server.

In normal operation, data is proxied byte for byte between the database server and the client. The capture system (e.g., capture/analysis device 107 described above) is configured to monitor the traffic between the client and the proxy system. When a turnaround is detected by the bundler (e.g., bundler 508), the proxy system blocks further traffic on the given TCP session and polls master scorer 1365 for adjudication of the request that was just processed. If the request is not determined to be an attack, the proxy is released and the request or response flows to the server or client. On the other hand, if the request is determined to be an attack, the operator may configure the system such that the connection is broken or a synthetic response is returned (e.g., indicating an error).

The proxy system may also be used to rewrite the SQL or parameters of the request to remove an attack, but otherwise allow the request to complete. Additionally or alternatively, the proxy system may be used to rewrite or limit the result rows from the database server.

An operator can physically connect the database server and its clients (usually through a Layer 2 switch) to ports on the proxy system. In this manner, the proxy system acts as a Layer 2 proxy for any non-TCP traffic and acts as a TCP back-to-back proxy for all TCP connections established from the client side to the server side. A Linux kernel stack may be modified such that the proxy system appears to take on the identity of the database server to the clients and take on the identity of the clients to the server at Layer 2 (e.g., the MAC sublayer of the Data Link Layer) and Layer 3 (IP or Network Layer). This allows a simple relay or optical bypass based system at level one to provide fail-safe operation. If power is lost, the database server and its clients continue to operate without any reconfiguration.

Another method that may be used is to configure two VLANs and use a single port. In this configuration, the same mechanism as described above applies, but with no physical bypass safety. In this mode, a stand-alone process may monitor the health of the proxy aspect of the system and convert the kernel into a cut-through Layer 2 bridge if the proxy system fails to respond to health probes.

A further method that may be used is simple IP reassignment. In this mode, the proxy system is configured to look like the database server from the perspective of the clients. However, from the perspective of the database server, all connections appear to come from the proxy system's assigned IP address or addresses.

12. Example Processing Device

Figure 28:
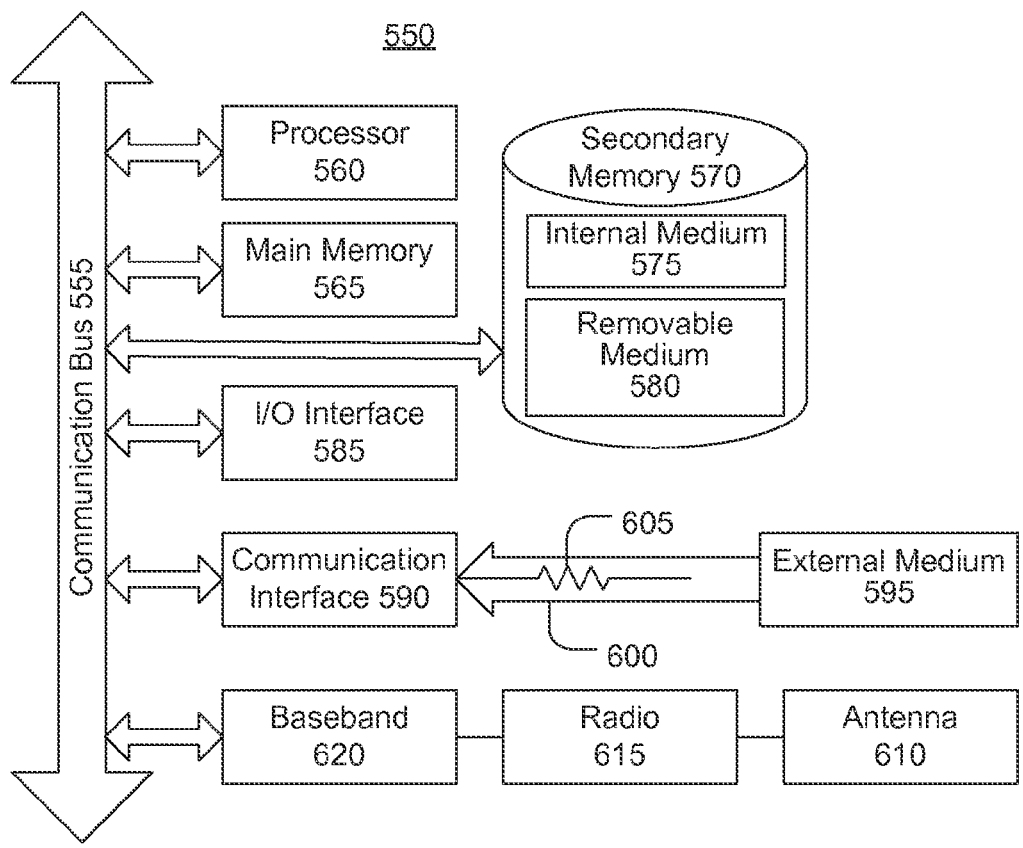
FIG. 28 illustrates a processing system on which one or more of the processes described herein may be executed, according to an embodiment.

FIG. 28 is a block diagram illustrating an example wired or wireless system 550 that may be used in connection with various embodiments described herein. For example the system 550 may be used as or in conjunction with one or more of the mechanisms or processes described above. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including, without limitation, SML, C/C++, Java, JavaScript, Perl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

It should be understood that system 550 may represent the hardware components of one or more of client 1130, web server 1110, application server 1112, database server 1114, system 1300, hosts 1410 and 1430, tap 1440, and monitoring device 1450. For example, each of the modules 1305-1395 in system 1300 may reside in one or more of a main memory 565 and a secondary medium 570, and be executed by one or more processors 560. These modules 1305-1395 of system 1300 may all reside on one system 550 or be distributed across a plurality of systems 550, such that system 1300 may comprise one system 550 or a plurality of systems 550. In addition, modules 1305-1395 may communicate with each other and with other modules (e.g., web agent 2330), via communication interface 590 and/or antenna 610 using standard communication protocols. It should also be understood that modules which provide a user interface (e.g., operator interfaces 1395) may utilize I/O interface 585, for example, to provide a display and receive input operations, and/or communication interface 590, for example, to serve user interfaces (e.g., via web server 1110) to the browser of a user's device.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for detecting threats on a network, the method comprising:
   capturing target network traffic being transmitted between two or more hosts, wherein the target network traffic comprises a plurality of packets; and
   using at least one hardware processor to
      assemble the plurality of packets into one or more messages,
      parse the assembled one or more messages to generate a semantic model of the target network traffic, wherein the semantic model comprises one or more representations of one or more operations or events represented by the one or more messages, generate one or more scores for the one or more operations or events using a plurality of scoring algorithms, and identify one or more potentially threatening ones of the one or more operations or events based on the one or more scores.

2. The method of claim 1, wherein generating the semantic model of the target network traffic comprises generating one or more language-independent representations of one or more operations or events represented by the one or more messages.

3. The method of claim 2, wherein each of the one or more language-independent representations of one or more operations or events identify one or more of a session, a user, a database server, a type of operation or event, a lexical structure of one or more messages associated with the operation or event, a parse structure of the one or more messages associated with the operation or event, a semantic structure of the one or more messages associated with the operation or event, and timing data related to the operation or event.

4. The method of claim 2, wherein parsing the one or more messages to generate a semantic model of the target network traffic comprises:

lexically analyzing the assembled one or more messages into a plurality of dialect-independent tokens;

parsing one or more sequences of the plurality of tokens into one or more parse trees comprising a plurality of parse nodes; and semantically analyzing the one or more parse trees to generate one or more dialect-independent semantic representations of the one or more operations or events.

5. The method of claim 4, wherein generating one or more scores for the one or more operations or events using a plurality of scoring algorithms comprises:

traversing the one or more parse trees to identify one or more operations or events;

generating a first score for at least one of the one or more operations or events using a first one of the plurality of scoring algorithms;

generating a second score for the at least one operation or event using a second one of the plurality of scoring algorithms, wherein the second algorithm is different than the first algorithm; and computing a total score for the at least one operation or event based, at least in part, on the first score and the second score.

6. The method of claim 1, further comprising:

receiving one or more representations of acceptable network traffic; and training each of one or more of the plurality of scoring algorithms to score target operations or events using the one or more representations of acceptable network traffic.

7. The method of claim 6, wherein the one or more representations of acceptable network traffic comprise a plurality of representations of acceptable operations or events, and wherein training at least one of the one or more scoring algorithms to score target operations or events using the one or more representations of acceptable network traffic comprises:

parsing the plurality of representations of acceptable operations or events into a plurality of parse trees; and generating a pattern-matching tree that is an isomorphism between two or more of the plurality of parse trees and represents a unification of the two or more parse trees.

8. The method of claim 7, wherein generating one or more scores for the one or more operations or events using a plurality of scoring algorithms comprises generating a score for a target operation or event using the at least one scoring algorithm by:

parsing a representation of the target operation or event into a target parse tree;

computing a tree-edit distance comprising a minimum number of edits necessary to unify the target parse tree with the pattern-matching tree; and, based on the tree-edit distance, generating a scalar value indicating a probability that the target operation or event represents a malicious attack or nominal application variability.

9. The method of claim 6, wherein training at least one of the one or more scoring algorithms to score target operations or events using the one or more representations of acceptable network traffic comprises generating one or more profiles of normal network traffic, wherein the one or more profiles of normal network traffic comprise one or more of a normal number of rows returned by an operation, a normal execution time of an operation, one or more normal parameter values for an operation, one or more normal types of content returned by an operation, a normal execution time of an operation for a certain time period, a normal frequency of an operation for a certain time period, an identifier of an application, and a model of normal execution semantics for an operation.

10. The method of claim 6, wherein training the one or more scoring algorithms comprises, for each of the one or more scoring algorithms, generating a model, for scoring operations or events, using the one or more representations of acceptable network traffic.

11. The method of claim 6, wherein at least one of the trained one or more scoring algorithms determines whether a structural signature of a target operation within the target network traffic matches the structural signature of an acceptable operation, learned during training of the at least one scoring algorithm, to generate a score for the target operation.

12. The method of claim 11, wherein the at least one trained scoring algorithm determines a minimum edit distance between a structure of the target operation and a structure of the acceptable operation, and wherein the minimum edit distance represents a minimum number of insertions required to create the structure of the target operation from the structure of the acceptable operation.

13. The method of claim 11, wherein the target operation comprises a structured query language (SQL) statement.

14. The method of claim 13, wherein the at least one trained scoring algorithm maintains a set of one or more templates of acceptable SQL statements.

15. The method of claim 6, wherein the at least one scoring algorithm comprises a first scoring algorithm, and wherein a second one of the plurality of scoring algorithms:

determines a background frequency of lexical errors within one or more acceptable operations learned during training of the first scoring algorithm;

identifies one or more lexical errors within a target operation within the target network traffic; and computes a probability that the one or more lexical errors within the target operation are in accordance with the background frequency of lexical errors within the one or more acceptable operations learned during the training of the first scoring algorithm.

16. The method of claim 1, wherein at least one of the plurality of scoring algorithms searches a target operation within the target network traffic for one or more segments of structured query language (SQL) that potentially indicate an attack.

17. The method of claim 16, wherein the one or more segments of SQL represent potentially one or more SQL injections.

18. The method of claim 16, wherein the one or more segments of SQL represent potentially one or more time-consuming SQL clauses.

19. The method of claim 18, wherein each of the one or more segments of SQL is associated with one or more performance parameters, and wherein the at least one scoring algorithm calculates an estimated performance metric for the target operation based on the one or more performance parameters associated with any of the one or more segments of SQL identified within the target operation.

20. The method of claim 1, wherein at least one of the plurality of scoring algorithms parses a structured query language (SQL) statement into a plurality of segments, and determines whether the plurality of segments satisfy one or more criteria.

21. The method of claim 1, wherein assembling the plurality of packets into one or more messages comprises:
synchronizing the plurality of packets;
sorting each of the plurality of packets into one of two host queues according to the transmission direction of the packet;
processing the two host queues into a single push queue by alternately processing the packets in one of the two host queues until a packet is encountered which cannot be disposed of or the host queue is empty and then processing the packets in the other one of the two host queues until a packet is encountered that cannot be disposed of or the host queue is empty;
if loss of a packet is detected, generating a synthetic gap packet to stand in for the lost packet; and
bundling packets in the single push queue into the one or more messages, wherein each of the one or more messages is a request message or a response message.

22. The method of claim 21, wherein the synthetic gap packet comprises an indication that it is a stand-in for a lost packet.

23. The method of claim 1, further comprising preventing one or more identified potentially threatening operations from being performed on a database that is accessible to one of the two or more hosts.

24. A system for detecting threats on a network, the system comprising:
at least one hardware processor; and
one or more executable modules that, when executed by the at least one hardware processor,
capture target network traffic being transmitted between two or more hosts, wherein the target network traffic comprises a plurality of packets,
assemble the plurality of packets into one or more messages,
parse the assembled one or more messages to generate a semantic model of the target network traffic, wherein the semantic model comprises one or more representations of one or more operations or events represented by the one or more messages,
generate one or more scores for the one or more operations or events using a plurality of scoring algorithms, and
identify one or more potentially threatening ones of the one or more operations or events based on the one or more scores.

25. The system of claim 24, wherein generating the semantic model of the target network traffic comprises generating one or more language-independent representations of one or more operations or events represented by the one or more messages.

26. The system of claim 25, wherein each of the one or more language-independent representations of one or more operations or events identify one or more of a session, a user, a database server, a type of operation or event, a lexical structure of one or more messages associated with the operation or event, a parse structure of the one or more messages associated with the operation or event, a semantic structure of the one or more messages associated with the operation or event, and timing data related to the operation or event.

27. The system of claim 25, wherein parsing the one or more messages to generate a semantic model of the target network traffic comprises:
lexically analyzing the assembled one or more messages into a plurality of dialect-independent tokens;
parsing one or more sequences of the plurality of tokens into one or more parse trees comprising a plurality of parse nodes; and
semantically analyzing the one or more parse trees to generate one or more dialect-independent semantic representations of the one or more operations or events.

28. The system of claim 27, wherein generating one or more scores for the one or more operations or events using a plurality of scoring algorithms comprises:
traversing the one or more parse trees to identify one or more operations or events;
generating a first score for at least one of the one or more operations or events using a first one of the plurality of scoring algorithms;
generating a second score for the at least one operation or event using a second one of the plurality of scoring algorithms, wherein the second algorithm is different than the first algorithm; and
computing a total score for the at least one operation or event based, at least in part, on the first score and the second score.

29. The system of claim 24, wherein the one or more executable modules further:
receive one or more representations of acceptable network traffic; and
train each of one or more of the plurality of scoring algorithms to score target operations or events using the one or more representations of acceptable network traffic.

30. The system of claim 29, wherein the one or more representations of acceptable network traffic comprise a plurality of representations of acceptable operations or events, and wherein training at least one of the one or more scoring algorithms to score target operations or events using the one or more representations of acceptable network traffic comprises:
parsing the plurality of representations of acceptable operations or events into a plurality of parse trees; and
generating a pattern-matching tree that is an isomorphism between two or more of the plurality of parse trees and represents a unification of the two or more parse trees.

31. The system of claim 30, wherein generating one or more scores for the one or more operations or events using a plurality of scoring algorithms comprises generating a score for a target operation or event using the at least one scoring algorithm by:
parsing a representation of the target operation or event into a target parse tree;

computing a tree-edit distance comprising a minimum number of edits necessary to unify the target parse tree with the pattern-matching tree; and, based on the tree-edit distance, generating a scalar value indicating a probability that the target operation or event represents a malicious attack or nominal application variability.

32. The system of claim 29, wherein training at least one of the one or more scoring algorithms to score target operations or events using the one or more representations of acceptable network traffic comprises generating one or more profiles of normal network traffic, wherein the one or more profiles of normal network traffic comprise one or more of a normal number of rows returned by an operation, a normal execution time of an operation, one or more normal parameter values for an operation, one or more normal types of content returned by an operation, a normal execution time of an operation for a certain time period, a normal frequency of an operation for a certain time period, an identifier of an application, and a model of normal execution semantics for an operation.

33. The system of claim 29, wherein training the one or more scoring algorithms comprises, for each of the one or more scoring algorithms, generating a model, for scoring operations or events, using the one or more representations of acceptable network traffic.

34. The system of claim 29, wherein at least one of the trained one or more scoring algorithms determines whether a structural signature of a target operation within the target network traffic matches the structural signature of an acceptable operation, learned during training of the at least one scoring algorithm, to generate a score for the target operation.

35. The system of claim 34, wherein the at least one trained scoring algorithm determines a minimum edit distance between a structure of the target operation and a structure of the acceptable operation, and wherein the minimum edit distance represents a minimum number of insertions required to create the structure of the target operation from the structure of the acceptable operation.

36. The system of claim 34, wherein the target operation comprises a structured query language (SQL) statement.

37. The system of claim 36, wherein the at least one trained scoring algorithm maintains a set of one or more templates of acceptable SQL statements.

38. The system of claim 29, wherein the at least one scoring algorithm comprises a first scoring algorithm, and wherein a second one of the plurality of scoring algorithms:
determines a background frequency of lexical errors within one or more acceptable operations learned during training of the first scoring algorithm;
identifies one or more lexical errors within a target operation within the target network traffic; and
computes a probability that the one or more lexical errors within the target operation are in accordance with the background frequency of lexical errors within the one or more acceptable operations learned during the training of the first scoring algorithm.

39. The system of claim 24, wherein at least one of the plurality of scoring algorithms searches a target operation within the target network traffic for one or more segments of structured query language (SQL) that potentially indicate an attack.

40. The system of claim 39, wherein the one or more segments of SQL represent potentially one or more SQL injections.

41. The system of claim 39, wherein the one or more segments of SQL represent potentially one or more time-consuming SQL clauses.

42. The system of claim 41, wherein each of the one or more segments of SQL is associated with one or more performance parameters, and wherein the at least one scoring algorithm calculates an estimated performance metric for the target operation based on the one or more performance parameters associated with any of the one or more segments of SQL identified within the target operation.

43. The system of claim 24, wherein at least one of the plurality of scoring algorithms parses a structured query language (SQL) statement into a plurality of segments, and determines whether the plurality of segments satisfy one or more criteria.

44. The system of claim 24, wherein assembling the plurality of packets into one or more messages comprises:
synchronizing the plurality of packets;
sorting each of the plurality of packets into one of two host queues according to the transmission direction of the packet;
processing the two host queues into a single push queue by alternately processing the packets in one of the two host queues until a packet is encountered which cannot be disposed of or the host queue is empty and then processing the packets in the other one of the two host queues until a packet is encountered that cannot be disposed of or the host queue is empty;
if loss of a packet is detected, generating a synthetic gap packet to stand in for the lost packet; and
bundling packets in the single push queue into the one or more messages, wherein each of the one or more messages is a request message or a response message.

45. The system of claim 44, wherein the synthetic gap packet comprises an indication that it is a stand-in for a lost packet.

46. The system of claim 24, wherein the one or more executable modules further prevent one or more identified potentially threatening operations from being performed on a database that is accessible to one of the two or more hosts.

47. A non-transitory computer-readable medium having one or more instructions stored thereon for detecting threats on a network, wherein the one or more instructions, when executed by a processor, cause the processor to:
capture target network traffic being transmitted between two or more hosts, wherein the target network traffic comprises a plurality of packets;
assemble the plurality of packets into one or more messages;
parse the assembled one or more messages to generate a semantic model of the target network traffic, wherein the semantic model comprises one or more representations of one or more operations or events represented by the one or more messages;
generate one or more scores for the one or more operations or events using a plurality of scoring algorithms; and
identify one or more potentially threatening ones of the one or more operations or events based on the one or more scores.

48. The non-transitory computer-readable medium of claim 47, wherein generating the semantic model of the target network traffic comprises generating one or more language-independent representations of one or more operations or events represented by the one or more messages.

49. The non-transitory computer-readable medium of claim 42, wherein each of the one or more language-independent representations of one or more operations or events identify one or more of a session, a user, a database server, a type of operation or event, a lexical structure of one or more messages associated with the operation or event, a parse structure of the one or more messages associated with the operation or event, a semantic structure of the one or more messages associated with the operation or event, and timing data related to the operation or event.

50. The non-transitory computer-readable medium of claim 48, wherein parsing the one or more messages to generate a semantic model of the target network traffic comprises:
   lexically analyzing the assembled one or more messages into a plurality of dialect-independent tokens;
   parsing one or more sequences of the plurality of tokens into one or more parse trees comprising a plurality of parse nodes; and
   semantically analyzing the one or more parse trees to generate one or more dialect-independent semantic representations of the one or more operations or events.

51. The non-transitory computer-readable medium of claim 50, wherein generating one or more scores for the one or more operations or events using a plurality of scoring algorithms comprises:
   traversing the one or more parse trees to identify one or more operations or events;
   generating a first score for at least one of the one or more operations or events using a first one of the plurality of scoring algorithms;
   generating a second score for the at least one operation or event using a second one of the plurality of scoring algorithms, wherein the second algorithm is different than the first algorithm; and
   computing a total score for the at least one operation or event based, at least in part, on the first score and the second score.

52. The non-transitory computer-readable medium of claim 47, wherein the one or more instructions, when executed by the processor, further cause the processor to:
   receive one or more representations of acceptable network traffic; and
   train each of one or more of the plurality of scoring algorithms to score target operations or events using the one or more representations of acceptable network traffic.

53. The non-transitory computer-readable medium of claim 52, wherein the one or more representations of acceptable network traffic comprise a plurality of representations of acceptable operations or events, and wherein training at least one of the one or more scoring algorithms to score target operations or events using the one or more representations of acceptable network traffic comprises:
   parsing the plurality of representations of acceptable operations or events into a plurality of parse trees; and
   generating a pattern-matching tree that is an isomorphism between two or more of the plurality of parse trees and represents a unification of the two or more parse trees.

54. The non-transitory computer-readable of claim 53, wherein generating one or more scores for the one or more operations or events using a plurality of scoring algorithms comprises generating a score for a target operation or event using the at least one scoring algorithm by:
   parsing a representation of the target operation or event into a target parse tree;
   computing a tree-edit distance comprising a minimum number of edits necessary to unify the target parse tree with the pattern-matching tree; and,
   based on the tree-edit distance, generating a scalar value indicating a probability that the target operation or event represents a malicious attack or nominal application variability.

55. The non-transitory computer-readable of claim 52, wherein training at least one of the one or more scoring algorithms to score target operations or events using the one or more representations of acceptable network traffic comprises generating one or more profiles of normal network traffic, wherein the one or more profiles of normal network traffic comprise one or more of a normal number of rows returned by an operation, a normal execution time of an operation, one or more normal parameter values for an operation, one or more normal types of content returned by an operation, a normal execution time of an operation for a certain time period, a normal frequency of an operation for a certain time period, an identifier of an application, and a model of normal execution semantics for an operation.

56. The non-transitory computer-readable medium of claim 52, wherein training the one or more scoring algorithms comprises, for each of the one or more scoring algorithms, generating a model, for scoring operations or events, using the one or more representations of acceptable network traffic.

57. The non-transitory computer-readable medium of claim 52, wherein at least one of the trained one or more scoring algorithms determines whether a structural signature of a target operation within the target network traffic matches the structural signature of an acceptable operation, learned during training of the at least one scoring algorithm, to generate a score for the target operation.

58. The non-transitory computer-readable medium of claim 57, wherein the at least one trained scoring algorithm determines a minimum edit distance between a structure of the target operation and a structure of the acceptable operation, and wherein the minimum edit distance represents a minimum number of insertions required to create the structure of the target operation from the structure of the acceptable operation.

59. The non-transitory computer-readable medium of claim 57, wherein the target operation comprises a structured query language (SQL) statement.

60. The non-transitory computer-readable medium of claim 59, wherein the at least one trained scoring algorithm maintains a set of one or more templates of acceptable SQL statements.

61. The non-transitory computer-readable medium of claim 52, wherein the at least one scoring algorithm comprises a first scoring algorithm, and wherein a second one of the plurality of scoring algorithms:
   determines a background frequency of lexical errors within one or more acceptable operations learned during training of the first scoring algorithm;
   identifies one or more lexical errors within a target operation within the target network traffic; and
   computes a probability that the one or more lexical errors within the target operation are in accordance with the background frequency of lexical errors within the one or more acceptable operations learned during the training of the first scoring algorithm.

62. The non-transitory computer-readable medium of claim 47, wherein at least one of the plurality of scoring algorithms searches a target operation within the target network traffic for one or more segments of structured query language (SQL) that potentially indicate an attack.

63. The non-transitory computer-readable medium of claim 62, wherein the one or more segments of SQL represent potentially one or more SQL injections.

64. The non-transitory computer-readable medium of claim 62, wherein the one or more segments of SQL represent potentially one or more time-consuming SQL clauses.

65. The non-transitory computer-readable medium of claim 64, wherein each of the one or more segments of SQL is associated with one or more performance parameters, and wherein the at least one scoring algorithm calculates an estimated performance metric for the target operation based on the one or more performance parameters associated with any of the one or more segments of SQL identified within the target operation.

66. The non-transitory computer-readable medium of claim 47, wherein at least one of the plurality of scoring algorithms parses a structured query language (SQL) statement into a plurality of segments, and determines whether the plurality of segments satisfy one or more criteria.

67. The non-transitory computer-readable medium of claim 47, wherein assembling the plurality of packets into one or more messages comprises:

synchronizing the plurality of packets;

sorting each of the plurality of packets into one of two host queues according to the transmission direction of the packet;

processing the two host queues into a single push queue by alternately processing the packets in one of the two host queues until a packet is encountered which cannot be disposed of or the host queue is empty and then processing the packets in the other one of the two host queues until a packet is encountered that cannot be disposed of or the host queue is empty;

if loss of a packet is detected, generating a synthetic gap packet to stand in for the lost packet; and bundling packets in the single push queue into the one or more messages, wherein each of the one or more messages is a request message or a response message.

68. The non-transitory computer-readable medium of claim 67, wherein the synthetic gap packet comprises an indication that it is a stand-in for a lost packet.

69. The non-transitory computer-readable medium of claim 47, wherein the one or more instructions, when executed by the processor, further cause the processor to prevent one or more identified potentially threatening operations from being performed on a database that is accessible to one of the two or more hosts.

* * * * *